(12) United States Patent
Hall et al.

(10) Patent No.: US 8,887,853 B2
(45) Date of Patent: Nov. 18, 2014

(54) SYSTEMS AND APPARATUS FOR A THREE-WHEELED VEHICLE

(71) Applicant: Tanom Motors, LLC, Culpeper, VA (US)

(72) Inventors: Merrill C. Hall, Culpeper, VA (US); Adam J. Canni, Fleming Island, FL (US)

(73) Assignee: Tanom Motors, LLC, Culpeper, VA (US)

( * ) Notice: Subject to any disclaimer, the term of this patent is extended or adjusted under 35 U.S.C. 154(b) by 0 days.

(21) Appl. No.: 14/034,485

(22) Filed: Sep. 23, 2013

(65) Prior Publication Data

US 2014/0025246 A1   Jan. 23, 2014

Related U.S. Application Data

(63) Continuation of application No. 13/662,832, filed on Oct. 29, 2012, now Pat. No. 8,540,045.

(60) Provisional application No. 61/553,542, filed on Oct. 31, 2011.

(51) Int. Cl.
| | |
|---|---|
| *B62D 61/06* | (2006.01) |
| *B60K 6/42* | (2007.10) |
| *B60K 15/063* | (2006.01) |
| *B60K 1/00* | (2006.01) |
| *B60K 5/04* | (2006.01) |
| *B60G 3/20* | (2006.01) |
| *B60W 20/00* | (2006.01) |

(52) U.S. Cl.
CPC ............... *B60K 6/42* (2013.01); *B60K 15/063* (2013.01); *B60K 1/00* (2013.01); *B60K 5/04* (2013.01); *B60G 3/20* (2013.01); *B60W 20/10* (2013.01); *B62D 61/065* (2013.01); *B60K 2015/0638* (2013.01); *B60K 2015/0639* (2013.01); *B60Y 2200/122* (2013.01); *B60G 2204/421* (2013.01); *B60G 2300/122* (2013.01); *B60W 2600/00* (2013.01); *Y10S 903/93* (2013.01); *Y10S 903/951* (2013.01)
USPC ............................ 180/210; 903/930; 903/951

(58) Field of Classification Search
USPC .......... 180/210, 211, 213, 215, 217, 374, 376
See application file for complete search history.

(56) References Cited

U.S. PATENT DOCUMENTS

| | | |
|---|---|---|
| D55,440 S | 6/1920 | Smith |
| 1,989,995 A | 2/1935 | Martin |

(Continued)

OTHER PUBLICATIONS

Noah Joseph, "Part Harley, Part Hot Rod, All Crazy," [retrieved from the Internet], Campagna V13R [retrieved on Oct. 12, 2012], Oct. 27, 2011.

(Continued)

*Primary Examiner* — Faye M Fleming
*Assistant Examiner* — Robert A Coker
(74) *Attorney, Agent, or Firm* — Cooley LLP

(57) ABSTRACT

An apparatus includes a vehicle frame, a swing arm and a fuel tank. The vehicle frame includes a front portion and a rear portion and defines a longitudinal centerline therebetween. The front portion is configured to support a recumbent seat. The rear portion is configured to be coupled to the swing arm and. The swing arm defines a longitudinal centerline and includes a wheel mounting portion configured to be coupled to a wheel assembly. The wheel mounting portion defines a radial axis that is substantially coaxial with the longitudinal centerline of the vehicle frame in at least one plane. The fuel tank is coupled to the rear portion of the vehicle frame such that the fuel tank is above the longitudinal centerline of the swing arm.

16 Claims, 42 Drawing Sheets

(56) References Cited

U.S. PATENT DOCUMENTS

| | | | |
|---|---|---|---|
| D94,847 S | 3/1935 | Martin | |
| 2,773,392 A * | 12/1956 | Cizek | 476/17 |
| 2,788,858 A | 4/1957 | Aasland et al. | |
| 2,818,929 A | 1/1958 | Kucera | |
| 3,419,098 A | 12/1968 | Mayers et al. | |
| 3,610,358 A | 10/1971 | Korff | |
| D248,461 S | 7/1978 | Edmonson | |
| D260,871 S | 9/1981 | Cargile | |
| D262,871 S | 2/1982 | Powers | |
| 4,448,278 A | 5/1984 | Badsey | |
| 4,453,763 A | 6/1984 | Richards | |
| D274,995 S | 8/1984 | Richards et al. | |
| 4,506,753 A | 3/1985 | Wood, Jr. | |
| D283,113 S | 3/1986 | Stollery | |
| 4,583,613 A | 4/1986 | Nakayama | |
| 4,671,563 A | 6/1987 | Shakespear | |
| 4,763,538 A | 8/1988 | Fujita et al. | |
| 4,869,332 A | 9/1989 | Fujita et al. | |
| 4,870,874 A | 10/1989 | Ito | |
| 5,024,113 A | 6/1991 | Ito et al. | |
| 5,236,060 A | 8/1993 | Huber | |
| 5,431,243 A | 7/1995 | Richards | |
| 5,806,622 A | 9/1998 | Murphy | |
| D407,348 S | 3/1999 | Riley | |
| 5,960,901 A | 10/1999 | Hanagan et al. | |
| 6,015,022 A | 1/2000 | Thuliez | |
| D424,979 S | 5/2000 | Hanagan et al. | |
| D427,548 S | 7/2000 | Sacco et al. | |
| D449,018 S | 10/2001 | Musser | |
| D469,037 S | 1/2003 | Hanagan et al. | |
| D469,386 S | 1/2003 | Hanagan et al. | |
| 6,523,634 B1 | 2/2003 | Gagnon et al. | |
| 6,575,260 B2 | 6/2003 | Bourget | |
| 6,651,764 B2 | 11/2003 | Fournier et al. | |
| D485,788 S | 1/2004 | Guay et al. | |
| 6,708,579 B2 | 3/2004 | Punko | |
| 6,948,581 B2 * | 9/2005 | Fecteau et al. | 180/210 |
| 7,377,295 B2 | 5/2008 | Byers et al. | |
| 7,464,781 B2 | 12/2008 | Guay et al. | |
| D584,188 S | 1/2009 | Jenkins et al. | |
| 7,484,767 B2 | 2/2009 | Tsuya | |
| D589,844 S | 4/2009 | Aubé et al. | |
| D592,547 S | 5/2009 | Riley | |
| D592,548 S | 5/2009 | Aubé et al. | |
| D593,908 S | 6/2009 | Longpre et al. | |
| 7,543,672 B2 | 6/2009 | Codere et al. | |
| 7,571,787 B2 | 8/2009 | Saiki | |
| 7,591,337 B2 | 9/2009 | Suhre et al. | |
| 7,617,899 B1 | 11/2009 | Warner et al. | |
| 7,621,362 B2 | 11/2009 | Ogawa et al. | |
| D613,203 S | 4/2010 | Geslin et al. | |
| D626,032 S | 10/2010 | Starr | |
| D633,821 S | 3/2011 | Hill et al. | |
| 7,926,607 B2 | 4/2011 | Seiter | |
| 8,001,862 B2 | 8/2011 | Albulushi et al. | |
| 8,061,465 B2 | 11/2011 | Martino | |
| D666,127 S | 8/2012 | Nam | |
| D678,124 S | 3/2013 | Canni et al. | |
| D682,158 S | 5/2013 | Canni et al. | |
| 2007/0256882 A1 | 11/2007 | Bedard et al. | |
| 2011/0006498 A1 | 1/2011 | Mercier | |
| 2012/0204676 A1 | 8/2012 | Walters et al. | |
| 2012/0241237 A1 | 9/2012 | Holroyd et al. | |
| 2012/0241239 A1 | 9/2012 | Holroyd et al. | |
| 2013/0105238 A1 | 5/2013 | Hall et al. | |

OTHER PUBLICATIONS

"*The street legal* Pavement Predator," T-Rex 14R, Campagna, 2011.
"T-Rex: Three Wheeled Sports Car or Motorcycle," [retrieved from the Internet] [retrieved on Sep. 18, 2012].
Nova Racing, Reversing Gearbox for Honda Motorcycles, [retrieved from the Internet] [retrieved on Feb. 4, 2014] at URL: http://www.novaracing.co.uk/ProductHondaReversingGearbox.html.
eGlideGoodies, Reverse Gear Option 1, [retrieved from the Internet] © 2002-2014, eGlide Goodies [retrieved on Feb. 4, 2014].
Baker Drivetrain, Factory Five-Speed Reverse kit, [retrieved from the Internet] @2012 Baker, Inc. [retrieved on Feb. 4, 2014] at URL: http://www.bakerdrivetrain.com/f5r-factory-5-speed-reverse#.
International Search Report and Written Opinion for International Application No. PCT/US2012/062391, mailed Jan. 11, 2013.
Office Action for U.S. Appl. No. 13/662,832, mailed Mar. 22, 2013.

* cited by examiner

SYSTEMS AND APPARATUS FOR A THREE-WHEELED VEHICLE

CROSS-REFERENCE TO RELATED APPLICATIONS

This application is a continuation of U.S. patent application Ser. No. 13/662,832, filed Oct. 29, 2012, which claims priority to and the benefit of U.S. Provisional Application Ser. No. 61/553,542, filed Oct. 31, 2011, entitled, "System and Apparatus for a Three-Wheeled Vehicle," each which is incorporated by reference herein in their entirety.

BACKGROUND

Embodiments described herein relate to three-wheeled motor vehicles and more specifically, the embodiments described herein relate to systems and apparatus for reverse-trike vehicles.

In an effort to reduce cost of operation, it has been desirable to reduce the fuel consumption of automotive vehicles that include an internal combustion engine. Accordingly, the size and power of some known vehicles are being reduced to improve the fuel efficiency of the engines included therein. Moreover, internal combustion engines themselves are becoming ever more fuel efficient. Such advances in efficiency, however, are limited, and can contribute to an increased interest in alternatives to traditional four-wheeled automobiles.

One such alternative to traditional four-wheeled vehicles is a motorcycle. Known motorcycles are inherently more fuel efficient than even the smallest four-wheeled vehicles, and can also often provide a level of performance that is otherwise not present in some four-wheeled vehicles. Thus, known motorcycles can provide a stimulating and fuel efficient alternative to known four-wheeled vehicles. On the other hand, motorcycles are inherently less safe than four-wheeled vehicles and therefore, can be unacceptable to some potential motorists.

The goal of combining the desirable features of both four-wheeled vehicles and motorcycles has led to the development of three-wheeled vehicles. One known configuration of a three-wheeled vehicle includes two wheels at the front of the vehicle and one wheel at the rear of the vehicle, commonly referred to as a "reverse-trike." Known reverse-trikes commonly have very limited space to accommodate components thereof due to their reduced width at the back end. Therefore, the vehicle components, such as the engine and/or fuel tank, cannot be arranged in the same manner as either motorcycles or four-wheeled vehicles.

Some known three-wheeled vehicles include a straddle seating arrangement, similar to the seating arrangement of a motorcycle. This seating arrangement allows for the reduced width of the back end portion of the vehicle (i.e., that includes the rear wheel), at least in part, by accommodating certain drive train components, such as the engine and/or fuel tank, partially or completely under the seat. In some known straddle-style three-wheeled vehicles, the operational controls of the vehicle (e.g., throttle control, brake control, clutch control, etc.) are arranged at least in part on the handle bars, similarly to those found in motorcycles. In some instances, this arrangement of the operational controls can deter potential motorists because of the potential need to learn how to operate the controls. In addition, common straddle-style three-wheeled vehicles have an open seating area that can result in drivers being subjected to undesirable conditions in the event of inclement weather or the like. Moreover, open seating areas can be inherently more dangerous than enclosed seating areas that can further deter potential motorists.

Other known three-wheeled vehicles include an enclosed seating area and can further include a recumbent seating arrangement that is similar to those found in four-wheeled vehicles. In some such vehicles, the operational controls of the vehicle can be similar to those commonly found in four-wheeled automobiles. For example, some such vehicles can include a steering wheel and a foot pedal arrangement of the throttle control, the brake, and/or the clutch. The configuration of such vehicles, however, can often result in a further reduction of space with which vehicle components can be located. For example, in some known reverse-trikes, the fuel tank is located below a portion of the seating area, thereby limiting possible seating arrangements. More specifically, the placement of the fuel tank below the recumbent seat can limit and/or prevent the implementation of an adjustable seating arrangement because of limitations in space and mounting locations. Accordingly, the seats included in such instances can be substantially less ergonomic and/or comfortable.

In an effort to accommodate drivers of varying sizes, the foot pedal controls of some such vehicles can be made adjustable. Adjusting the foot pedal controls, however, can be difficult, time consuming, and/or can require special tools. Furthermore, there can be an increased potential of loosening and/or moving of the foot pedal controls during operation that can lead to a loss of control of the vehicle.

Therefore, there is a need for an improved systems and designs for three-wheeled vehicles.

SUMMARY

The embodiments described herein relate to three-wheeled motor vehicles. In some embodiments, an apparatus includes a vehicle frame, a swing arm and a fuel tank. The vehicle frame includes a front portion and a rear portion and defines a longitudinal centerline therebetween. The front portion is configured to support a recumbent seat. The rear portion is configured to be coupled to the swing arm and. The swing arm defines a longitudinal centerline and includes a wheel mounting portion configured to be coupled to a wheel assembly. The wheel mounting portion defines a radial axis that is substantially coaxial with the longitudinal centerline of the vehicle frame in at least one plane. The fuel tank is coupled to the rear portion of the vehicle frame such that the fuel tank is above the longitudinal centerline of the swing arm.

DETAILED DESCRIPTION

Figure 1:
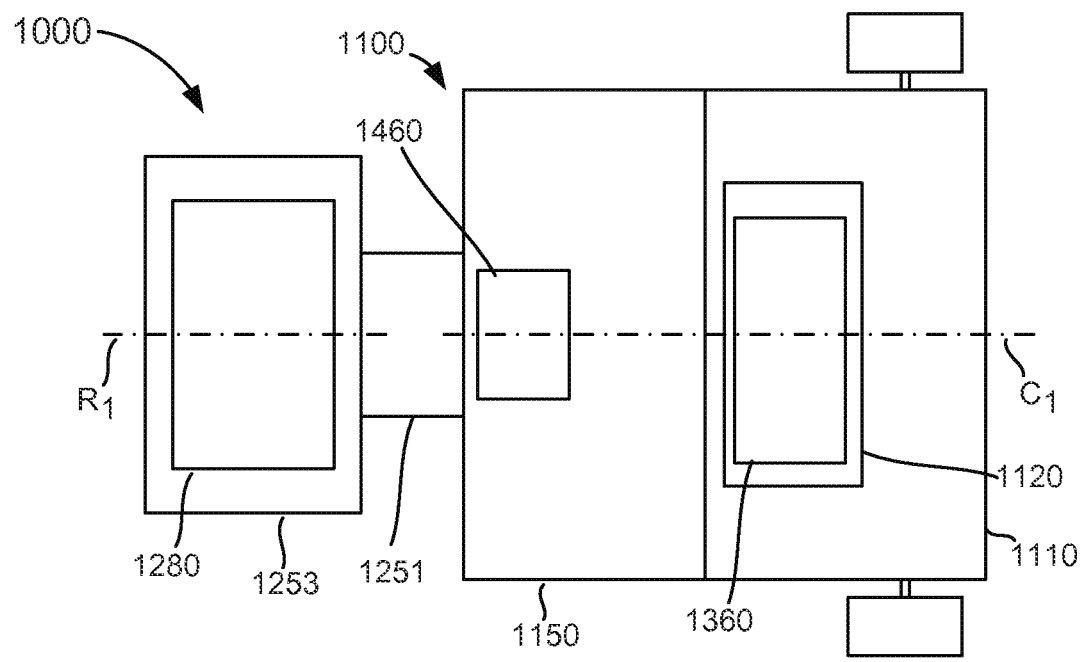
FIGS. 1 and 2 are a top view and a side view, respectively, of a schematic illustration of a vehicle according to an embodiment.

In some embodiments, an apparatus includes a vehicle frame, a swing arm and a fuel tank. The vehicle frame includes a front portion and a rear portion and defines a longitudinal centerline therebetween. The front portion is configured to support a recumbent seat. The rear portion is configured to be coupled to the swing arm and. The swing arm defines a longitudinal centerline and includes a wheel mounting portion configured to be coupled to a wheel assembly. The wheel mounting portion defines a radial axis that is substantially coaxial with the longitudinal centerline of the vehicle frame in at least one plane. The fuel tank is coupled to the rear portion of the vehicle frame such that the fuel tank is above the longitudinal centerline of the swing arm.

In some embodiments, an apparatus includes a vehicle frame, a swing arm and a fuel tank. The vehicle frame includes a front portion and a rear portion, and defines a longitudinal centerline therebetween. The front portion is configured to support a recumbent seat. The rear portion includes an engine mounting portion and is configured to be coupled to a swing arm. The swing arm defines a longitudinal centerline, and includes a wheel mounting portion configured to be coupled to a wheel assembly. The wheel mounting portion defines a radial axis that is substantially aligned with the longitudinal centerline of the vehicle frame in at least one plane. The fuel tank is coupled to the rear end portion of the vehicle frame such that the fuel tank is above the engine mounting portion.

In some embodiments, an apparatus includes a vehicle frame, a body, a swing arm and a fuel tank. The vehicle frame includes a front portion and a rear portion, and defines a longitudinal centerline therebetween. The body is configured to be coupled to the vehicle frame, and includes a seat support surface configured to support a seat. The swing arm is coupled to the rear portion of the frame. The swing arm defines a longitudinal centerline and includes a wheel mounting portion configured to be coupled to a wheel assembly. The wheel mounting portion defines a radial axis that is substantially aligned with the longitudinal centerline of the vehicle frame in at least one plane. The fuel tank is coupled to the vehicle frame such that the fuel tank is above a plane defined by the seat support surface.

As used in this specification, the term "recumbent seat" refers to a seat that supports a person in a substantially recumbent position. For example, a recumbent seat can include a seat back portion such that the recumbent seat supports a portion of the back and a portion of the legs of a person. In this manner, the person can be seated in the recumbent seat such that the legs of the person extend away from the seat.

As used herein, the singular forms "a," "an" and "the" include plural referents unless the context clearly dictates otherwise. Thus, for example, the term "a mount" is intended to mean a single mount or a combination of mounts.

The embodiments described herein relate to three-wheeled vehicles. More specifically, the embodiments described herein are examples of a three-wheeled vehicle in a reverse-trike configuration, including two front wheels and one rear wheel. The presented embodiments are meant to be examples only. Thus, the systems and/or components can be included in a three-wheeled vehicle of varying configurations such as, for example, a standard trike (e.g., two rear wheels and a single front wheel).

Figure 2:
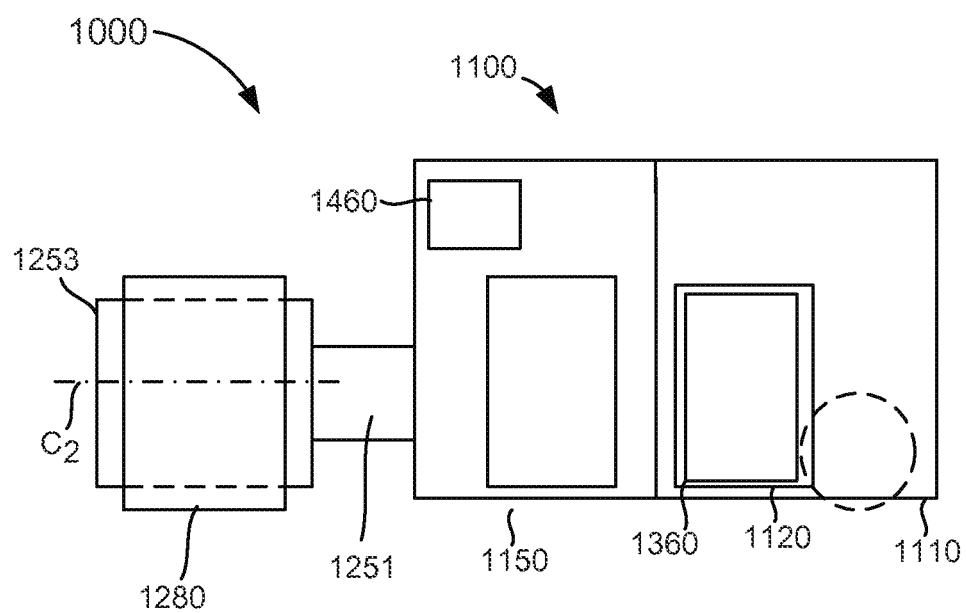

FIGS. 1 and 2 are top view and a side view, respectively, of a schematic illustration showing a portion of a three-wheeled vehicle 1000, according to an embodiment. The vehicle 1000 includes a frame 1100 having a front portion 1110 and a rear portion 1150 and defining a longitudinal centerline $C_1$. The frame 1100 can be any suitable configuration and can be formed from any suitable material. For example, in some embodiments, the frame 1100 can include tubing (not shown) that can be formed from any suitable metallic material such as, aluminum, aluminum alloy, steel, steel alloy, or any combination thereof.

The frame 1100 can include any suitable portion or region configured to receive and/or couple to various components of the vehicle 1000. For example, while not shown in FIGS. 1 and 2, the frame 1100 can be configured to support and/or be coupled to a body, a drive train, a front and rear suspension system, a set of wheels, a linkage system, any suitable electronics, or the like such that the vehicle 1100 is suitable for driving. Furthermore, the frame 1100 can include a firewall or other suitable structure (not shown in FIGS. 1 and 2) configured to separate an operator from a portion of the drive train. For example, in some embodiments, the frame 1100 can include a firewall configured to separate an engine coupled to the rear portion 1150 of the frame 1100 from a passenger compartment defined by the front portion 1110 of the frame 1100.

The front portion 1110 of the frame 1100 includes a seat support structure 1120 configured to support at least a portion of a recumbent seat 1360. The seat support structure 1120 can be, for example, a portion of the frame 1100 that includes sufficient structure to support a passenger seated in a recumbent position. Similarly stated, the seat support structure 1120 is configured to support a seat 1360 on which a passenger can be seated in a posture in which their legs do not straddle (or otherwise extend below on either side of) a portion of the seat 1360, and in which their legs are at least partially forward. For example, in some embodiments, the seat support structure 1120 can include flat bar (e.g., aluminum flat bar, steel flat bar, etc.) that is fixedly coupled (e.g., welded or otherwise fixedly attached) to tubing that forms a portion of the frame 1100. In this manner, the seat support structure 1120 can provide sufficient structure to which a portion of the recumbent seat 1360 can be coupled, either directly or indirectly. In some embodiments, the seat support structure 1120 can include a seat back portion (not shown in FIGS. 1 and 2) configured to support a back portion of the recumbent seat 1360 (e.g., the portion of the seat that support the back of a person seated thereon). In some embodiments, the front portion 1110 of the frame 1100 is configured to at least partially enclose, envelope and/or surround the recumbent seat 1360 when the recumbent seat 1360 is supported by the seat support structure 1120.

The recumbent seat 1360 can be of any suitable configuration, and is configured to support an operator of the vehicle 1000 such that the operator can be seated thereon such that the operator's legs do not straddle (or otherwise extend below on either side of) a portion of the seat 1360, and are extended away from (toward the front of) the recumbent seat 1360. In some embodiments, the recumbent seat 1360 can be coupled to an adjustable structure or mechanism that is in turn coupled to and/or supported by the seat support structure 1120. In this manner, the position of the recumbent seat 1360 can be adjustable along the longitudinal centerline $C_1$ of the frame 1100, as described in further detail below with respect to specific embodiments.

The rear portion 1150 of the frame 1100 is coupled to a swing arm 1251 and a fuel tank 1460. More particularly, the swing arm 1251 is rotatably coupled to the rear portion 1150 of the frame 1100 such that the swing arm 1251 can pivot relative to the frame 1100 about an axis that is normal to the longitudinal centerline $C_1$. While not shown in FIGS. 1 and 2, in some embodiments the swing arm 1251 can include and/or be coupled to any suitable suspension component(s) configured to influence the movement of the swing arm 1251 relative to the frame 1100. For example, in some embodiments, the swing arm 1251 can be disposed within a bearing and/or bushing (or set of bearings and/or bushings) that are coupled to the rear portion 1150 of the frame 1100, thereby allowing the swing arm 1251 to rotate relative to the frame 1100. Furthermore, the swing arm 1251 can be coupled to a shock absorber (e.g., a spring and/or damper) that is in turn coupled to the rear portion 1150 of the frame 1100. Thus, the shock absorber can dampen and/or control a portion of the movement of swing arm 1251 relative to the frame 1100.

The swing arm 1251 includes a wheel mounting portion 1253 that is configured to be coupled to a wheel assembly 1280. The wheel mounting portion 1253 defines a radial axis $R_1$, as shown in FIG. 1. Expanding further, the swing arm 1251 can be arranged relative to the frame 1100 such that the radial axis $R_1$ of the wheel mounting portion 1253 is substantially coaxial with the longitudinal centerline $C_1$ of the frame 1100 in at least one plane. For example, as shown in FIG. 1, the radial axis $R_1$ defined by the wheel mounting portion 1253 is substantially coaxial with the longitudinal centerline $C_1$ in the x-y plane (e.g., as seen in the top view of FIG. 1). Said another way, the longitudinal centerline $C_1$ of the frame 1100 can be thought of as defining a plane of symmetry between a left side of the frame 1100 and a right side of the frame 1100 (as shown in FIG. 1) and the radial axis $R_1$ defined by the wheel mounting portion 1253 is substantially parallel with the plane of symmetry. In this manner, the swing arm 1251 and/or the wheel mounting portion 1253 are laterally centered at the rear portion of the frame 1100. Similarly stated, this arrangement allows the frame 1100 to be suited for three-wheeled vehicles having a single rear wheel (i.e., a reverse trike).

In some embodiments, the wheel mounting portion 1253 forms a bifurcated portion of the swing arm 1251 that can extend on two sides of the wheel assembly 1280. In this manner, the wheel mounting portion 1253 can define and/or include an axle (not shown in FIGS. 1 and 2) about which the wheel assembly 1280 can rotate. In this manner, when the wheel assembly 1280 is coupled to the wheel mounting portion 1253 of the swing arm 1251 a radial axis (not shown) of the wheel assembly 1280 can also be substantially coaxial with the longitudinal centerline $C_1$ of the frame.

As described above, the rear portion 1150 of the frame 1100 is coupled to a fuel tank 1460. The fuel tank 1460 can be any suitable shape, size, or configuration. For example, in some embodiments, the size and shape of the fuel tank 1460 can correspond to the space constraints of the vehicle 1000. As shown in FIG. 2, the fuel tank 1460 is coupled to the frame 1100 such that the fuel tank 1460 is above a longitudinal centerline $C_2$ defined by the swing arm 1251. Similarly stated, the fuel tank 1460 is disposed above a line that can extend from the center of the wheel mounting portion 1253 to a center of a pivot point defined by the rotatable coupling of the swing arm 1251 to the frame 1100. In some embodiments, the fuel tank 1460 can be positioned relative to the wheel mounting portion 1253 of the swing arm 1251 such that when the radial axis $R_1$ of the wheel mounting portion 1253 is perpendicular to the longitudinal center line $C_2$ of the swing arm 1251, the radial axis $R_1$ intersects a portion of the fuel tank 1460. In other embodiments, when the radial axis $R_1$ is normal to a surface supporting the wheel assembly 1280 (e.g., the ground), the radial axis $R_1$ can intersect a portion of the fuel tank 1460. Thus, although the fuel tank 1460 is shown in FIGS. 1 and 2 as being spaced apart from the swing arm 1251 and/or the wheel assembly 1280 along the longitudinal centerline $C_1$ of the frame 1100, in other embodiments, at least a portion of the fuel tank 1460 can be disposed directly above the swing arm 1251 and/or the wheel assembly 1280.

Although the fuel tank 1460 is shown as being disposed within a volume defined by the frame 1100 of the vehicle 1000, in some embodiments, all or a portion of the fuel tank 1460 can be disposed outside of the frame 1100 while being coupled thereto. For example, in some embodiments, the fuel tank 1460 can be an integral part of or coupled to a vehicle body (not shown in FIGS. 1 and 2) such that when the vehicle body is coupled to the frame 1100, at least a portion of the fuel tank 1460 is disposed outside of a volume and/or envelope defined by the frame 1100.

Figure 3:
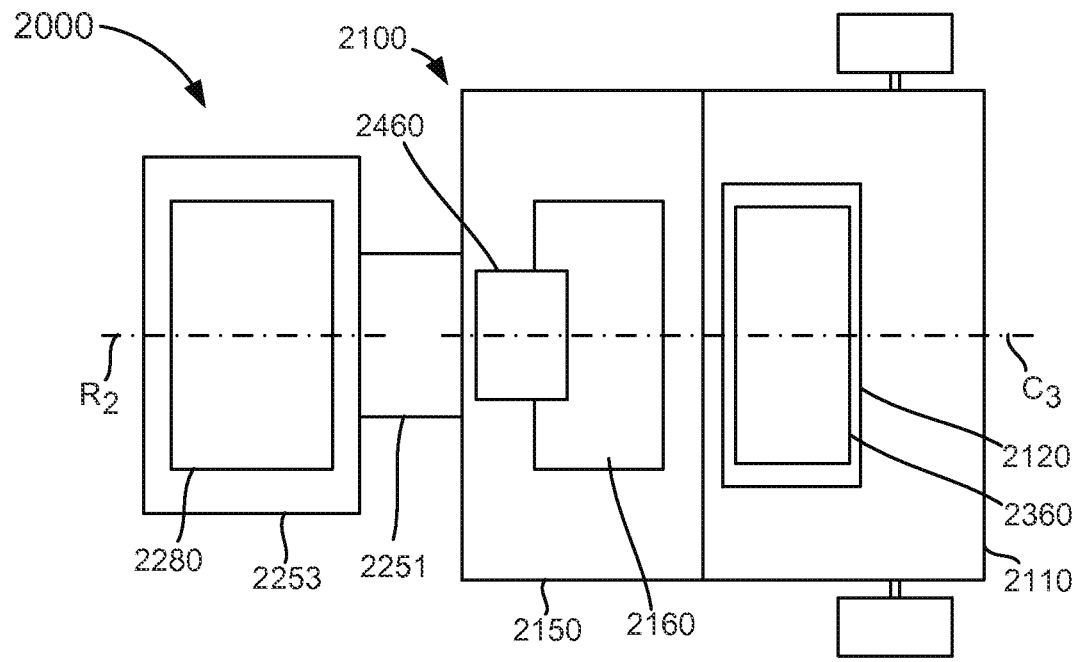
FIGS. 3 and 4 are a top view and a side view, respectively, of a schematic illustration of a vehicle according to an embodiment.
Figure 4:
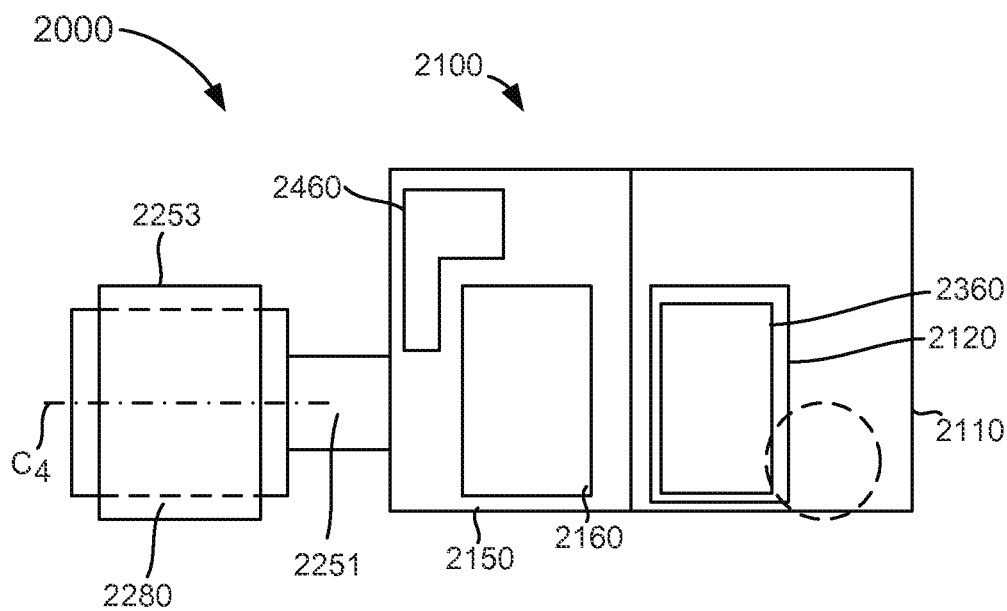

Although not shown in FIGS. 1 and 2, in some embodiments, the frame 1100 can include an engine mounting portion that is disposed between the seat support structure 1120 and the swing arm 1251. Similarly stated, in some embodiments, the frame 1100 can accommodate a rear-mounted engine. For example, FIGS. 3 and 4 are a top view and a side view, respectively, of a schematic illustration showing at least a portion of a vehicle 2000, according to an embodiment. Certain portions of the vehicle 2000 can be substantially similar to the vehicle 1000 described above with reference to FIGS. 1 and 2. Therefore, such portions of the vehicle 2000 that are similar to corresponding portions of the vehicle 1000 are not described in further detail.

The vehicle 2000 includes a frame 2100 having a front portion 2110 and a rear portion 2150 and defining a longitudinal centerline $C_3$ therebetween. As described above, the frame 2100 can be coupled to any suitable system or subsystem. For example, the frame 2100 can be configured to support and/or be coupled to a body, a drive train, a front and rear suspension system, a set of wheels, etc. For example, in some embodiments, the front portion 2110 of the frame can be coupled to a suspension system including a left spindle and a right spindle configured to be coupled to a left wheel and a right wheel, respectively. Furthermore, the frame 2100 can include a firewall or other suitable structure (not shown in FIGS. 3 and 4) configured to separate an operator from a portion of the drive train (e.g., an engine).

As described above, the front portion 2110 includes a seat support structure 2120 configured to be coupled to and/or support a recumbent seat 2360. In some embodiments, the seat support structure 2120 can include any suitable structure configured to support both a seating portion and a back rest portion of the recumbent seat 2360. Similarly stated, the seat support structure 2120 is configured to support a seat 2360 on which a passenger can be seated in a posture in which their legs do not straddle (or otherwise extend below on either side of) a portion of the seat 2360, and in which their legs are at least partially forward. Moreover, the recumbent seat 2360 can be supported by and/or coupled to the seat support structure 2120 via an intervening structure such as, for example, a slide assembly. Thus, in some embodiments, the recumbent seat 2360 can be movable along the longitudinal centerline $C_3$ of the frame 2100.

The rear portion 2150 is configured to be coupled to a swing arm 2251 and a fuel tank 2460. The swing arm 2251 can be rotatably coupled to the rear portion 2150 of the frame 2100, as described above. Moreover, the swing arm 2251 includes a wheel mounting portion 2253 defining a radial axis $R_2$ that is coupled to a wheel assembly 2280. The wheel mounting portion 2253 is arranged relative to the frame 2100 such that the radial axis $R_2$ defined by the wheel mounting portion 2253 is substantially aligned with the longitudinal centerline $C_3$ of the frame 2100 within at least one plane, as shown in FIG. 3. Said another way, the longitudinal centerline $C_3$ of the frame 2100 can be thought of as defining a plane of symmetry between a left side of the frame 2100 and a right side of the frame 2100 (as shown in FIG. 3) and the radial axis $R_2$ defined by the wheel mounting portion 2253 is substantially parallel with the plane of symmetry. In this manner, the swing arm 2251 and/or the wheel mounting portion 2253 are laterally centered at the rear portion of the frame 2100.

The rear portion 2150 includes an engine mounting portion 2160 to which an engine (not shown in FIGS. 3 and 4) can be mounted. Similarly stated, the engine mounting portion 2160 is disposed between the front portion 2110 of the frame 2100 and a portion of the swing arm 2153. More specifically, the engine mounting portion 2160 can be rearward of, for example, a firewall such that the engine mounting portion 2160 is separated from the seat support structure 2120 included in the front portion 2110 of the frame 2100. The engine mounting portion 2160 can include any suitable hardware, bracket(s), accommodations for air ducting, exhaust plumbing and the like such that an engine can be mounted thereto. In some embodiments, the engine mounting portion 2160 can be configured to receive and/or accommodate a four-cylinder gasoline engine, such as, for example, a liquid-cooled motorcycle engine having a displacement of 1000 to 1500 cubic centimeters. In some embodiments, the engine mounting portion 2160 can be configured to receive and/or accommodate a Suzuki Hayabusa engine. Thus, the vehicle 2000 is configured such that the engine is disposed rearward of the recumbent seat 2360 and forward of the swing arm 2153.

As shown in FIG. 4, the fuel tank 2460 is coupled to the rear portion 2150 of the frame 2100 such that at least a portion of the fuel tank 2460 is disposed above the engine mounting portion 2160. The fuel tank 2460 can be any suitable shape, size, or configuration. In some embodiments, the size and shape of the fuel tank 2460 can correspond to the space constraints of the vehicle 2000. For example, as shown in FIG. 4, the fuel tank 2460 can include a first portion that is entirely above the engine mounting portion 2160 and a second portion that is below a portion of the engine mounting portion 2160. In some embodiments, the second portion of the fuel tank 2460 can be disposed between the engine mounting portion 2160 and a structure of the frame 2100 that is coupled to the swing arm 2153. In other embodiments, the second portion of the fuel tank 2160 can be disposed between the engine mounting portion 2160 and the front portion 2110 of the frame 2100 (e.g., forward of the engine mounting portion 2160 and rearward of a firewall or the like).

In some embodiments, the fuel tank 2460 can further be arranged relative to the frame 2100 such that the fuel tank 2460 is above a longitudinal centerline $C_4$ defined by the swing arm 2251. Similarly stated, the fuel tank 2460 is disposed above a line that can extend from the center of the wheel mounting portion 2253 to a center of a pivot point defined by the rotatable coupling of the swing arm 2251 to the frame 2100. In some embodiments, the arrangement of the fuel tank 2460 relative to the engine mounting portion 2160 can be such that fuel disposed with the fuel tank 2460 can be gravity fed to an engine (not shown) coupled to the engine mounting portion 2160. In other embodiments, the fuel can be pumped into the engine using any suitable pump system (not shown).

Figure 5:
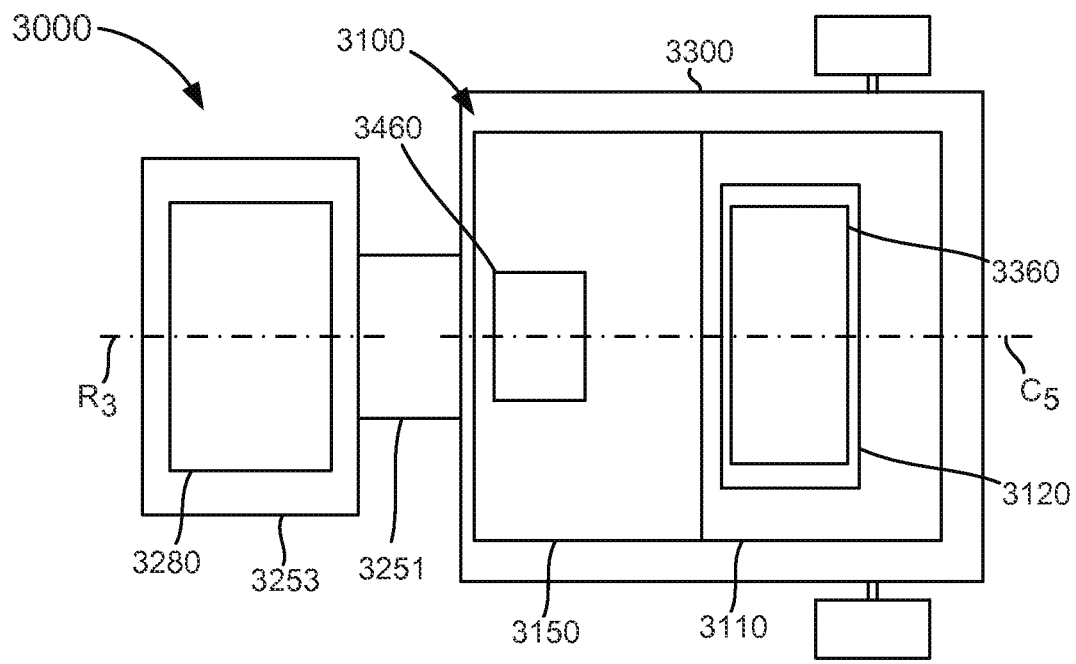
FIGS. 5 and 6 are a top view and a side view, respectively, of a schematic illustration of a vehicle according to an embodiment.
Figure 6:
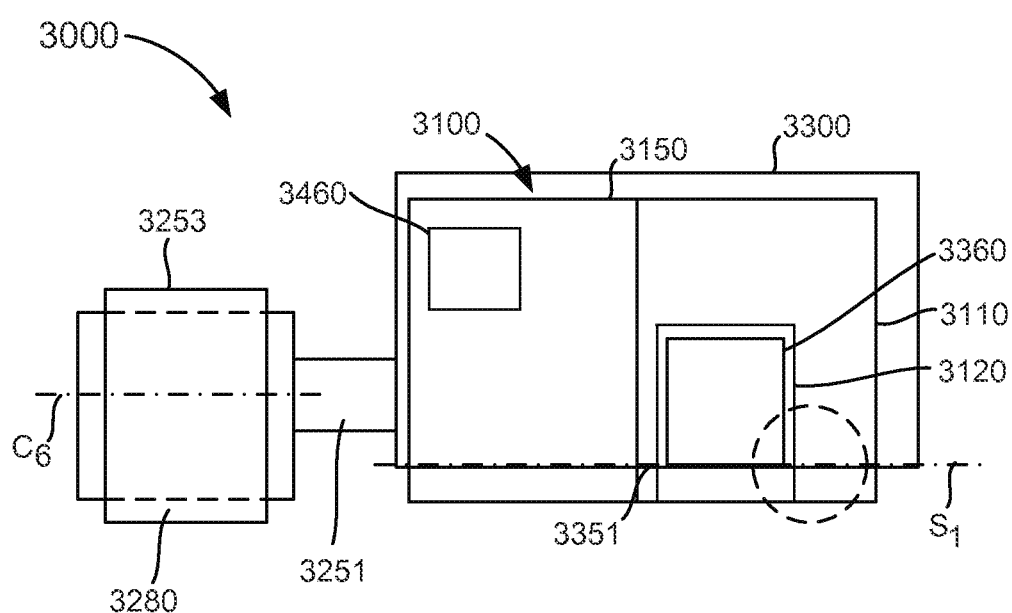
Figure 7:
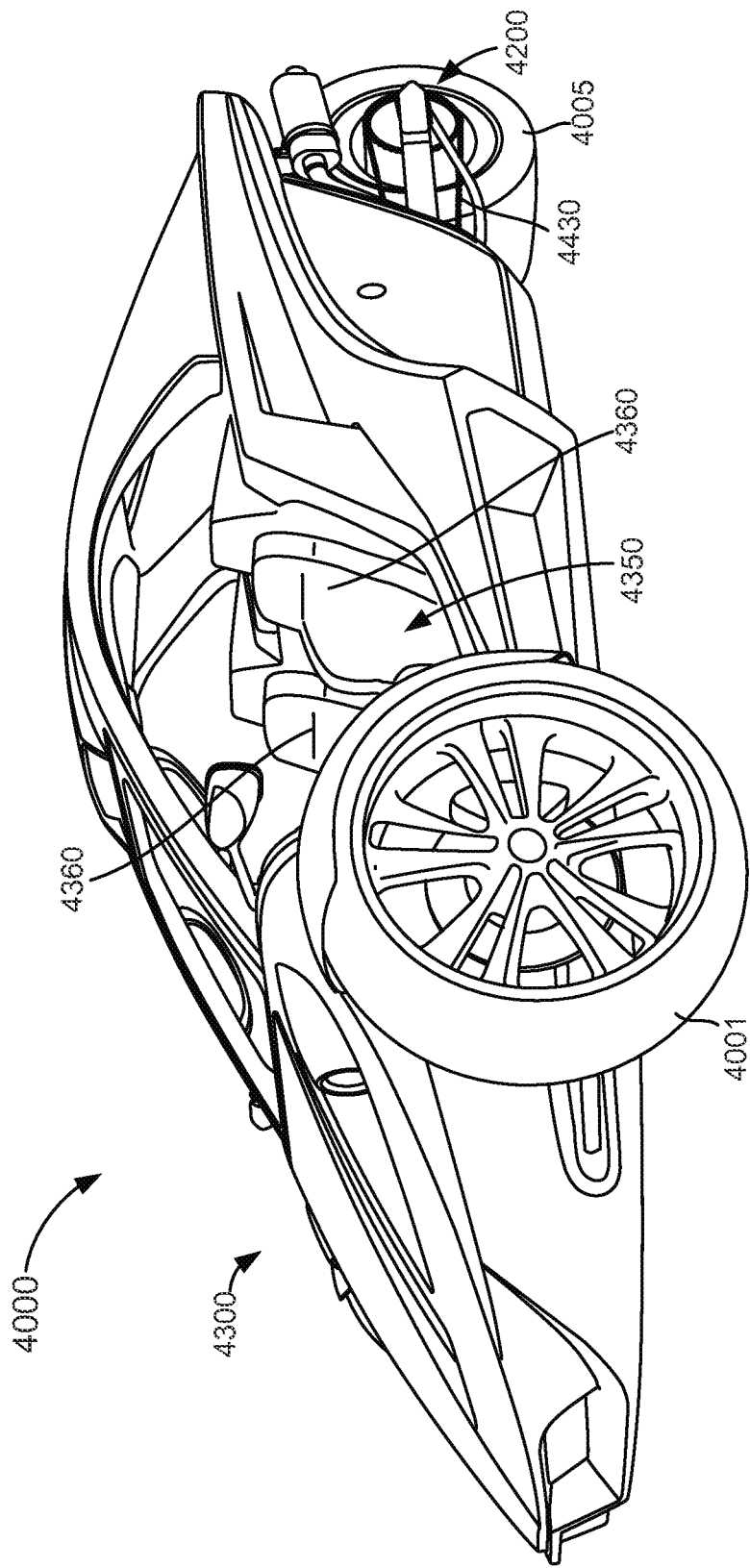
FIGS. 7-12 are a front perspective view, a rear perspective view, a side view, a top view, a front view, and a rear view, respectively, of a three-wheeled vehicle according to an embodiment.

Referring now to FIGS. 5 and 6, a schematic illustration of a vehicle is shown in a top view and a side view, respectively, according to an embodiment. Portions of the vehicle 3000 can be substantially similar to the vehicle 1000 described above with reference to FIGS. 1 and 2. Therefore, portions of the vehicle 3000 that are similar corresponding portions of the vehicle 1000 are not described in further detail.

The vehicle 3000 includes a frame 3100, a body 3300, a swing arm 3251 and a fuel tank 3460. The frame 3100 has a front portion 3110 and a rear portion 3150, and defines a longitudinal centerline $C_5$ therebetween. The frame 3100 can be coupled to any suitable system or subsystem, as described above. For example, as shown in FIG. 5, the frame 3100 is coupled to the vehicle body 3300 (also referred to herein as "body"). The body 3300 is configured to substantially enclose and/or surround at least a portion of the frame 3100. For example, in some embodiments, the body 3300 can include an exterior portion that encloses a first portion of the frame 3100 and an interior portion that encloses a second portion of the frame 3100. In such embodiments, the exterior portion of the body 3300 and the interior portion of the body 3300 can collectively enclose the frame 3100. In some embodiments, the interior portion of the body 3300 can have a seat support surface 3351, as further described herein.

The body 3300 can be any suitable shape, size, or configuration, as described in detail below with respect to specific embodiments. The body 3300 can include, define, or otherwise be coupled to any other suitable components such as, for example, doors, head lamps, luggage compartments, air intakes, suspension openings, etc. For example, in some embodiments, the front portion 3110 of the frame 3100 can be coupled to a suspension system including a left spindle and a right spindle configured to be coupled to a left wheel and a right wheel, respectively. In such embodiments, the body 3300 can define a set of openings such that a first portion of the suspension system is substantially enclosed by the body 3300 and a second portion of the suspension system is disposed outside of the body 3300. In some embodiments, the body 3300 and/or the frame 3100 can include a firewall or other suitable structure (not shown in FIGS. 3 and 4) configured to separate an operator (e.g., at the front portion 3110 of the frame 3100) from a portion of the drive train (e.g., an engine at the rear portion 3150 of the frame 3100).

The front portion 3110 of the frame 3100 includes a seat support structure 3120 configured to be coupled to and/or support a seat 3360. In some embodiments, the seat support structure 3120 can include any suitable structure configured to support both a seating portion and a back rest portion of the seat 3360 and/or a portion of the body 3300 to which the seat 3360 is coupled. In some embodiments, the seat 3360 can be supported by and/or coupled to the seat support structure 3120 via an intervening structure. For example, as shown in FIG. 6, the body includes a seat support surface 3351 disposed between the seat support structure 3120 and the recumbent seat 3360. In some embodiments, the seat support surface 3351 can provide a mounting location for a set of slide assemblies such that the seat 3360 can slide relative to the seat support surface 3351 along the longitudinal centerline $C_5$ of the frame 3100.

The rear portion 3150 of the frame 3100 is coupled to the swing arm 3251 and the fuel tank 3460. The swing arm 3251 can be rotatably coupled to the rear portion 3150 of the frame 3100, as described above with reference to the swing arm 3251 shown in FIGS. 1 and 2. Moreover, the swing arm 3251 includes a wheel mounting portion 3253 defining a radial axis $R_3$ that is coupled to a wheel assembly 3280. As described above, the wheel mounting portion 3253 is arranged relative to the frame 3100 such that the radial axis $R_3$ defined by the wheel mounting portion 3253 is substantially aligned with the longitudinal centerline $C_5$ of the frame 3100, as shown in FIG. 5. Said another way, the longitudinal centerline $C_5$ of the frame 3100 can be thought of as defining a plane of symmetry between a left side of the frame 3100 and a right side of the frame 3100 (as shown in FIG. 5) and the radial axis $R_3$ defined by the wheel mounting portion 3253 is substantially parallel with the plane of symmetry. In this manner, the swing arm 3251 and/or the wheel mounting portion 3253 are laterally centered at the rear portion of the frame 3100.

The fuel tank 3460 can be any suitable shape, size, or configuration. For example, in some embodiments, the size and shape of the fuel tank 3460 can correspond to the space constraints of the vehicle 3000. The fuel tank 3460 is positioned relative to the body 3300 such that the fuel tank 3460 is disposed above a plane $S_1$ defined by the seat support surface 3351. Moreover, in some embodiments, the fuel tank 3460 can be disposed behind a seat back surface (not shown in FIGS. 5 and 6) of the body 3300. Thus, in some embodiments, the fuel tank 3460 is configured to be rearward of an interior portion of the body 3300. Although shown as being coupled to the rear portion 3150 of the frame 3100, in other embodiments, the fuel tank 3460 can be coupled any other suitable portion of the frame 3100.

As shown in FIG. 6, the fuel tank 3460 is coupled to the frame 3100 such that the fuel tank 3460 is above a longitudinal centerline $C_6$ defined by the swing arm 3251. Similarly stated, the fuel tank 3460 is disposed above a line that can extend from the center of the wheel mounting portion 3253 to a center of a pivot point defined by the rotatable coupling of the swing arm 3251 to the frame 3100. In other embodiments, however, the fuel tank 3460 can be disposed above the plane $S_1$ defined by the seat support surface 3351, yet have at least a portion below the longitudinal centerline $C_6$ defined by the swing arm 3251.

Although the fuel tank 3460 is shown as being disposed within the frame 3100 of the vehicle 3000, in some embodiments, all or a portion of the fuel tank 3460 can be disposed outside of the frame 3100 while being coupled thereto. For example, in some embodiments, the fuel tank 3460 can be an integral part of or coupled to the body 3300 such that when the body 3300 is coupled to the frame 3100, at least a portion of the fuel tank 3460 is disposed outside of the frame 3100.

In some embodiments, a seat support surface of a body, such as the seat support surface 3351 can be a substantially planar surface. In this manner, one or more recumbent seats can be disposed within an interior portion of the vehicle and can be slidably coupled to the seat support surface via a sliding adjustment assembly or the like. By allowing for an adjustable recumbent seat, a foot pedal arrangement can be fixedly coupled to a portion of the frame and/or body. Thus, the need for adjustable foot pedals in vehicles according to the embodiments described herein is obviated. Moreover, by allowing the foot pedals to be fixed relative to the frame, in some embodiments, the foot pedals can be hung from an upper support of the frame and allowed to extend into a desired location. In this manner, the foot pedal assembly can be substantially similar to known arrangements in some four-wheeled automobiles, thus, the need for custom parts and/or arrangements is reduced.

Figure 21:
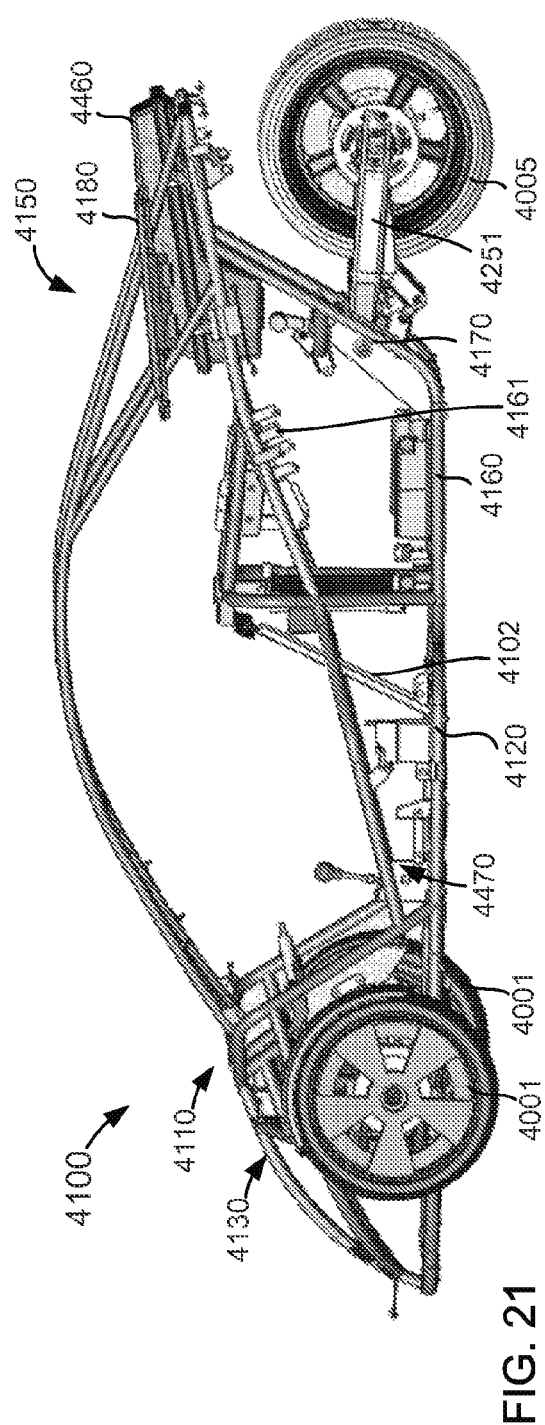
FIG. 21 is a left side view and FIG. 22 is a right side view of a frame of the three-wheeled vehicle illustrated in FIGS. 7-12.
Figure 22:
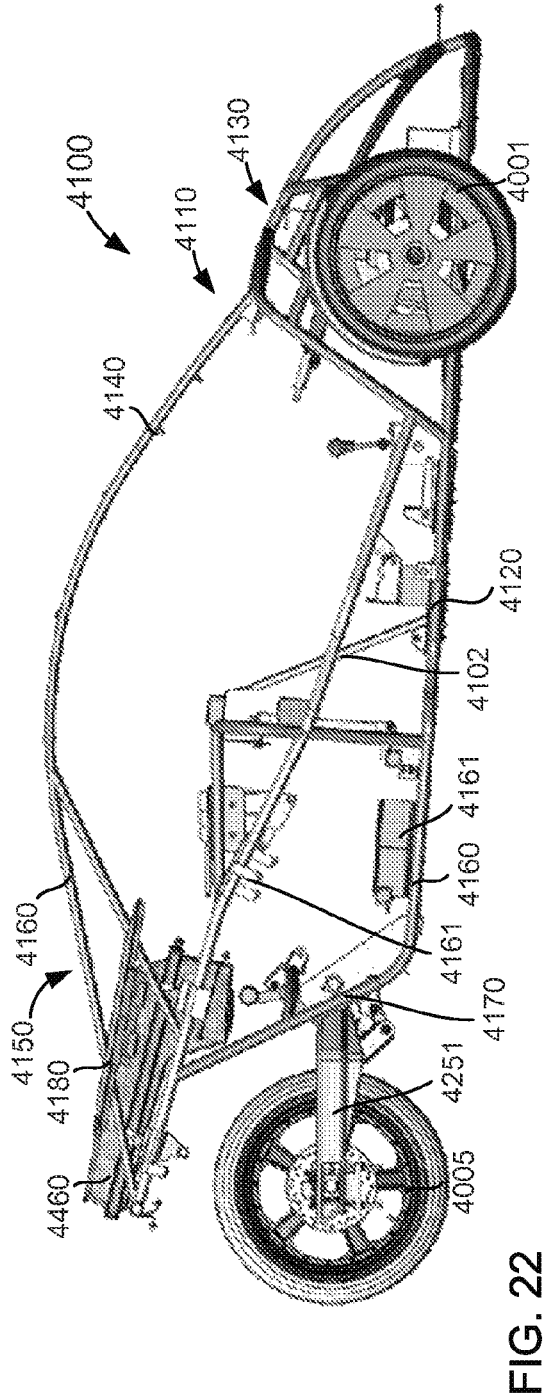
Figure 23:
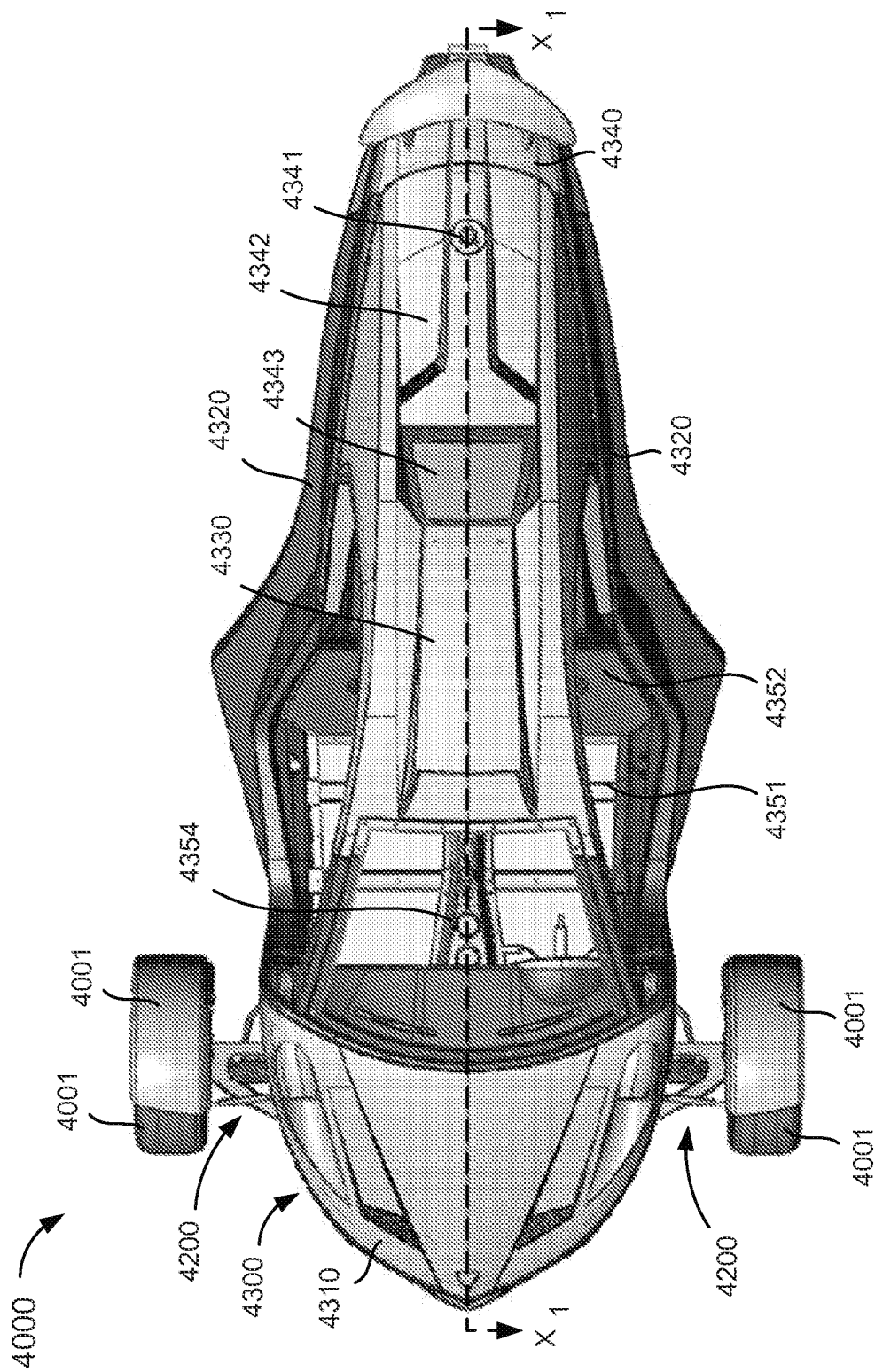
FIG. 23 is a top view of the three-wheeled vehicle of FIGS. 7-12.
Figure 24:
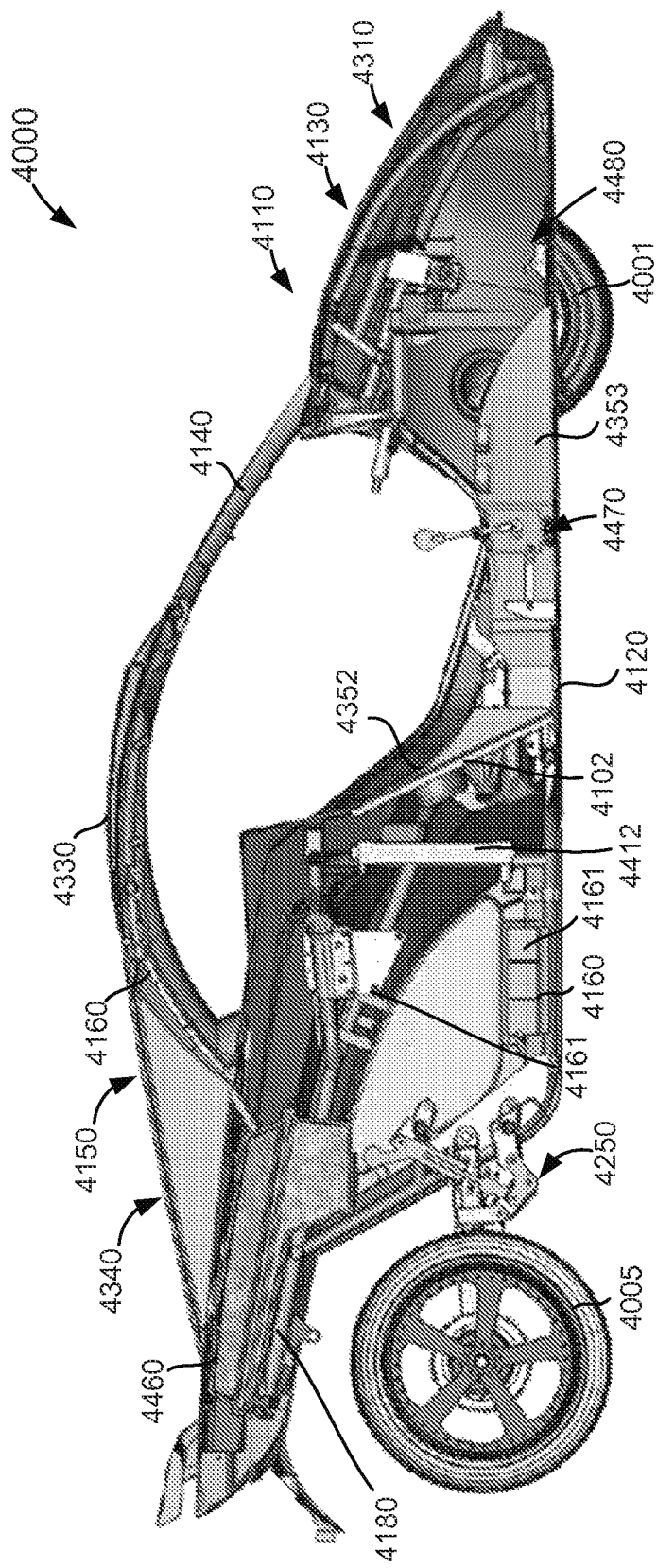
FIG. 24 is a cross-sectional side view of the three-wheeled vehicle taken along the line $X_1$-$X_1$ in FIG. 23.
Figure 25:
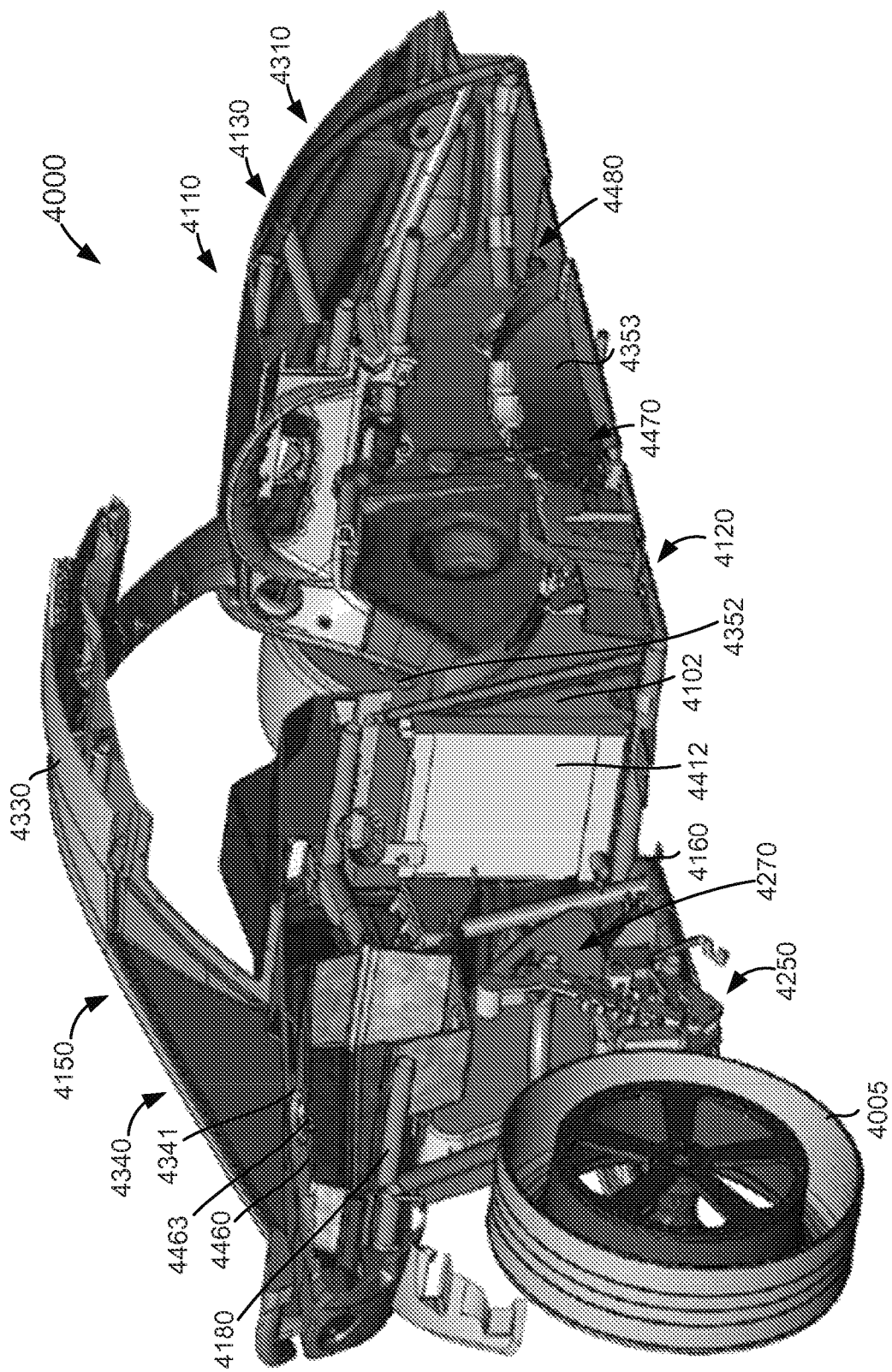
FIG. 25 is a cross-sectional perspective view of the three-wheeled vehicle taken along the line $X_1$-$X_1$ in FIG. 23.
Figure 26:
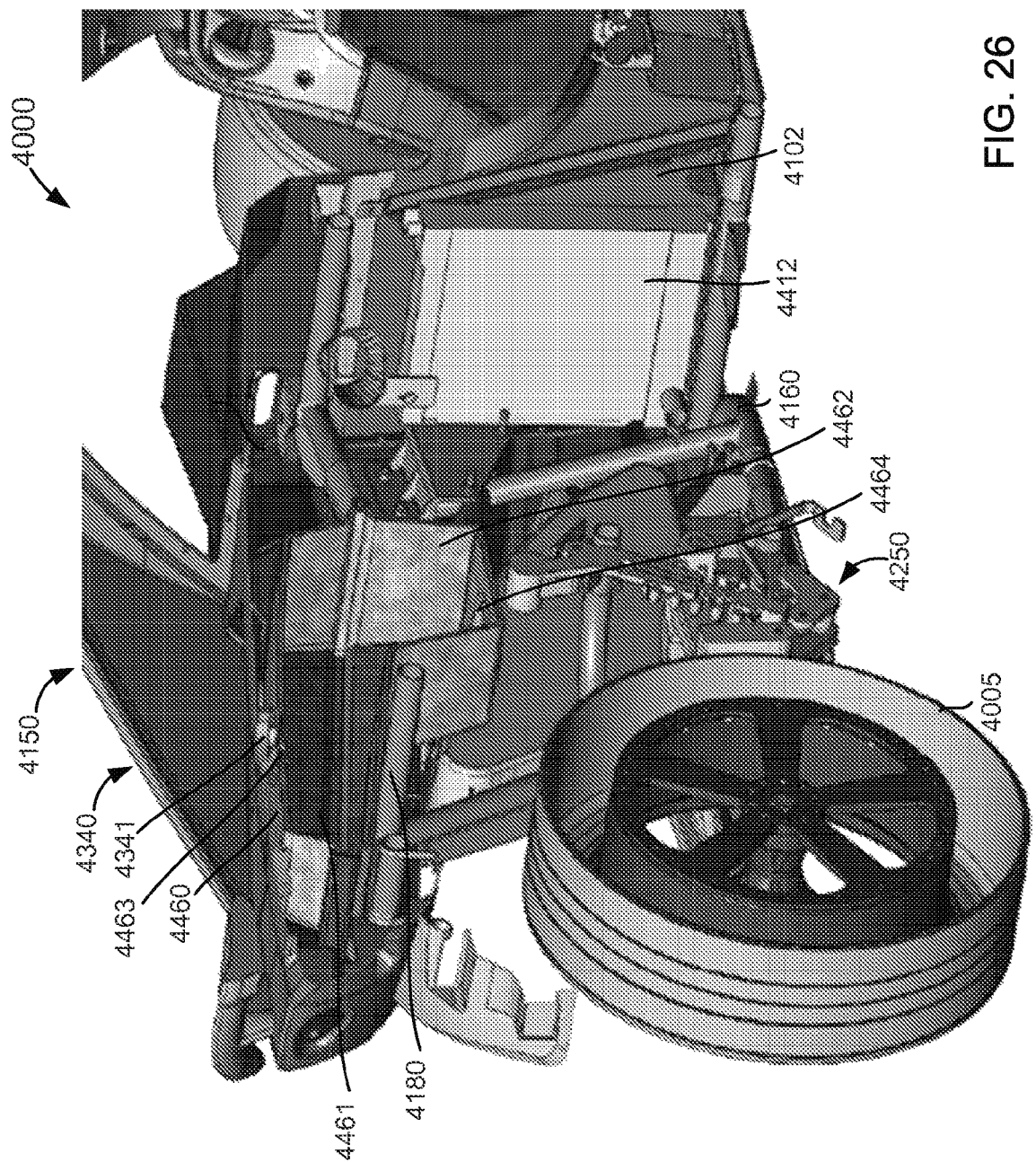
FIG. 26 is an enlarged view of a portion of the cross-sectional view of three-wheeled vehicle shown in FIG. 25.

FIGS. 7-48 show a three-wheeled vehicle 4000, according to an embodiment. FIGS. 7-12 are general views of the vehicle 4000. The vehicle 4000 includes a body 4300 (see e.g., FIGS. 13-20), a frame 4100 (see e.g., FIGS. 21-29), multiple suspension systems 4200 (see e.g., FIGS. 28-40 showing a rear suspension system and a front wheel suspension system), and a drive train (see e.g., FIGS. 41-48). As shown in FIGS. 7-12, the vehicle 4300 is in a reverse-trike configuration, having two front wheels 4001 and a rear wheel 4005. The body 4300 of the vehicle 4000 is configured to be disposed about and/or coupled to at least a portion of the frame 4100 (not shown in FIGS. 7-12, see e.g., FIGS. 21 and 22 showing the frame 4100). As described in further detail herein, the body 4300 defines a cabin portion 4350 within which a pair of side-by-side recumbent seats 4360 is mounted. The cabin portion 4350 is configured to substantially enclose and/or surround the recumbent seats 4360 such that a passenger(s) sitting on the recumbent seat(s) 4360 is isolated from, for example, at least a portion of the suspension system 4200 and/or at least a portion of the drive train 4400.

As shown in FIGS. 7-12, the vehicle 4000 is configured such that the drive train 4400 is disposed substantially rearward of the cabin portion 4350 of the body 4300. More specifically, an engine 4410 and transmission 4420 (not shown in FIGS. 7-12) are disposed rearward of the cabin portion 4350 of the body 4300. Furthermore, the vehicle 4000 is a rear wheel drive vehicle and includes a drive chain 4430 configured to operably couple the drive train 4400 (e.g., via the transmission 4420) to the rear wheel 4005, as further described herein.

Figure 8:
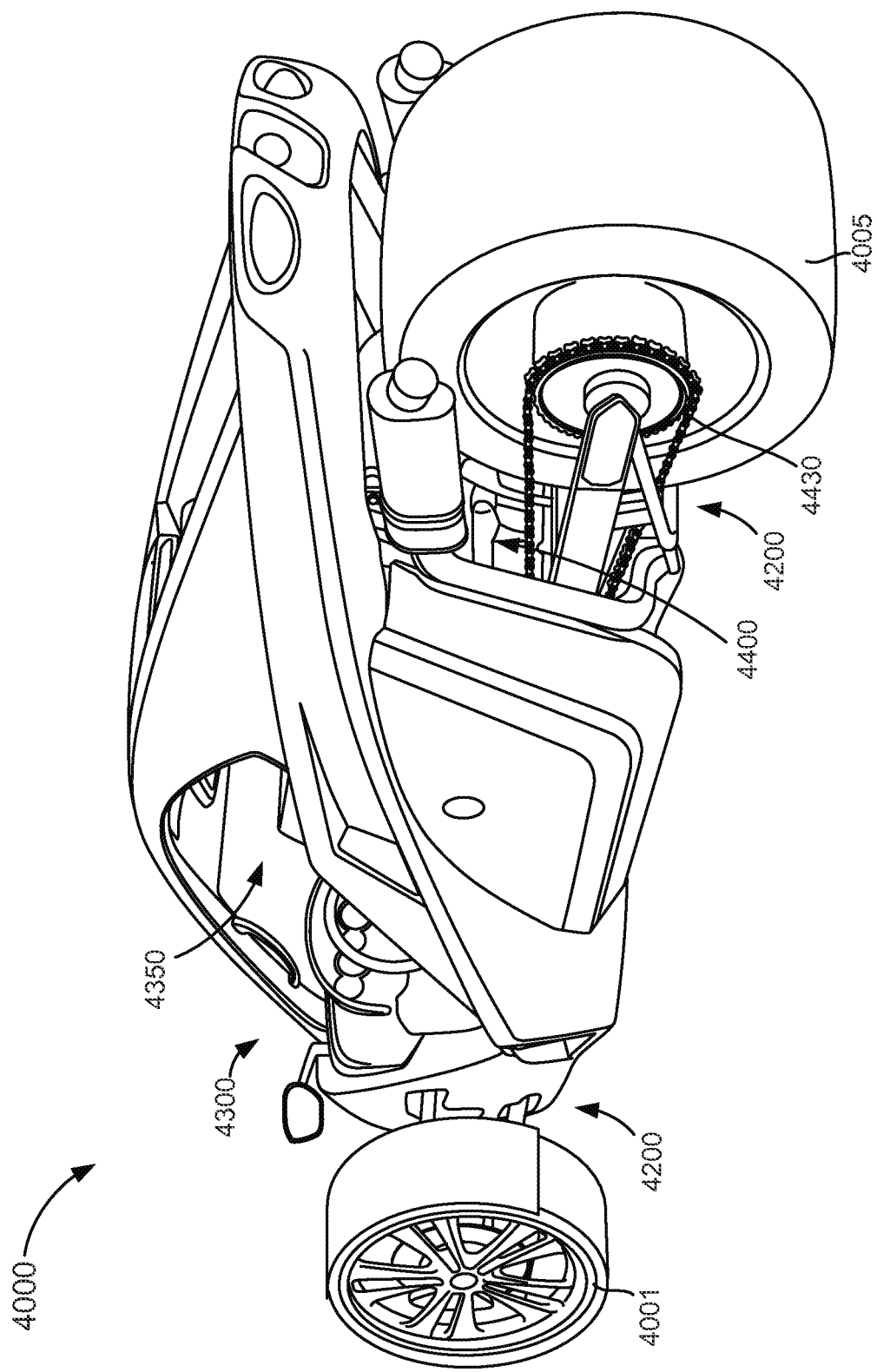
Figure 9:
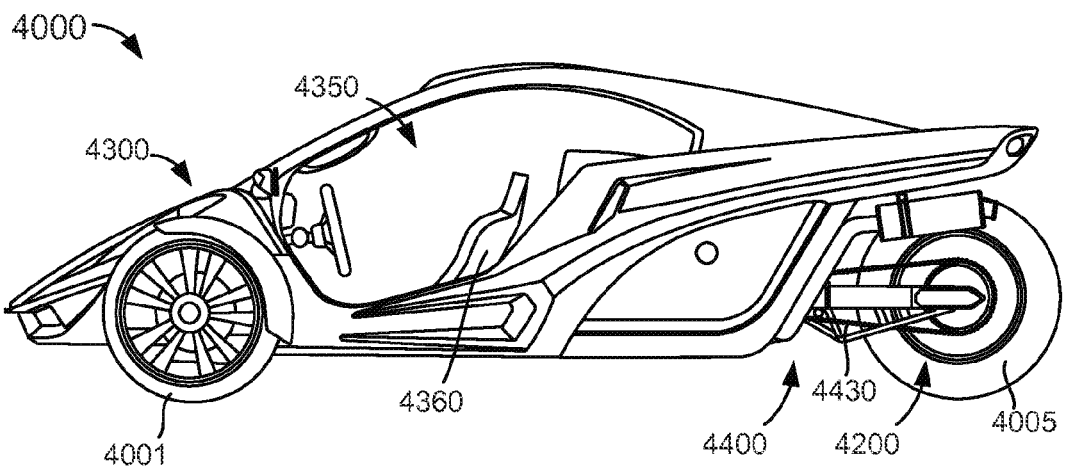
Figure 10:
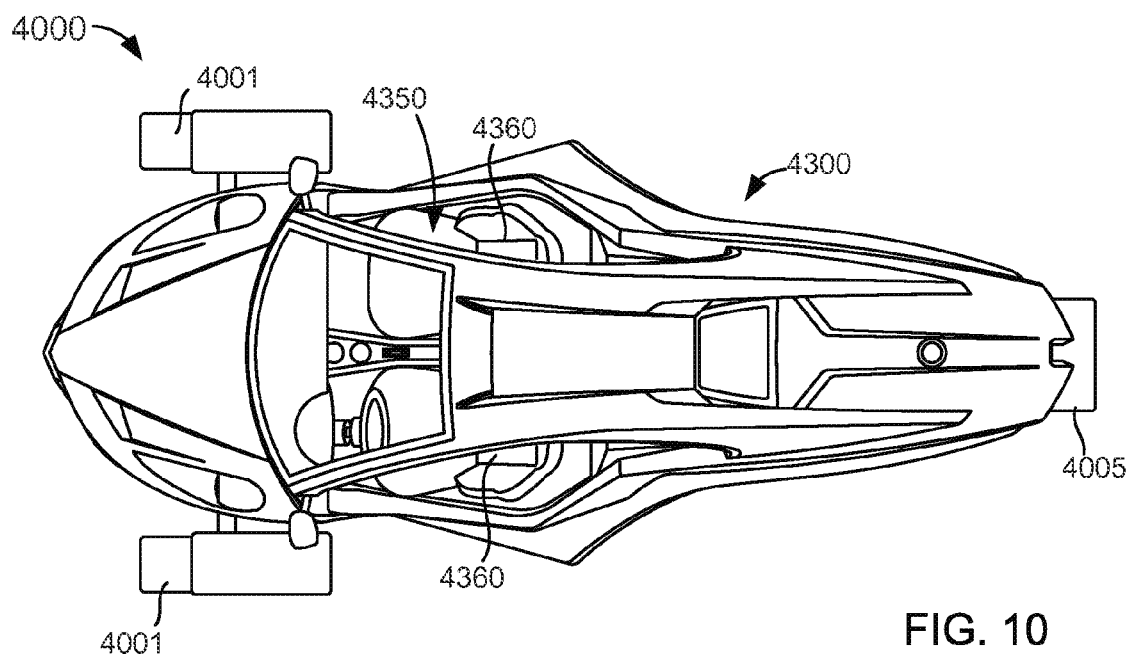
Figure 11:
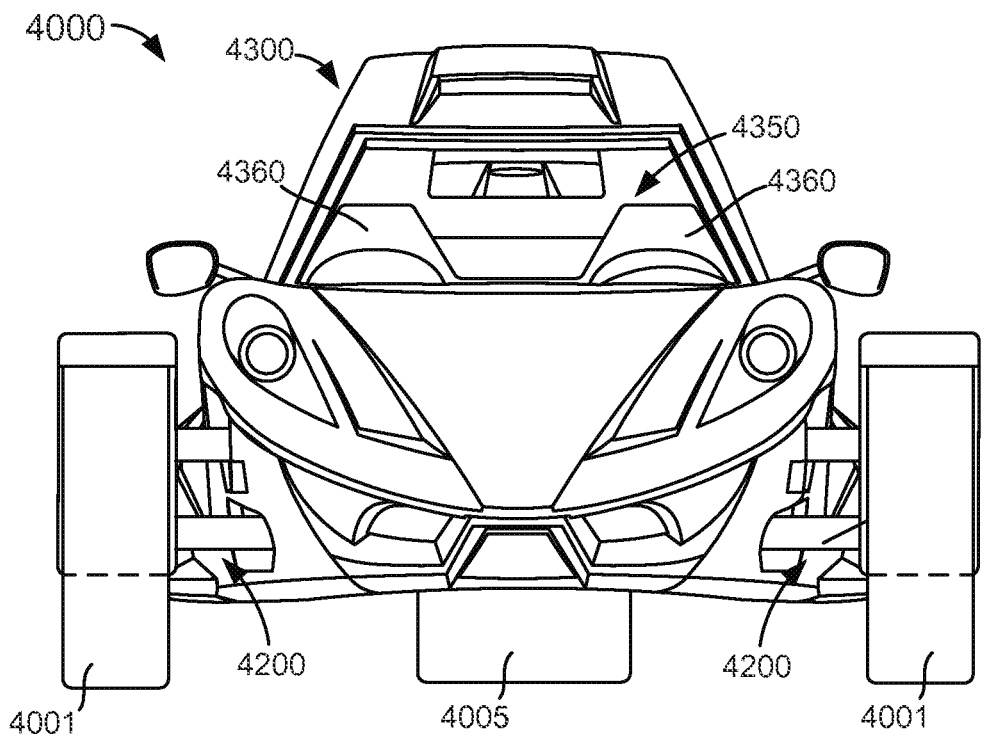
Figure 12:
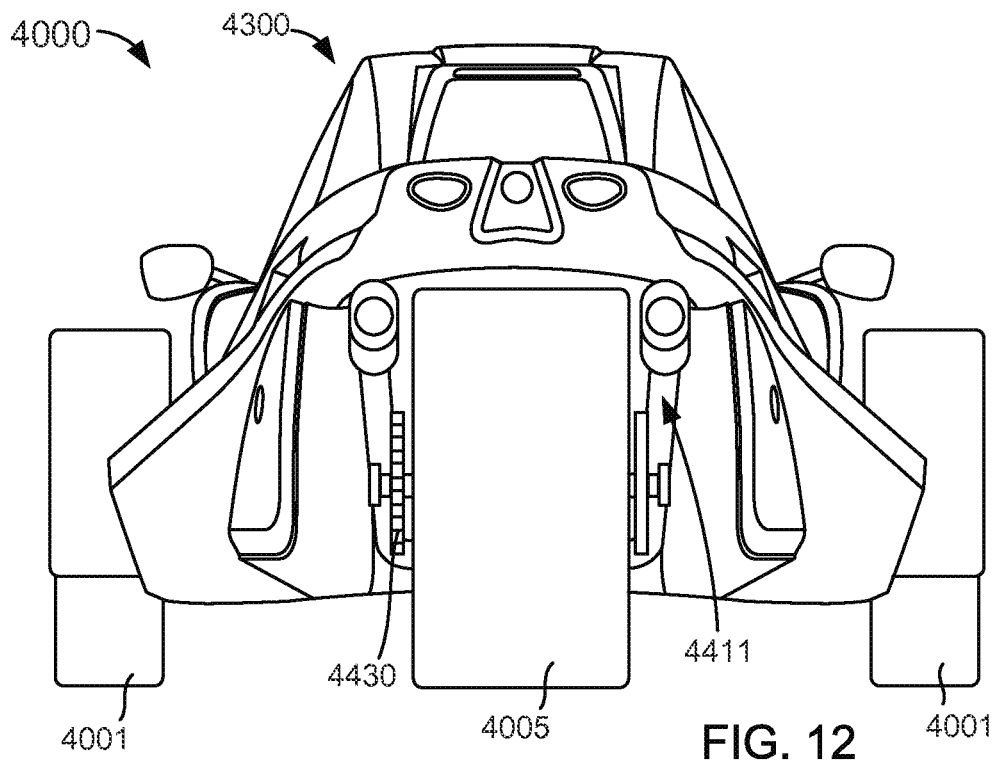

As shown in FIGS. 8 and 11, a portion of the suspension system 4200 is configured to be disposed within and/or covered by the body 4300 and a second portion of the suspension 4200 is disposed substantially outside of the body 4300. In this manner, the suspension system 4200 can be coupled to, for example, the front wheels 4001 and can be at least operably coupled to driving controls disposed within the cabin portion 4350 such that an operator sitting therein (e.g., on the recumbent seat 4360) can engage the driving controls to operate the vehicle 4000.

Referring now to FIGS. 13-20, the body 4300 of the vehicle 4000 includes a front portion 4310, two side portions 4320, a roof portion 4330, and a rear portion 4340, and defines the cabin portion 4350. The body 4300 can be any suitable shape, size, or configuration and can be formed from any suitable material or combination of materials. For example, in some embodiments, the body 4300 can be formed from fiberglass. In other embodiments, the body 4300 can be, for example, a plastic, a composite, or any other moldable material such as carbon fiber or the like. In some embodiments, the body 4300 can be formed substantially unitarily where at least the front portion 4310, the side portions 4320, the roof portion 4330, and the rear portion 4340 are formed monolithically. In such embodiments, the cabin portion 4350 can be formed independently of the other portions and can be coupled thereto. In other embodiments, the body 4300 can be formed in any suitable sections that can be coupled together to form the body 4300.

Figure 13:
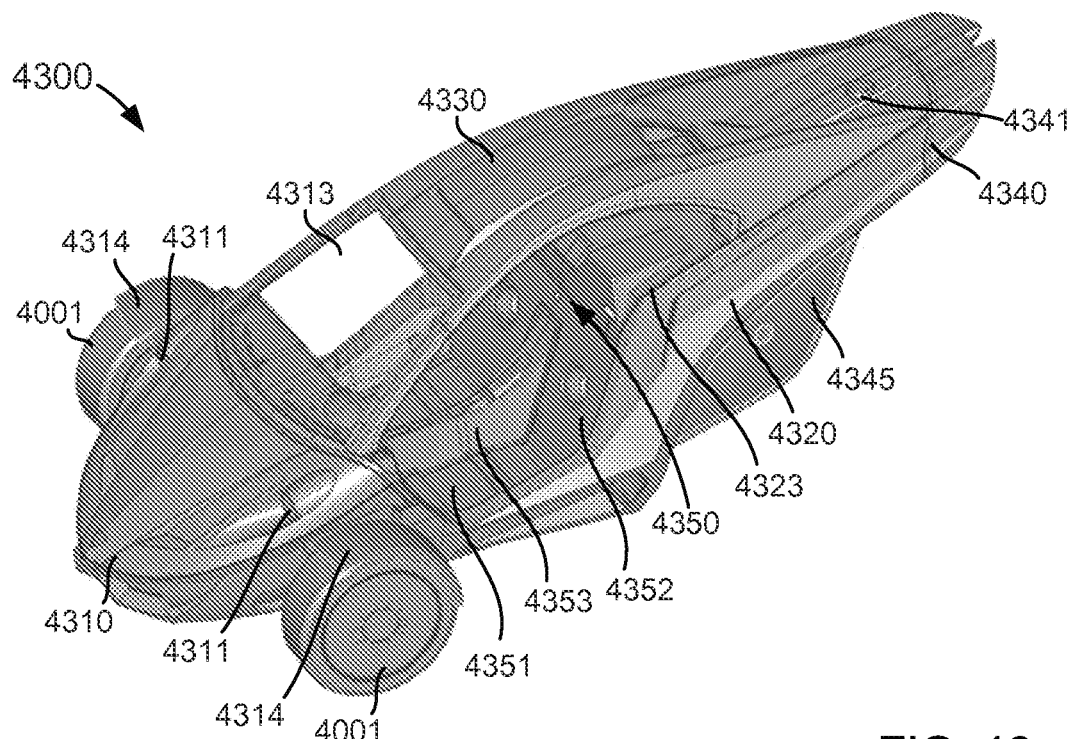
FIGS. 13-20 are various views of a body of the three-wheeled vehicle illustrated in FIGS. 7-12.
Figure 14:
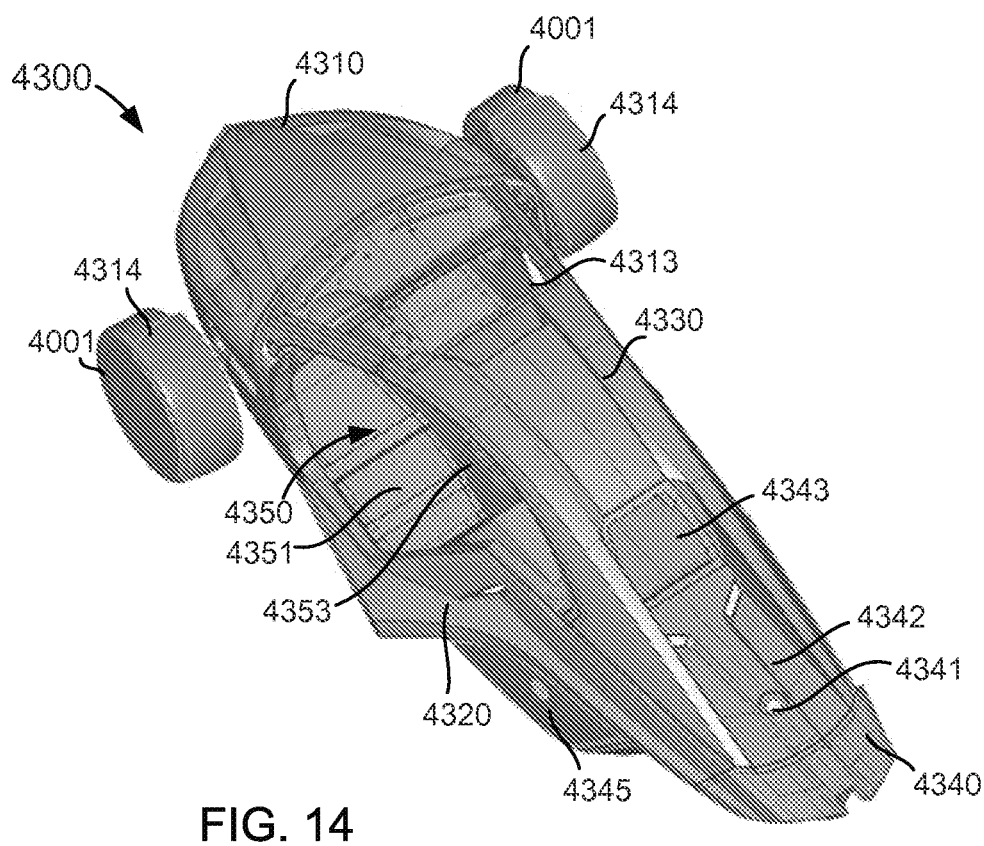
Figure 32:
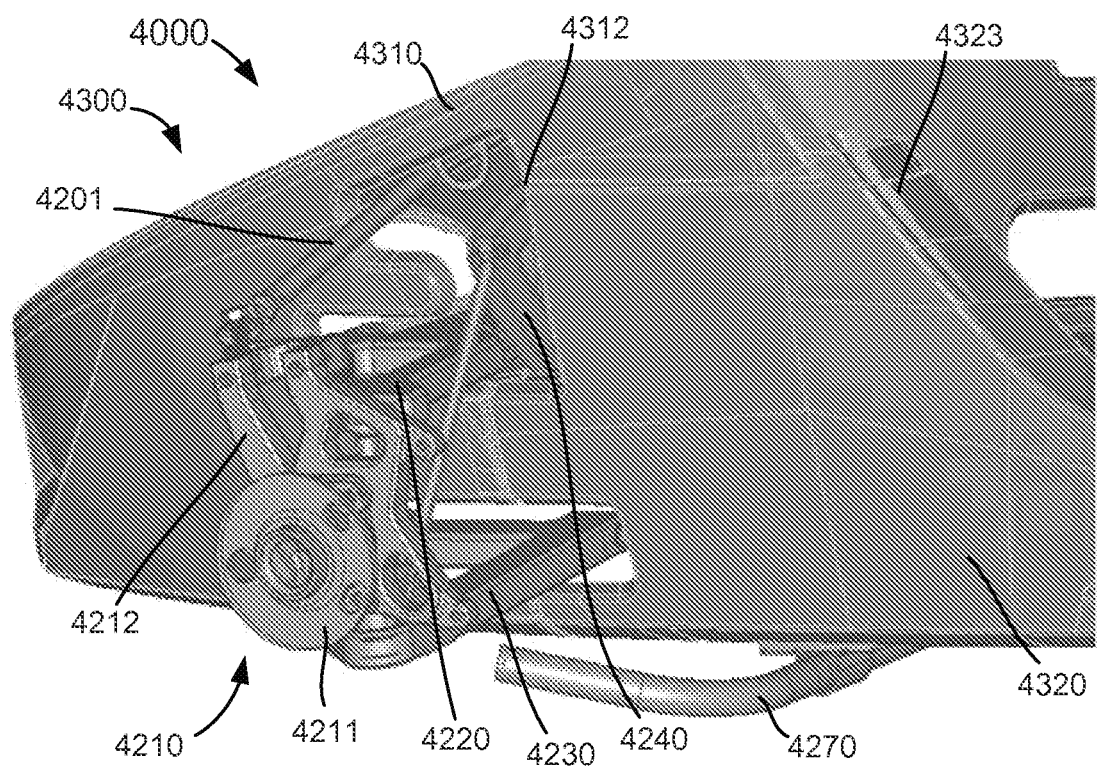
Figure 33:
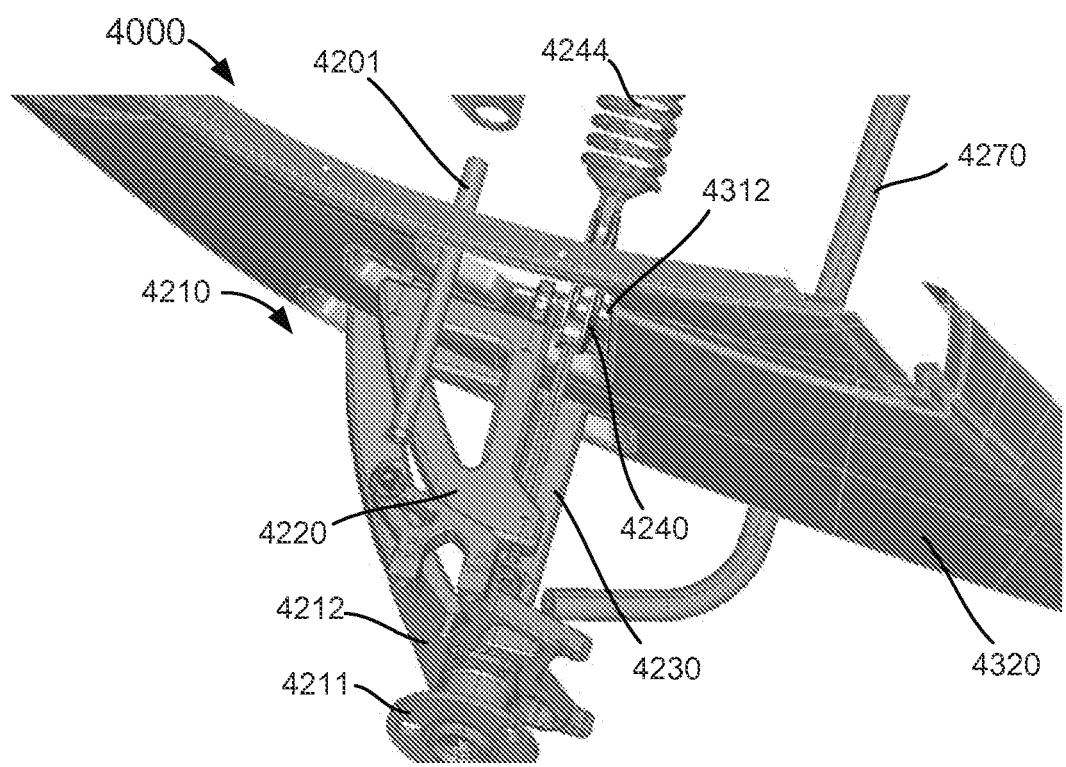
Figure 34:
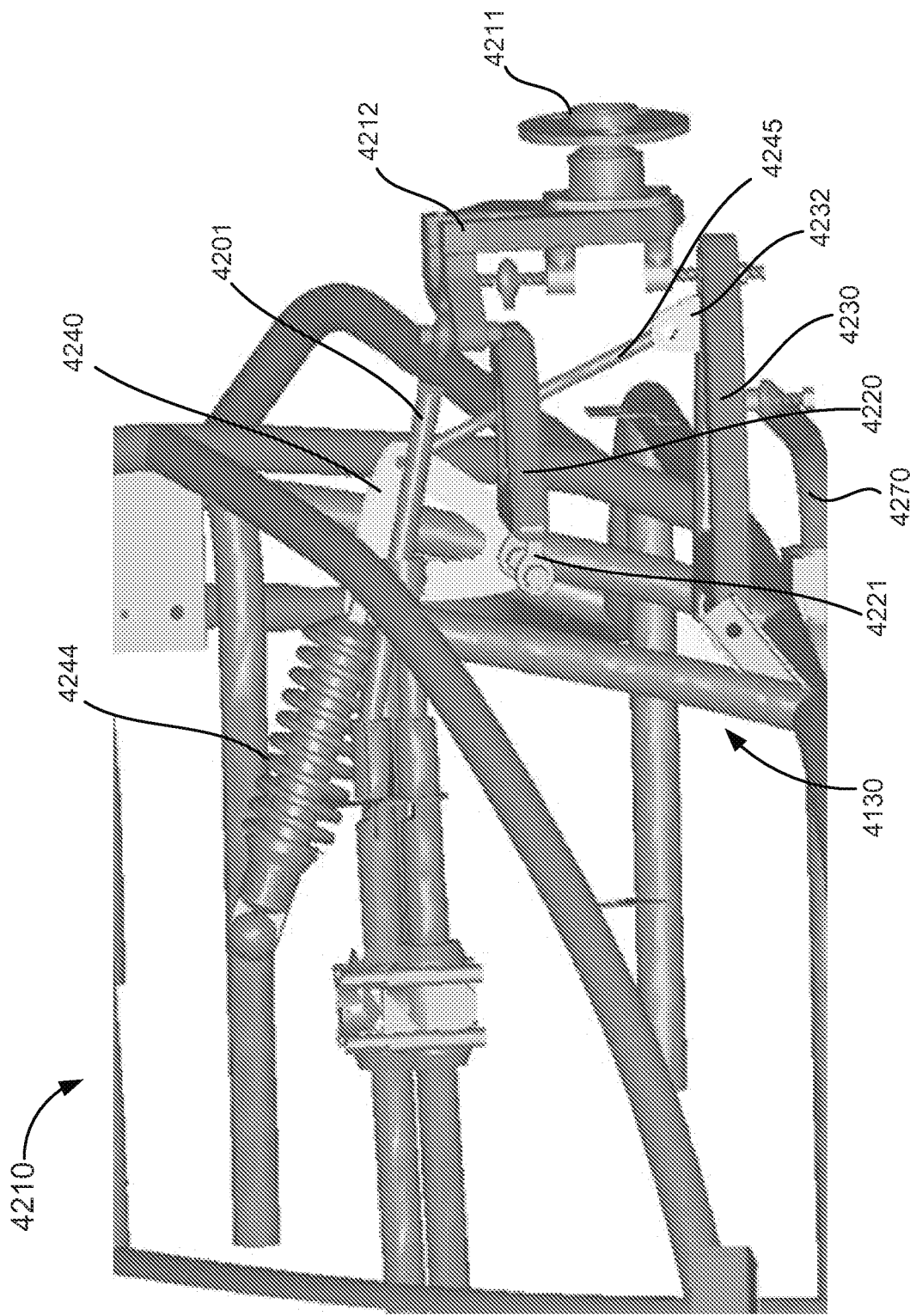
Figure 35:
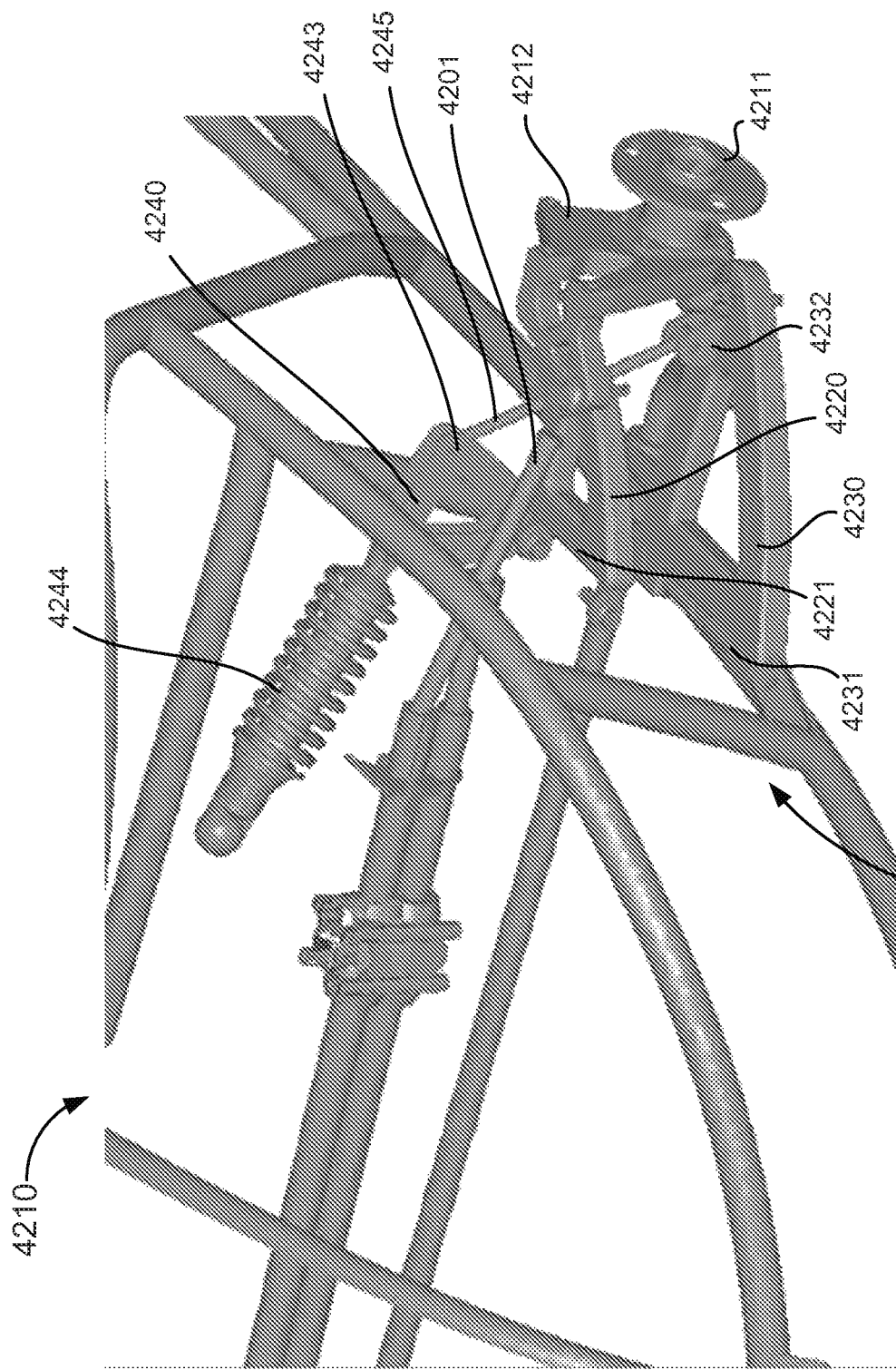
Figure 36:
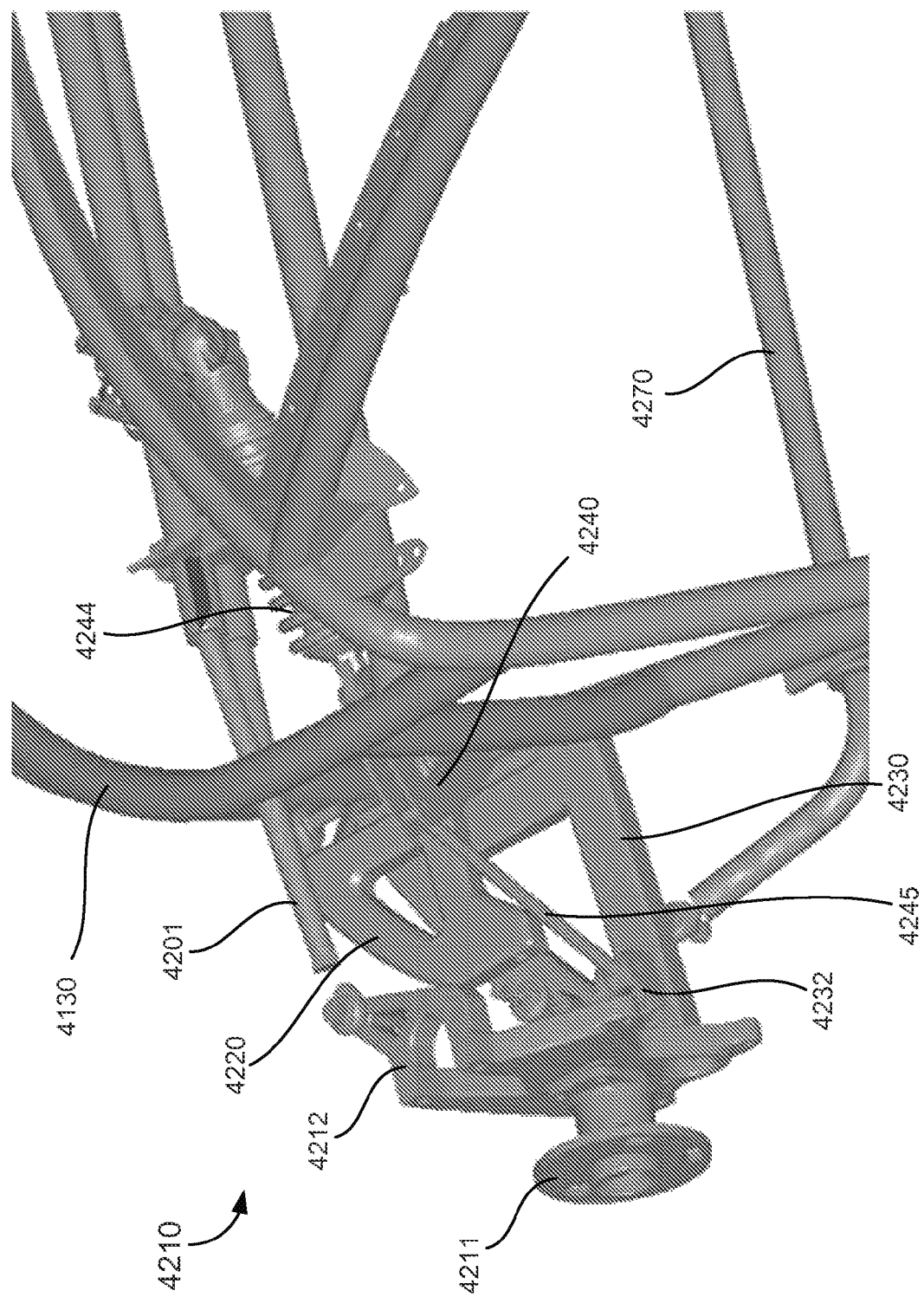
Figure 37:
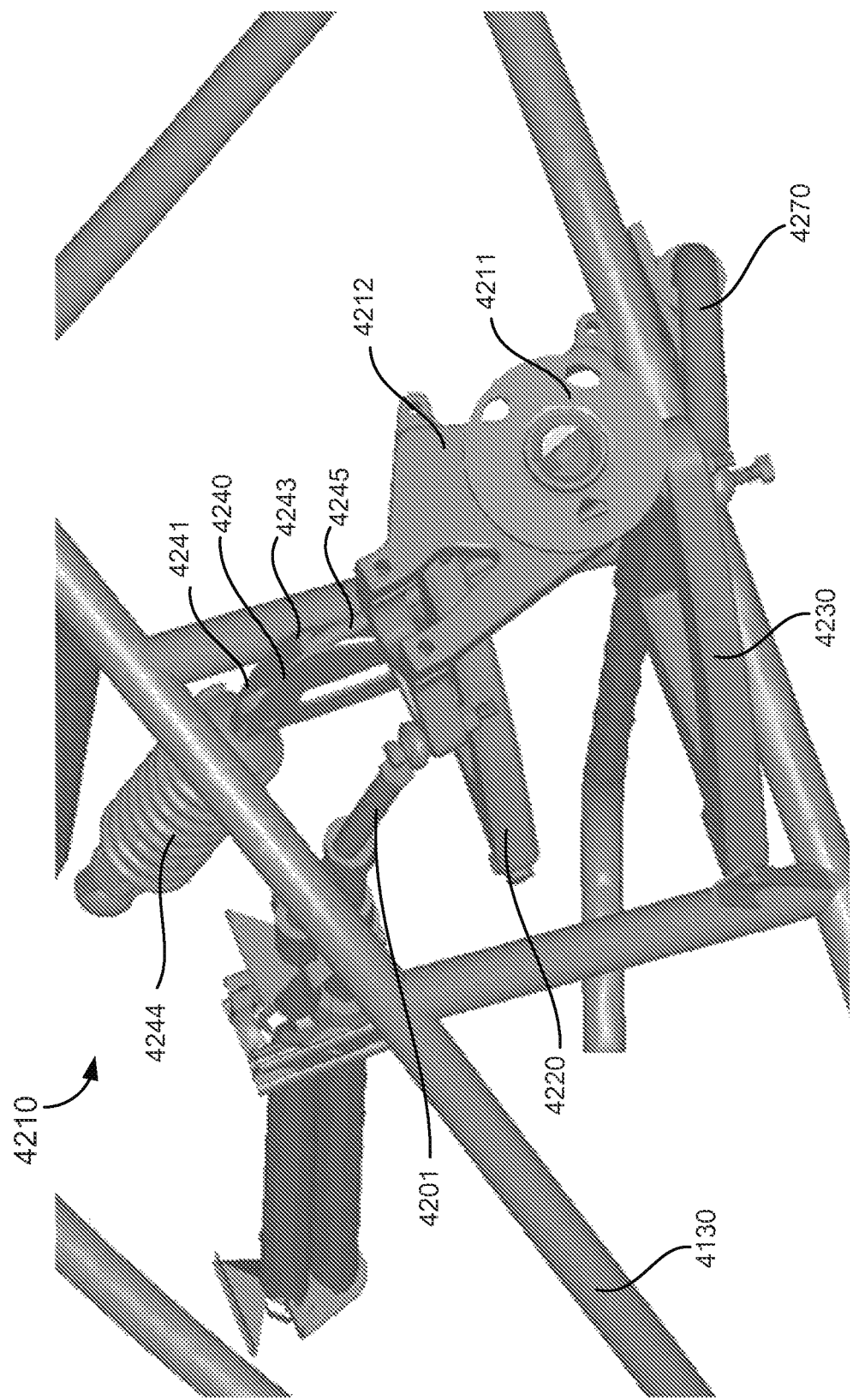
Figure 38:
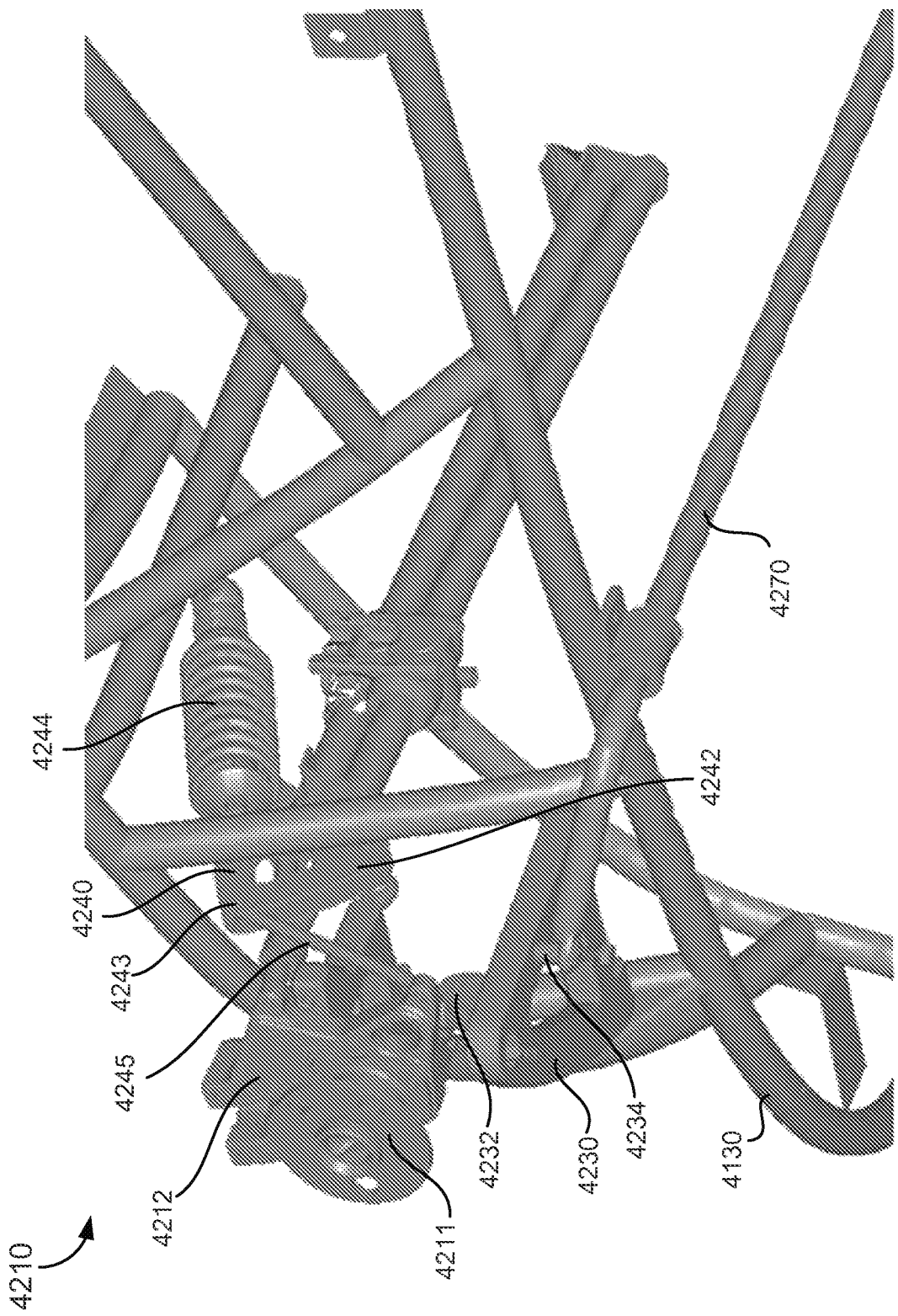
Figure 39:
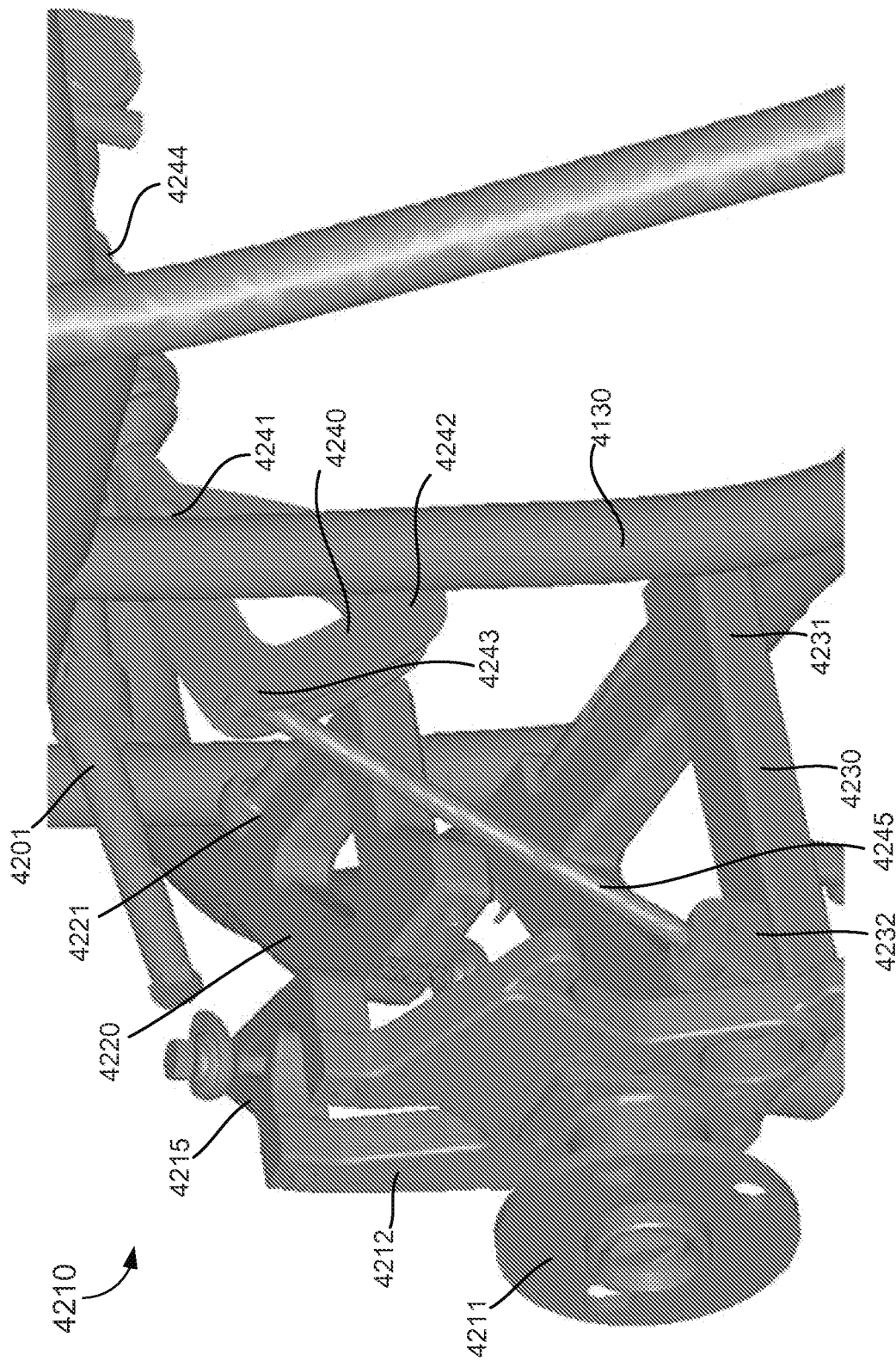
Figure 40:
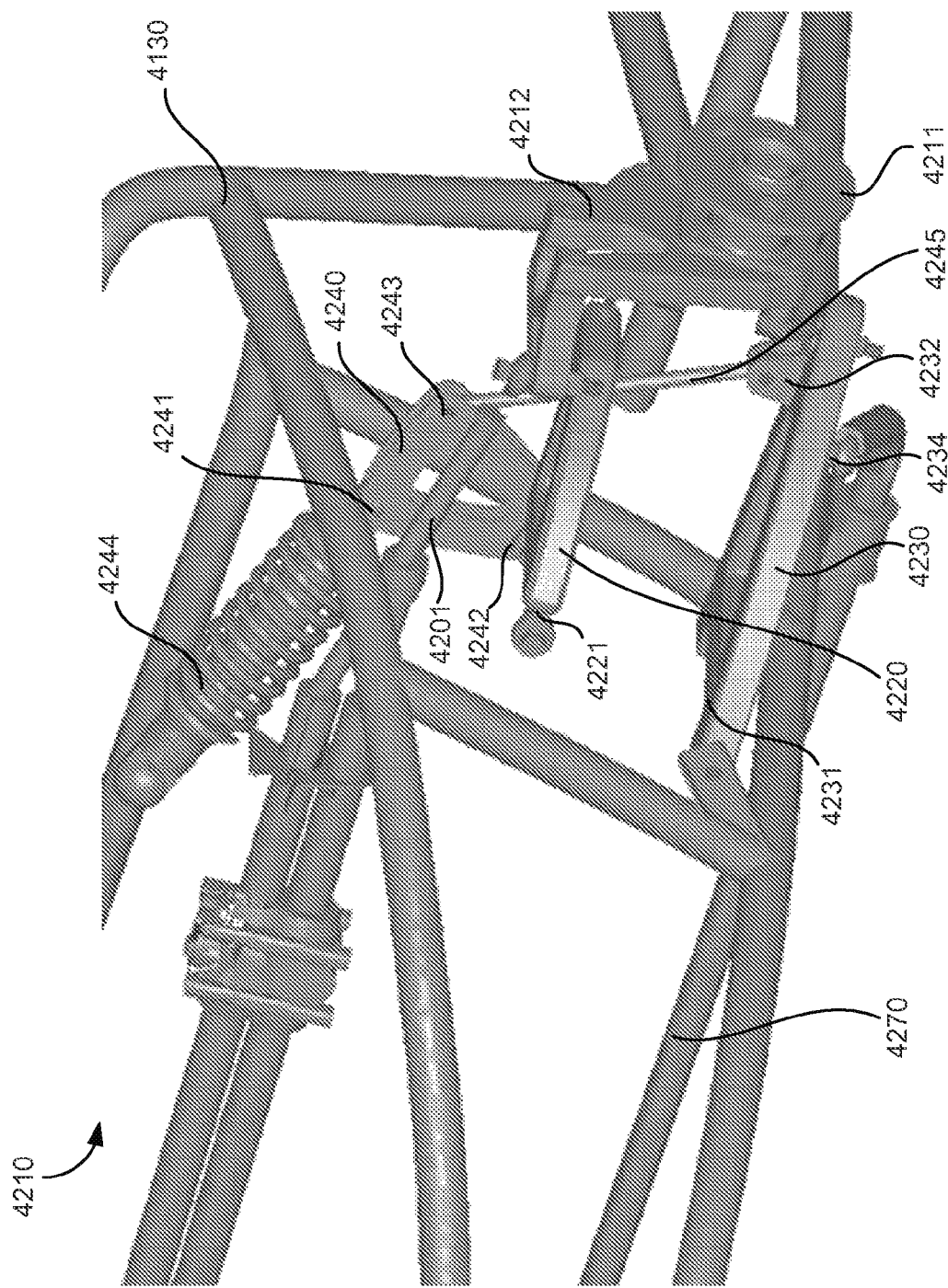
Figure 41:
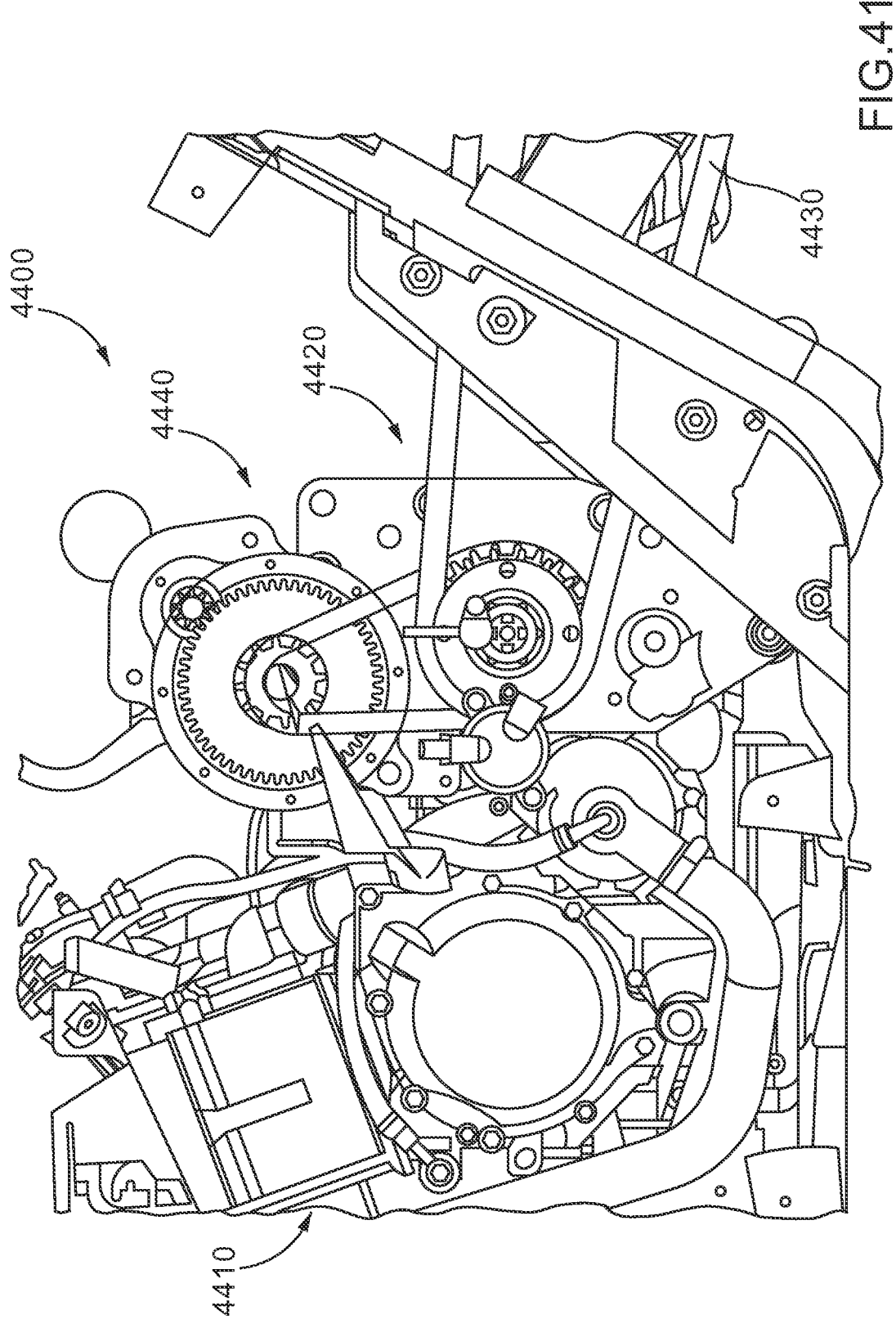
FIG. 41 is a side view of a drive train system, according to an embodiment, included in the three-wheeled vehicle of FIGS. 7-12.
Figure 42:
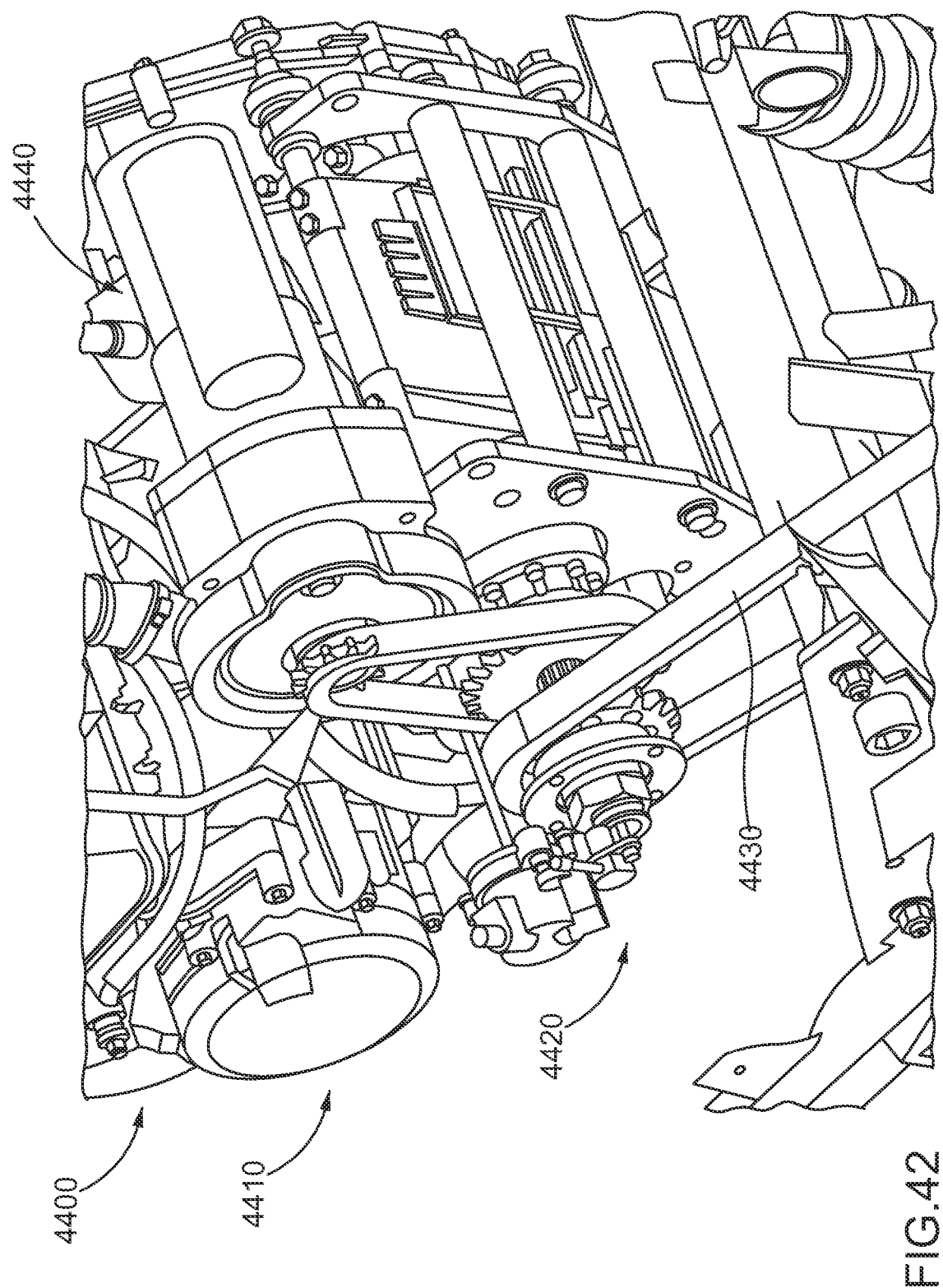
FIG. 42 is a perspective view of the drive train system shown in FIG. 41.

The front portion 4310 of the body 4300 is disposed at a forward position relative to the cabin portion 4350 (e.g., FIGS. 13 and 14). More specifically, the front portion 4310 includes a windshield 4313 that is configured to form a forward boundary of the cabin portion 4350. The windshield 4313 can be formed of any suitable material. For example, in some embodiments, the windshield 4313 can be formed from poly(methyl methacrylate) (e.g., plexiglass) or the like. In other embodiments, the windshield 4313 can be formed of a similar material as known windshields (e.g., as commonly found in four-wheeled automobiles). The front portion 4310 of the body 4300 further includes a set of headlights 4311 (identified in FIG. 13), and a set of fenders 4314. The fenders 4314 are disposed above at least a portion of the front wheels 4001. The front portion 4310 of the body 4300 also defines a set of suspension openings 4312 (i.e., a first opening 4312 defined by a driver's side of the front portion 4310 and a second opening 4312 defined by a passenger's side of the front portion 4310, as shown in FIG. 32) configured to receive a portion of the suspension system 4200, as further described herein.

Figure 15:
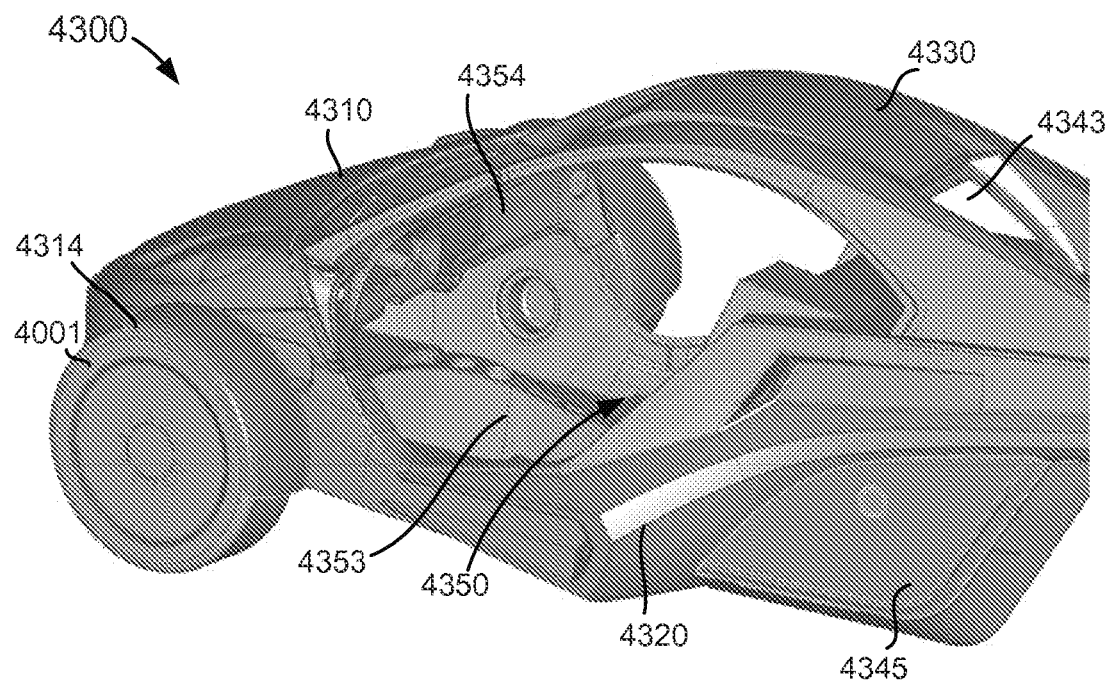
Figure 16:
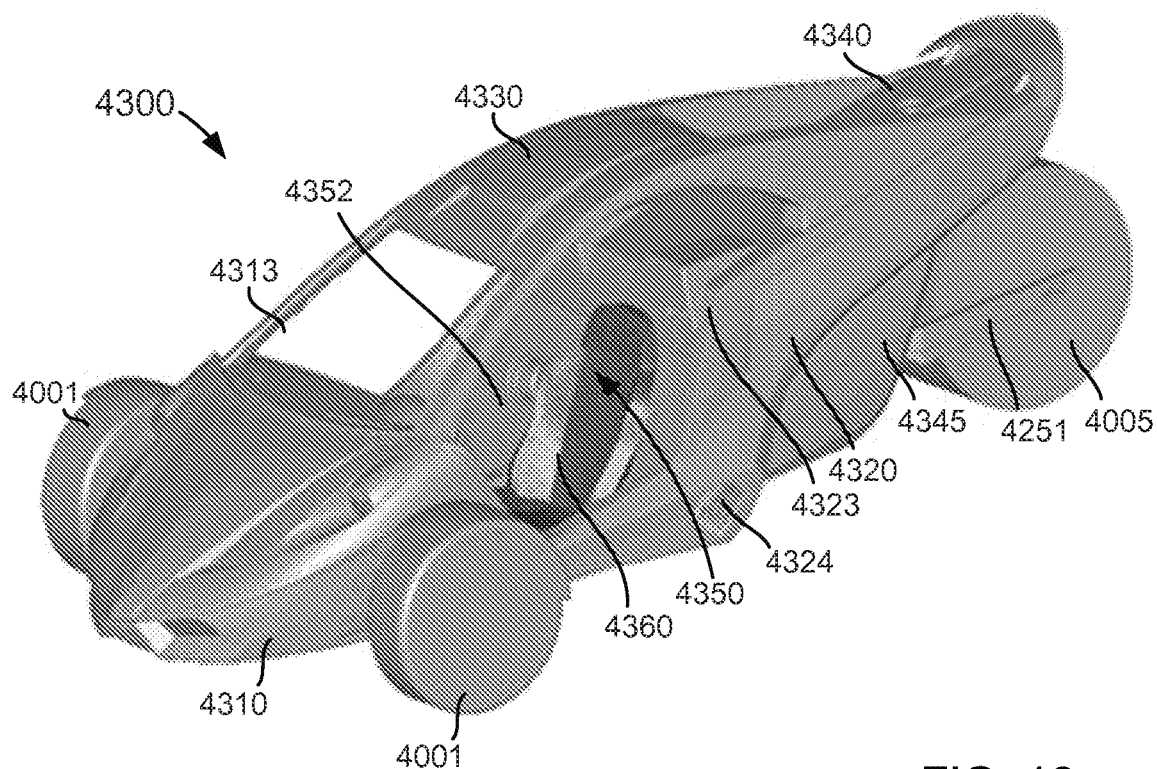

The side portions 4320 of the body 4300 extend from the front portion 4310 to the back portion 4340 of the body 4300 (e.g., FIGS. 15 and 16). In this manner, the side portions 4320 are configured to form the side (e.g., a driver's side and a passenger's side) boundaries of the cabin portion 4350. Moreover, the side portions 4320 each define an entrance opening 4323 that allow access to the cabin portion 4350. In some embodiments, the openings 4323 can each receive a door (not shown in FIGS. 7-48) such that the cabin portion 4350 can be substantially entirely enclosed. While not shown in FIGS. 7-48, the vehicle 4000 can include any suitable style of doors. For example in some embodiments, the doors can be similar in function to those commonly found on four-wheeled automobiles where opening of the door includes pivoting the door about a substantially vertical axis. In other embodiment, the vehicle 4000 can include doors that pivot on or about a substantially horizontal axis (e.g., "gull wing doors"). In other embodiments, the vehicle 4000 can include doors configured to move in more than one direction such as, for example, "scissor doors." In such embodiments, the door can be coupled to the side portion 4320 via a mounting assembly that includes an adjustable hinge, one or more stiffening members and/or a gas strut. In some embodiments, the door can include a vent disposed at the bottom portion of the door.

The side portions 4320 each include and/or define an air duct 4324. The air duct 4324 can include any suitable grate, cover, or plenum such that the air ducts 4324 define a flow path within which air can flow towards a portion of the drive train 4400. For example, in some embodiments, the air ducts 4324 can be configured to direct air to the drive train 4400 (not shown in FIGS. 13-20) to provide cooling for the engine 4410. While not shown in FIGS. 13-20, in some embodiments the side portions 4320 can each include a side-view mirror. In some embodiments, the side-view mirrors can be integrally formed with each side portion 4320. In other embodiments, the side-view mirrors can be bolt on mirrors that extend from the side portions 4320.

The roof portion 4330 of the body 4300 extends between the front portion 4310 and the rear portion 4340 of the body 4300. In this manner, the roof portion 4330 forms an upper boundary of the cabin portion 4350. In some embodiments, the roof portion 4330 is monolithically formed with one or more portions of the body 4300 (e.g., the side portions 4320 and/or the rear portion 4340). In other embodiments, the roof portion 4330 can be formed independently from other portions of the body 4300 and can be coupled thereto. In some such embodiments, the roof portion 4330 can be removable (e.g., similar to known "removable hard-top" configurations).

The rear portion 4340 of the body 4300 is disposed at a rearward position relative to the cabin portion 4350 (e.g., FIGS. 13 and 14). More specifically, the rear portion 4340 includes a window 4343 that forms at least a portion of a rear boundary of the cabin portion 4350. As shown, the rear portion 4340 of the body 4300 includes a rear deck 4342 that defines a fuel fill port 4341. In some embodiments, the rear deck 4342 is a removable deck lid configured to cover a portion of the drive train 4400 when coupled to the rear portion 4340 of the body 4300. Thus, the rear deck 4340 can be removed to gain access to the portion of the drive train 4400. The fuel fill port 4341 is configured to be aligned with a fuel tank 4460 (see e.g., FIG. 26) such that the fuel tank 4460 can receive a fuel fill apparatus (e.g., a fuel nozzle of a fuel pump or the like).

The rear portion 4340 also includes at least one luggage compartment 4345. In some embodiments, the one or more luggage compartments 4345 is formed unitarily with the rear portion 4340 and can be coupled to a movable and lockable door that encloses the luggage compartment 4345. In other embodiments, the luggage compartment 4345 can be formed separately from and later coupled to the rear portion 4345. For example, in some embodiments, the luggage compartment 4345 can be modular such that the luggage compartment 4345 can be bolted or otherwise coupled to the rear portion 4345. In some embodiments, the vehicle 4000 can be configured to include a single luggage compartment 4345 disposed on either side of the vehicle 4000. In other embodiments, the vehicle 4000 can be configured to include a luggage compartment 4345 on both sides of the vehicle 4000. Furthermore, in some embodiments, the luggage compartments 4345 can be removable such that a driver can optionally attach or couple the luggage compartments 4345 when extra storage is needed.

As described above, the cabin portion 4350 of the body 4300 is bounded by the front portion 4310, the side portions 4320, the roof portion 4330, and the rear portion 4340. The cabin portion 4350 defines a substantially enclosed portion of the body 4300 and, as such, can house the interior components of the vehicle 4000. For example, as shown in FIGS. 16-20, the cabin portion 4350 includes a seat support surface 4351 (also referred to herein as a "floorboard"), a seat back surface 4352, a center console 4353, a front dash 4354, a steering wheel 4357 (see e.g., FIG. 9), a set of grab handles 4358, the recumbent seats 4360, and a foot pedal assembly 4480 (see e.g., FIG. 24). The steering wheel 4357 can be any suitable configuration and is operably coupled to a portion of the suspension system 4200, as further described herein. The grab handles 4358 can be coupled to a portion of the frame 4100 (not shown in FIGS. 13-20) and are configured to assist a driver or a passenger in entering or exiting the cabin portion 4350.

Figure 17:
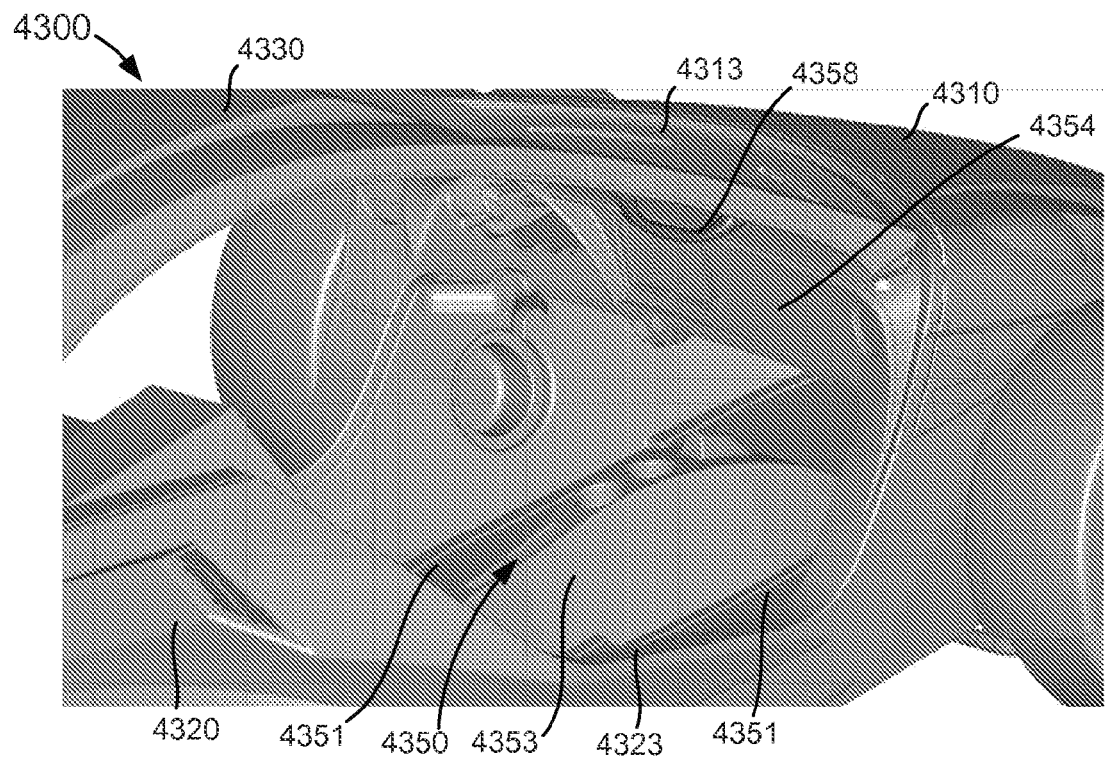

The floorboard 4351 forms a bottom boundary of the cabin portion 4350 (see e.g., FIGS. 14 and 17). Moreover, the floorboard 4351 is configured to be coupled to and/or support a portion of the recumbent seats 4360. For example, the floorboard 4351 can include a mounting portion (not shown) configured to couple the recumbent seats 4360 thereto. As described above, the cabin portion 4350 is configured to substantially enclose a first recumbent seat 4360 (e.g., a driver's seat) and a second recumbent seat 4360 (e.g., a passenger's seat) in a side-by-side configuration. Accordingly, the floorboard 4350 can be configured to include a first seat mounting portion and a second seat mounting portion.

As described in further detail herein, the placement of the fuel tank 4460 rearward of the cabin portion 4350 increases the amount of available space from the cabin portion 4350 that would otherwise be unavailable if the tank were mounted within the cabin portion 4350 of the body 4300. Moreover, with the fuel tank 4460 rearward of the cabin portion 4350, the floorboard 4351 (or substantial portions thereof) can be substantially planar. The substantially planar surface (e.g., the seat support surface) formed by the floorboard 4351 is such that an adjustment structure can be disposed between the floorboard 4351 and the recumbent seats 4360. For example, a slide adjustment assembly (not shown) can be coupled to the floorboard 4351 and in turn, the recumbent seats 4360 can be movably coupled to the slide adjustment assembly. Thus, the recumbent seats 4360 can be adjusted in a linear direction along a longitudinal centerline of the vehicle 4000. Moreover, in some embodiments, the recumbent seats 4360 can be fully adjustable seats (e.g., similar to those commonly found in four-wheeled automobiles). For example, in some embodiments, the recumbent seats 4360 can include a forward and aft adjustment, a back adjustment, and/or height adjustment. In some embodiments, either of the recumbent seats 4360 can allow the seat portion (i.e., the tongue) and the seat back portion to be cooperatively moved and/or moved together relative to the floorboard 4351, as described above. This arrangement allows the recumbent seats 4360 positioned in the cabin portion 4350 to be moveable as an integrated unit (as opposed to a configuration in which a portion is fixedly coupled to the floor and only the seat back portion can be adjusted). In this manner, the vehicle 4000 can comfortably accommodate occupants of different sizes. While shown and described as including two recumbent seats 4360, in some embodiments, the vehicle 400 can include any number of seats. Moreover, in some embodiments, the recumbent seats 4360 can be arranged in along the longitudinal centerline of the vehicle 4000 such that one seat is in front of another seat.

In some embodiments, the adjustable configuration of the recumbent seats 4360 can be such that the foot pedal assembly 4480 can be fixedly coupled to the floorboard 4351 (or supporting structure of the frame 4100 as described in further detail herein). Similarly stated, with the recumbent seats 4360 being adjustable relative to the floorboard 4351, the foot pedal assembly 4480 need not be adjustable. Thus, the potential of the foot pedal assembly 4480 moving during operation (e.g., as is inherent in adjustable foot pedal assemblies) is reduced or eliminated.

The seat back surface 4352 of the cabin portion 4350 is configured to support and/or act as a stop for the back portions of the recumbent seats 4360. Moreover, the seat back surface 4352 is a wall that separates the cabin portion 4350 from, for example, portions of the drive train 4400 that are disposed behind the cabin portion 4350. For example, in some embodiments, a driver or passenger may adjust a recumbent seat 4360 in a reclining motion. In such embodiments, the seat back surface 4352 can act as a stop or a wall to substantially limit the reclining motion to prevent damage to or injury from the components of the drive train 4400 disposed behind the cabin portion 4350.

Figure 18:
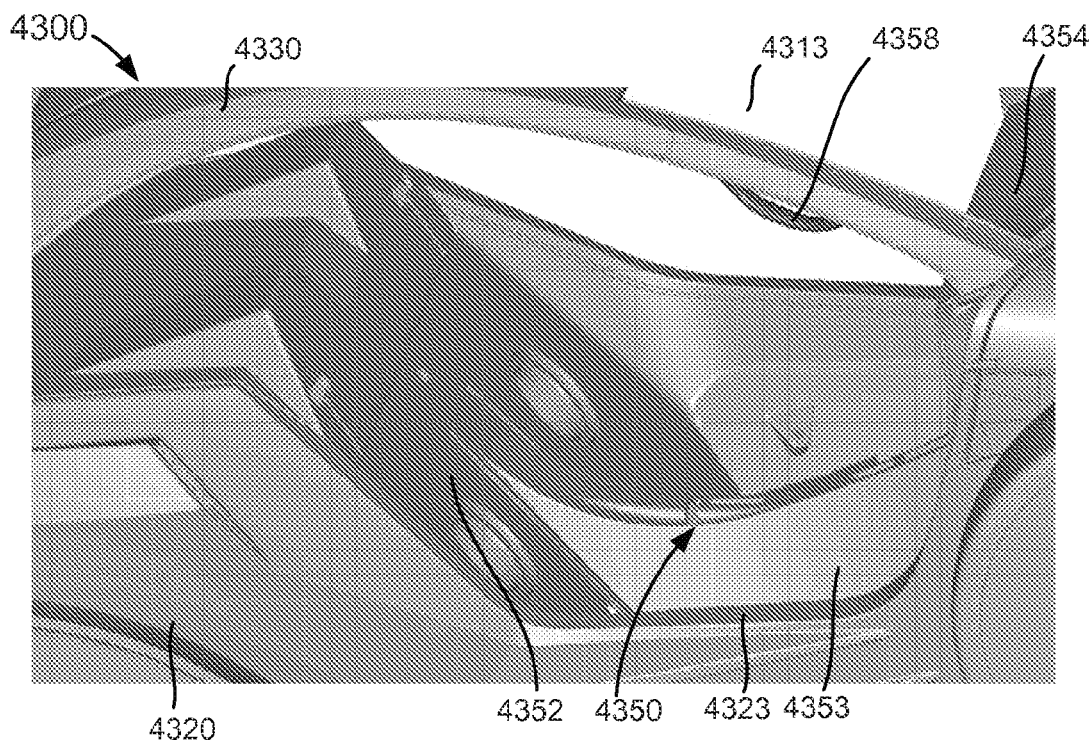
Figure 19:
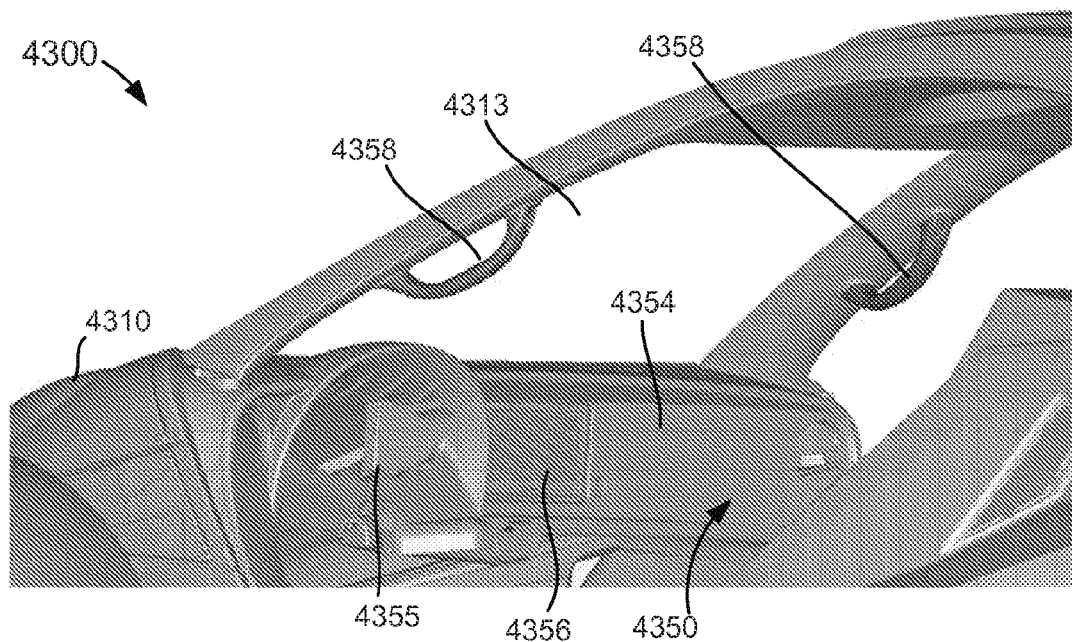
Figure 20:
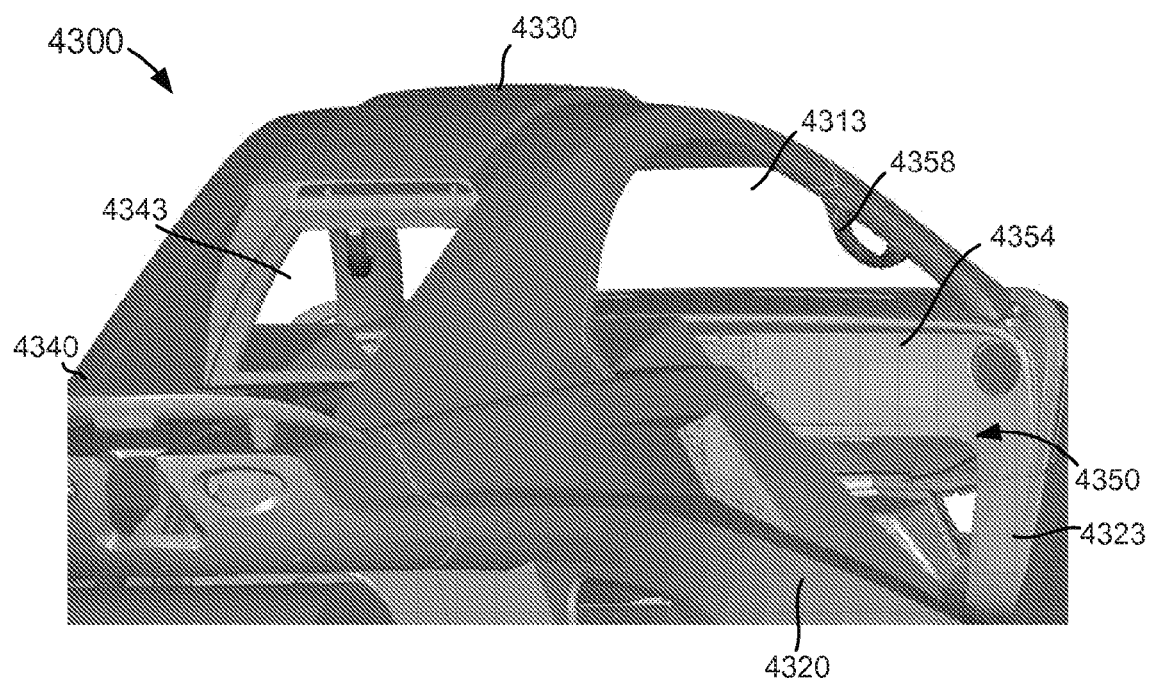

As shown in FIGS. 17 and 18, the center console 4353 is configured to extend from the floorboard 4351. In some embodiments, the floorboard 4351 and the center console 4353 are unitarily formed. In other embodiments, the center console 4353 is coupled to the floorboard 4353. The center console 4353 can be configured to substantially enclose electrical and/or mechanical components associated with various systems of the vehicle 4000. For example, in some embodiments, the center console 4353 can be configured to enclose a portion of a shift linkage 4470 (see e.g., FIGS. 24 and 25) associated with the drive train 4400. In some embodiments, the center console 4353 can enclose a portion of an emergency brake system and/or any electrical components thereof. In some embodiments, the center console 4353 can include or define cup holders, storage compartments, electrical outlets, or the like.

The front dash 4354 is configured to extend across the width of the cabin portion 4350. The front dash 4354 can include any suitable device, compartment, vent, panel, etc. For example, in some embodiments, the front dash 4354 includes a glove box 4356 disposed on the passenger's side of the vehicle 4000. The front dash 4354 can further include a cluster panel 4355 configured to house any suitable instrumentation, displays, gauges, indicators, buttons, dials, and/or the like. For example, in some embodiments, the cluster panel 4355 can include a speedometer, a tachometer, a fuel gauge, a battery indicator, a temperature indicator, and/or the like. In this manner, the body 4300 can provide amenities similar to those found in conventional four-wheeled vehicles in a reverse trike vehicle.

Referring now to FIGS. 21-29, the frame 4100 of the vehicle 4000 includes a front portion 4110 and a rear portion 4120 separated, at least partially, by a firewall 4102. The frame 4100 can be any suitable configuration and can be formed from any suitable material. For example, as shown in FIGS. 21 and 22, the frame 4100 can be formed from fixedly coupled (e.g., welded) tubing. The tubing can be formed from any suitable metallic material such as, for example, aluminum, aluminum alloy, steel, steel alloy, or any combination thereof.

The front portion 4110 of the frame 4100 includes a seat support structure 4120 and a front suspension structure 4130. The front suspension structure 4130 of the frame 4100 is configured to support at least a portion of the front suspension 4210 (see e.g., FIGS. 30-40). The front suspension structure 4130 can be arranged in any suitable configuration. Furthermore, the front suspension structure 4130 can include any suitable bracket and/or mounting hardware that can be coupled to a portion of the front suspension 4210, as described in further detail herein.

The seat support structure 4120 can be configured to support at least a portion of the recumbent seat 4360. More specifically, the seat support structure 4120 can be, for example, a portion of the frame 4100 that includes sufficient structure to support a passenger. For example, in some embodiments, the seat support structure 4120 can include flat bar (e.g., aluminum flat bar, steel flat bar, etc.) that is fixedly coupled (e.g., welded, adhered, or otherwise fixedly attached) to the tubing that forms a portion of the frame 4100. In this manner, the seat support structure 4120 can provide sufficient structure to fixedly couple (at least temporarily) a portion of the recumbent seat 4360 thereto (e.g., via the body 4300). Expanding further, the seat support structure 4120 of the frame 4100 can be disposed below the floorboard 4351 of the cabin portion 4350 of the body 4300 and can be substantially aligned with the mounting portion (described above) of the floorboard 4351. Thus, when the recumbent seat 4360 is coupled to the mounting portion of the floorboard 4351, the recumbent seat 4360 can also be coupled to the seat support structure 4120. Moreover, with the recumbent seat 4360 being coupled to an adjustment structure (e.g., a sliding adjustment assembly as described above), the recumbent seat 4360 can be moved along a longitudinal centerline of the vehicle 4000 while the adjustment structure (not shown) can remain fixedly coupled to the seat support structure 4120.

The rear portion 4150 of the frame 4100 includes an engine mount structure 4160, a rear suspension support structure 4170, and a fuel tank support structure 4180. The engine mount structure 4160 can include any suitable mounting hardware 4161 configured to couple the engine (not shown in FIGS. 21-29) to engine mount structure 4160. For example, the mounting hardware 4161 can include brackets, reinforcement, bushings, bolts, etc. As shown in FIGS. 21 and 22, the engine mount structure 4160 is disposed at a rearward position relative to the seat support structure 4120 included in the front portion 4110 of the frame 4100. Expanding further, the firewall 4102 is configured to span across the width of the frame 4100 to separate the engine mount structure 4160 from the seat support structure 4120. Thus, when the body 4300 is coupled to the frame 4100, the firewall 4102 isolates the portion of the body 4300 defining the seat back surface 4352 from components of the drive train 4400. Similarly stated, the firewall 4102 can define at least a portion of a drive train compartment that is isolated from the cabin portion 4350 of the body 4300.

Figure 27:
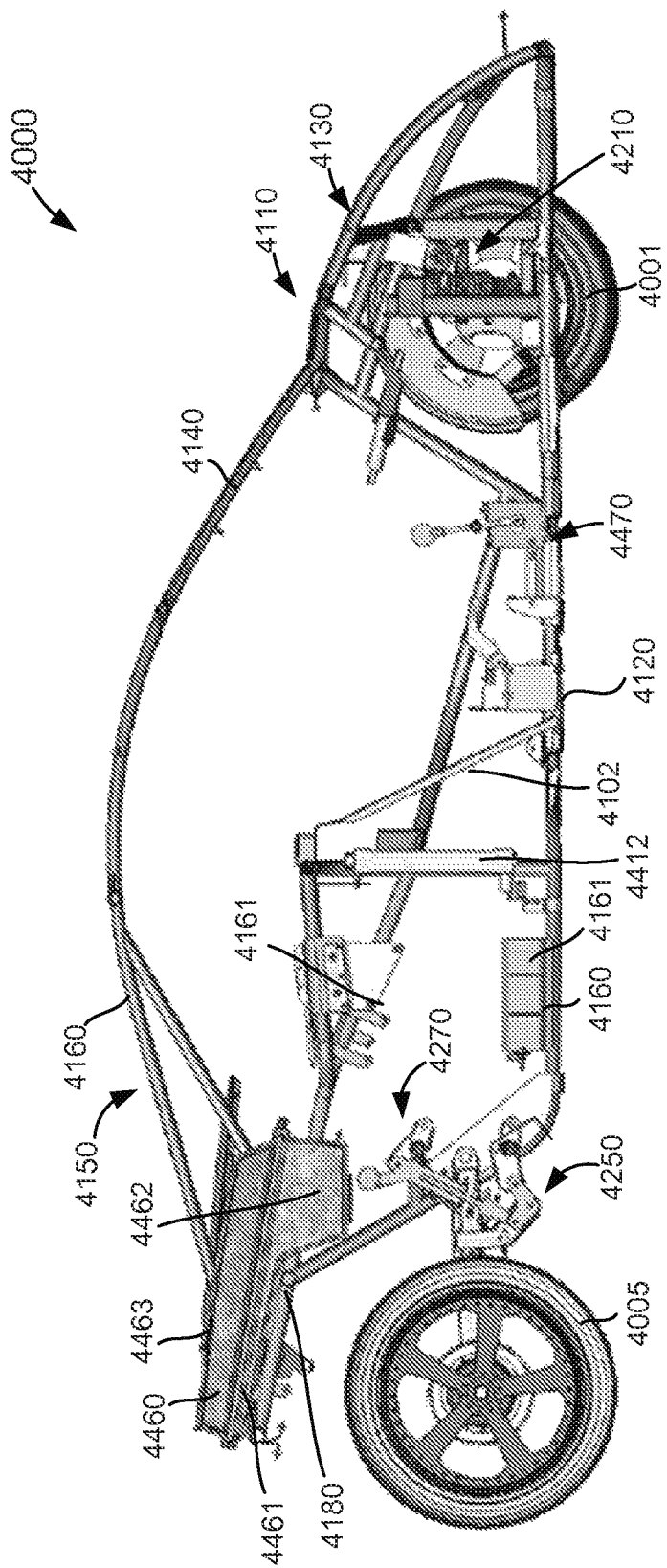
FIG. 27 is a cross-sectional side view of the three-wheeled vehicle shown without the body, taken along the line $X_1$-$X_1$ in FIG. 23.

As shown in FIGS. 23-29 the fuel tank support structure 4180 is coupled to and/or configured to support at least a portion of the fuel tank 4460. The fuel tank support structure 4180 can include any suitable mounting structure such that fuel tank 4460 can be coupled thereto. The fuel tank 4460 can be any suitable configuration. For example, as shown in FIG. 27, the fuel tank 4460 includes a first portion 4461 configured to be disposed on or coupled to the fuel tank support structure 4180 and a second portion 4462 that can extend below the fuel tank support structure 4180. In some embodiments, the arrangement of the second portion 4462 can be such that fuel can be gravity fed through a fuel supply line (not shown) to the engine. In other embodiments, the fuel tank 4460 can include a pump (not shown) configured to feed fuel through a fuel supply line to the engine.

The rear portion 4150 of the frame 4100 can be arranged such that the fuel tank support structure 4180 is disposed both behind and above the engine support structure 4160. Thus, when the fuel tank 4460 is coupled thereto, at least a portion of the fuel tank 4460 is disposed behind and above the engine support structure 4160, as further described herein. Furthermore, as shown in FIGS. 23-26, the position of the fuel tank support structure 4180 relative to the body 4300 can be such that when the fuel tank 4460 is coupled to the fuel tank support structure 4180, a fuel fill port 4463 of the fuel tank 4460 is aligned with the fuel fill port 4341 defined by the rear portion 4340 of the body 4300 (as described above).

Figure 28:
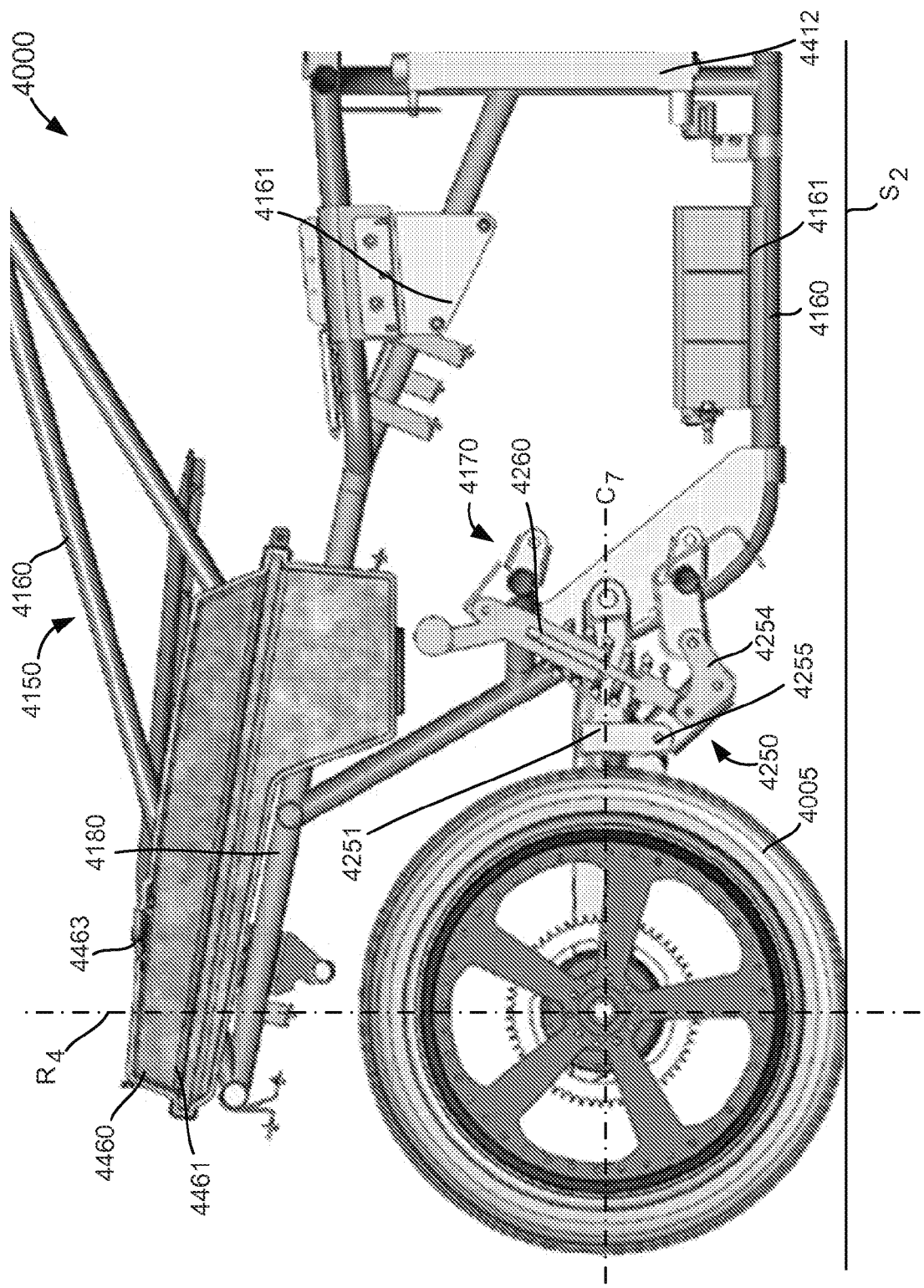
FIG. 28 is an enlarged view of a portion of the three-wheeled vehicle shown in FIG. 26.
Figure 29:
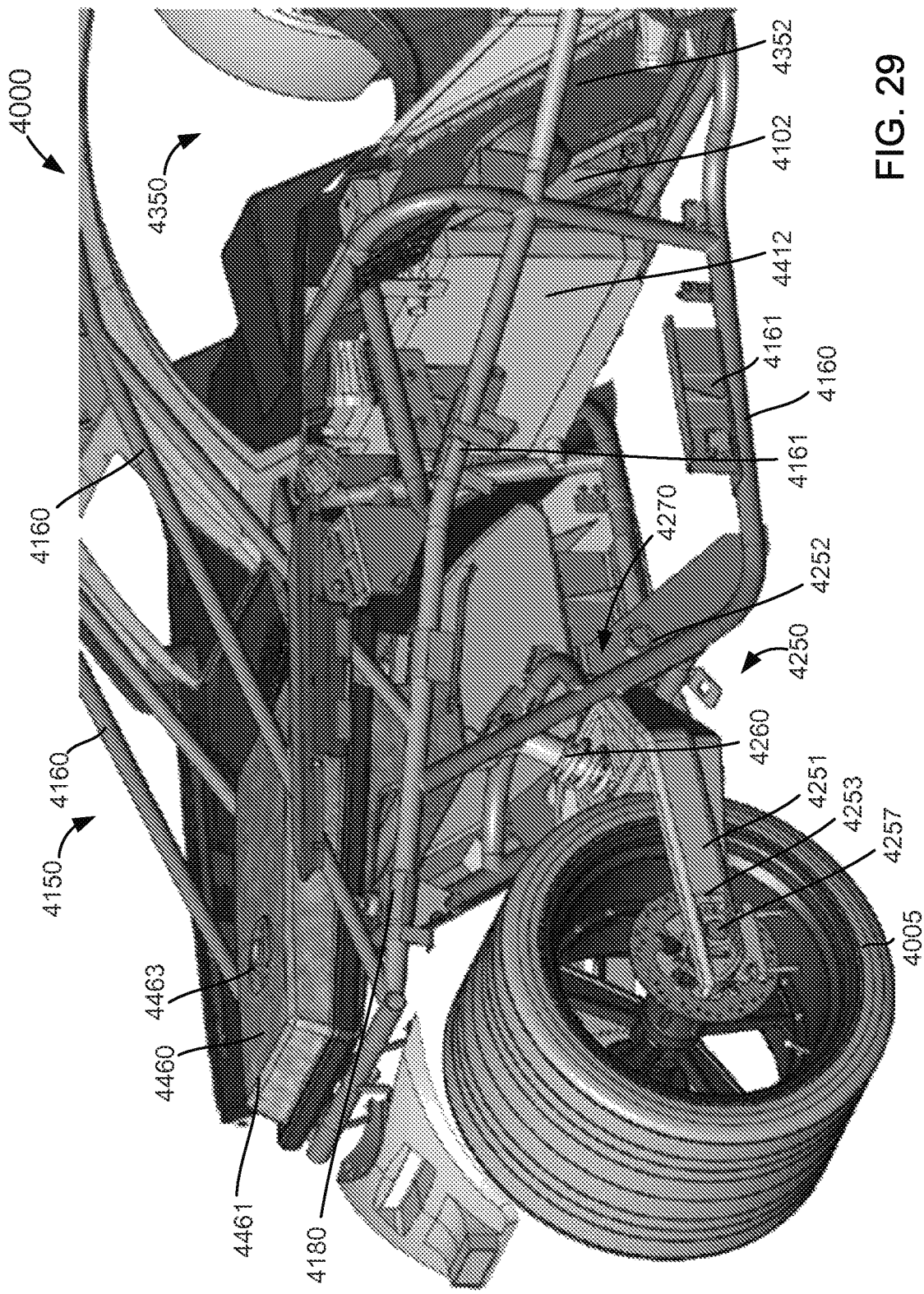
FIG. 29 is a rear perspective view of a rear portion of the three-wheeled vehicle of FIGS. 7-12.

The rear suspension support structure 4170 is configured to be coupled to at least a portion of the rear suspension 4250 (see e.g., FIGS. 28 and 29). As shown, the rear suspension support structure 4170 can be disposed below the fuel tank support structure 4180. Thus, when the fuel tank 4460 is coupled to the fuel tank support structure 4180, at least a portion of the fuel tank 4460 can be disposed above at least a portion of the rear suspension 4250 coupled to the rear suspension support structure 4170, as described in further detail herein. The rear suspension support structure 4170 can include any suitable structure to couple the rear suspension 4250 thereto. More specifically, portions of the rear suspension 4250 can be rotatably coupled to the rear suspension support structure 4170, thereby allowing the rear suspension 4250 to pivot or otherwise move, relative to the frame 4100.

As shown in FIGS. 28 and 29, the rear suspension 4250 includes a swing arm 4251, a linkage system 4254, and a shock absorber 4260 (e.g., a strut, a coilover, or any other spring and damper combination. The shock absorber 4260 can be statically coupled the rear suspension support structure 4170 (e.g., the components do not move relative to one another at the point of coupling). Conversely, the swing arm 4251 and the linkage system 4254 can be coupled to the rear suspension support structure 4170 for pivoting motion. For example, in some embodiments, the rear suspension support structure 4170 can include bushings, bearings, or joints that define an axis of rotation about which the swing arm 4251 and the linkage system 4254 can pivot when coupled thereto. The shock absorber 4260 and the linkage system 4254 can be collectively configured to dampen and/or control the movement of the swing arm 4251 relative to the frame 4100.

The swing arm 4251 includes a wheel mounting portion 4253 at an end portion opposite a portion coupled to the rear suspension support structure 4107. The wheel mounting portion 4253 is coupled to the rear wheel 4005 such that the rear wheel 4005 can rotate relative to the swing arm 4251. More specifically, the wheel mounting portion 4253 forms a bifurcated portion of the swing arm 4251 that can extend on two opposite sides of the rear wheel 4005. In this manner, the wheel mounting portion 4253 can define and/or include an axle 4257 (see e.g., FIG. 29) about which the rear wheel 4005 can rotate.

As shown in FIG. 28, the swing arm 4251 is configured to define a longitudinal centerline $C_7$ between the wheel mounting portion 4253 and the portion coupled to the rear suspension support structure 4107, and the wheel mounting portion 4253 is configured to define a radial axis $R_4$. In this manner, the arrangement of the rear portion 4150 of the frame is such that the fuel tank mounting portion 4180 is disposed above the longitudinal centerline $C_7$ defined by the swing arm 4251. Thus, when the fuel tank 4460 is coupled to the fuel tank support structure 4180, at least a portion of the fuel tank 4460 is disposed above the longitudinal centerline $C_7$. Furthermore, when the radial axis $R_4$ is substantially perpendicular with a surface $S_2$ upon which the rear wheel 4005 is disposed, the radial axis $R_4$ can intersect a portion of the fuel tank 4460 (e.g., when fuel tank 4460 is coupled to the fuel tank support structure 4180). As described above, the arrangement of fuel tank 4460 relative to the engine mount structure 4160 of the frame and the cabin portion 4350 of the body 4300 is such that the interior volume defined by the cabin portion 4350 is unaffected by the fuel tank 4460.

Figure 30:
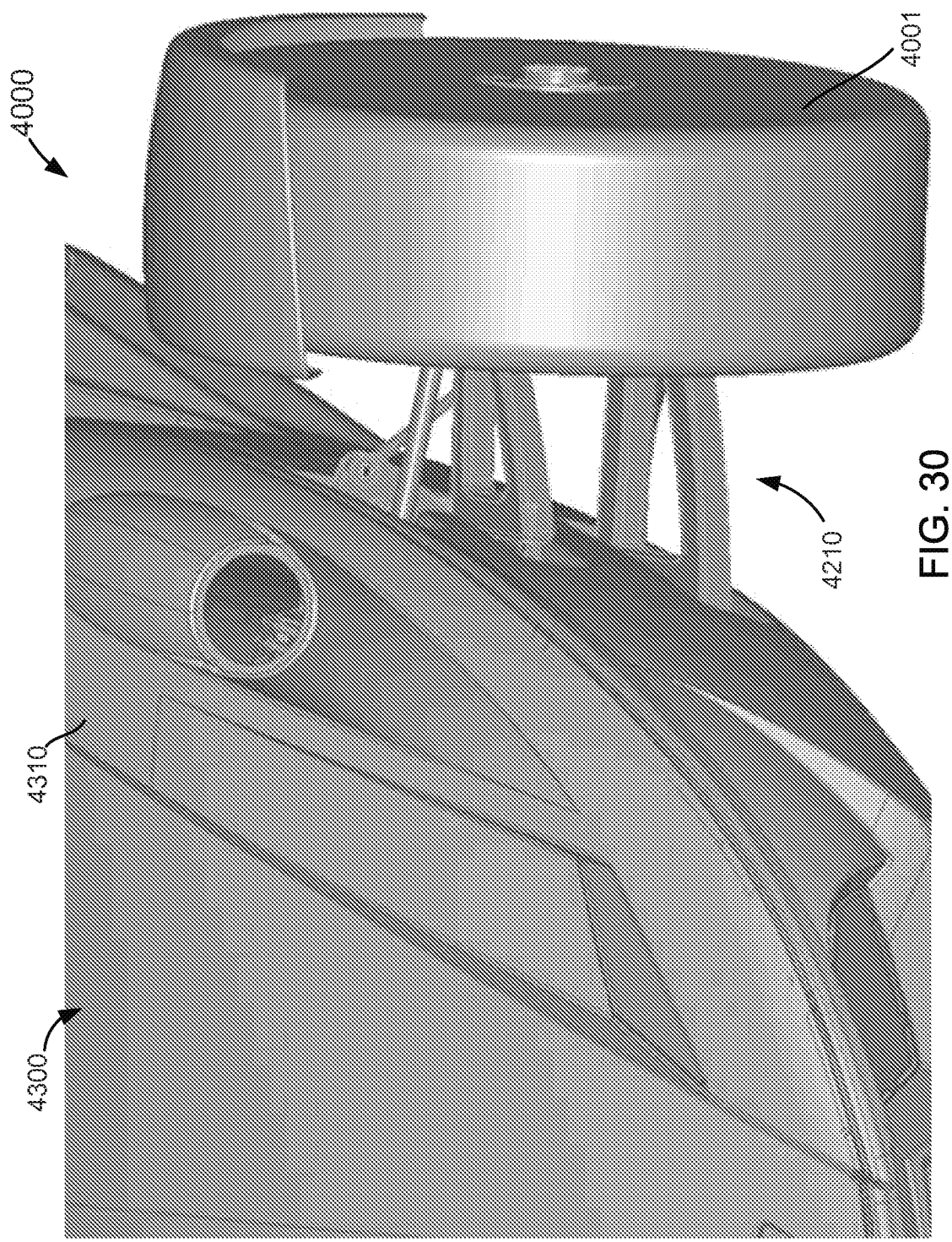
FIGS. 30-40 are various views of a front suspension system, according to an embodiment, included in the three-wheeled vehicle of FIGS. 7-12.
Figure 31:
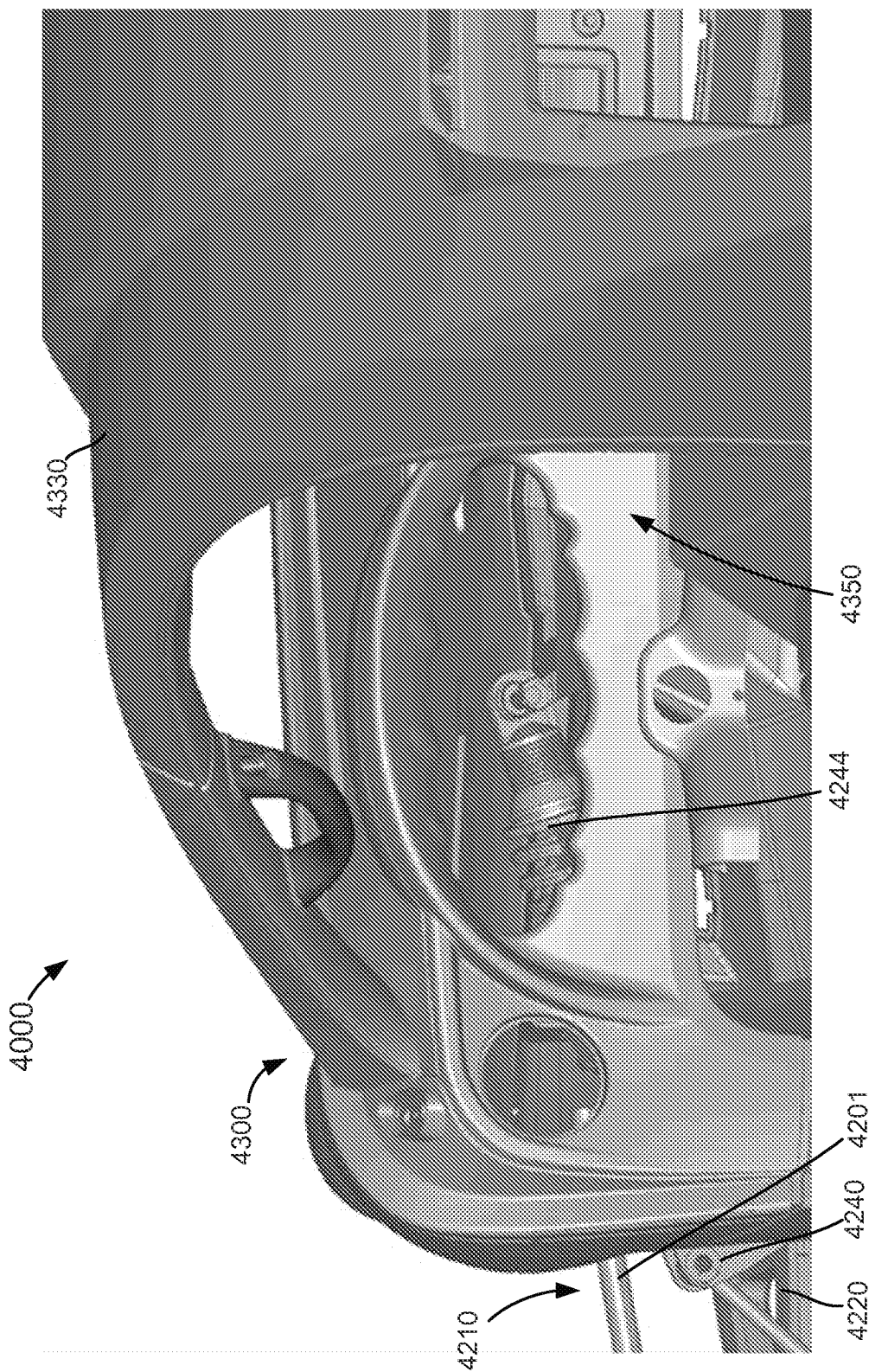

Referring now to FIGS. 30-40, the front suspension system 4210 includes a tie rod 4201, a spindle 4211, a spindle bracket 4212, an upper control arm 4220, a lower control arm 4230, a telelever plate 4240, a push rod 4245, and a sway bar 4270. As shown in FIGS. 30 and 31, the front suspension system 4210 is configured to extend beyond a portion of the body 4300 to be coupled to the front wheels 4001. More specifically, at least a portion of the shock absorber 4244, the tie rod 4201, the upper control arm 4220, the lower control arm 4230, and the telelever plate 4240 are disposed within the body 4300 of the vehicle 4000. In this manner, some of the portions of the front suspension 4210 disposed within the body 4300 can be coupled to a driving control system (e.g., a steering wheel or the like) to control or steer the front wheels 4001. While FIGS. 30-40 illustrate a single side of the front suspension system 4200, it should be understood that a similar configuration in an opposite configuration can be used on the opposite side of the vehicle 4000. Thus, the discussion of the components and arrangements thereof are applicable to the portion of the front suspension system 4200 not shown in FIGS. 30-40.

As shown in FIG. 30, the spindle 4211 can be coupled to the front wheel 4001 at a first end and is coupled configured to be coupled to the spindle bracket 4212 at a second end (see e.g., FIG. 32), opposite the first end. More specifically, a portion of the spindle 4211 can be rigidly coupled (e.g., not movable) to the spindle support bracket 4212. The spindle 4211 can include a first portion and a second portion (not shown) configured to be moved relative to each other. For example, in some embodiments, the first portion of the spindle 4211 can be rigidly coupled to the spindle bracket 4212 and the second portion of the spindle 4211 can rotate relative to the first portion. Thus, the front wheel 4001, when coupled to the spindle 4211, can rotate.

As described, the spindle support bracket 4212 is coupled to the spindle 4211 and can be rotatably coupled to the upper control arm 4220, the lower control arm 4230, and the tie rod 4201. For example, in some embodiments, the spindle bracket 4212 is coupled to the spindle 4211 on a first side and is rotatably coupled to the upper control arm 4220 and the lower control arm 4230. Expanding further, the spindle 4211 is configured to be rotated about an axis (not shown) that is substantially parallel to a surface on which the wheel 4001 contacts and the spindle bracket 4212 is configured to be rotated about an axis substantially perpendicular to the axis of rotation of the spindle 4211. The tie rod 4201 is configured to be coupled to a top surface of the spindle bracket 4212. The tie rod 4201 can further be at least operably coupled to the steering column and/or steering wheel of the vehicle. Thus, the tie rod 4201 can be configured to push and/or pull the spindle bracket 4212 such that the spindle bracket 4212 pivots about the axis (i.e., defined by the rotational coupling of the spindle bracket 4212 to the upper control arm 4220 and the lower control arm 4230).

The upper control arm 4220 includes a mounting portion 4221 that is coupled to the telelever plate 4240. The mounting portion 4221 is further configured to rotatably couple both the upper control arm 4220 and the telelever plate to the front suspension support structure 4130 of the frame 4100. More specifically, the upper control arm 4220 can be rotated about an axis that is parallel to the longitudinal axis of the vehicle 4000. Similarly stated, the upper control arm 4220 can be rotated about the axis that is perpendicular to both the rotational axis of the spindle 4211 and the rotational axis of the spindle bracket 4212.

The lower control arm 4230 includes a mounting portion 4231 that rotatably couples the lower control arm 4230 to the front suspension support structure 4130 of the frame 4100. More specifically, the lower control arm 4230 can be rotate about an axis that is parallel to the rotational axis of the upper control arm 4220. In this manner, both the upper control arm 4220 and the lower control arm 4230 can pivot about their respective axes to absorb a portion of a shock commonly experienced during operation of the vehicle 4000. Moreover, the sway bar 4270 can be coupled to the lower control arm 4230 to increase the torsional stiffness of the front suspension 4210.

The length of the upper control arm 4220, the length of the lower control arm 4230, and/or the location at which the spindle bracket 4212 is mounted to the upper control arm 4220 and/or the lower control arm 4230 can be adjusted to vary the camber and/or caster of the front suspension system 4210. Similarly stated, the camber and/or caster of the front wheel 4001 can be adjusted by increasing or decreasing the length of both the upper control arm 4220 and the lower control arm 4230 and/or by adjusting the mounting position of the spindle bracket 4212 relative to both the upper control arm 4220 and the lower control arm 4230.

The lower control arm 4230 is coupled to and/or includes the push rod bracket 4232. The pushrod bracket 4232 is rotatably coupled to a first end of the pushrod 4245 such that the pivot about an axis that is parallel to the rotational axis of the upper control arm 4220 and the rotational axis of the lower control arm 4230. A second end of the push rod 4245 is rotatably coupled to the telelever plate 4240. More specifically, the telelever plate 4240 includes a pushrod mounting portion 4243, a shock absorber mounting portion 4241, and a frame mounting portion 4242. The pushrod mounting portion 4243 is rotatably coupled to the pushrod 4245 such that the pushrod 4245 can pivot about an axis (e.g., parallel to the axis of rotation at the first end of the pushrod 4245). The frame mounting portion 4242 is coupled to the upper control arm 4220 and rotatably coupled to the front suspension support structure 4230, as described above. The shock absorber mounting portion 4241 is coupled to the shock absorber 4244 (e.g., a strut, a coilover, or any other spring and damper configuration). In this manner, the pushrod 4245 can transfer a portion of a force (e.g., due to pivoting motion of the lower control arm 4230) from the lower control arm 4230 to the telelever plate 4240 which, in turn, transfers a portion of the force to the shock absorber 4244. The shock absorber 4244 is further configured to be rigidly coupled to a portion of the front suspension structure 4130 of the frame 4100. Thus, the shock absorber 4244 can absorb and/or dampen a portion of the force exerted by the rotational motion of the lower control arm 4230.

As shown in FIGS. 34-40, by positioning the pushrod bracket 4232 adjacent to (or at least close to) the spindle bracket 4212 and through the use of the telelever plate 4240 allows the shock absorber 4244 to be positioned toward the center of the vehicle 4000, away from the spindle 4211. In some embodiments, for example, the shock absorber 4244 can be disposed inside the cabin portion 4350 of the body 4300 (see e.g., FIG. 31). By positioning the shock absorber 4244 at an inboard position, the location of the push rod bracket 4232, and pivot point for the telelever plate 4240 can be adjusted (e.g., moved towards the inboard position) to reduce the effective unsprung weight of the wheel/suspension system. In other embodiments, however, the shock absorber 4244 can be positioned outside of the cabin portion 4350 of the body 4300.

While the upper control arm 4220 and the telelever plate 4240 are show in FIGS. 34-40 as being rotatably coupled to the frame 4100 at substantially the same point, in other embodiments, the telelever plate 4240 and the upper control arm 4220 may be rotatably coupled to the frame 4100 at different locations. The geometry of the telelever plate 4240, the length of the push rod 4245, the location at which the push rod bracket 4232 is mounted to the lower control arm 4230, and/or the location at which the shock absorber 4244 is coupled to the frame 4100 can all be adjusted to vary the characteristic of the front suspension 4210.

Referring now to FIGS. 41-48, the drive train assembly 4400 includes an engine 4410, a transmission assembly 4420, a reverse gear assembly 4440, and a drive chain 4430. The engine 4410 (see e.g., FIGS. 41-42) can be any suitable engine coupled to or supported by at least a portion of the engine support structure 4160 of the frame 4100. For example, in some embodiments, the engine can be a Suzuki Hayabusa engine. The engine 4410 is coupled to a transmission 4422 (see e.g., FIGS. 47 and 48) such that rotational motion of a drive shaft of the engine 4410 rotates an output drive shaft 4423 of the transmission 4422 in a first direction (e.g., associated with a forward motion of the vehicle 4000). The transmission assembly 4420 and the reverse gear assembly 4440 can be coupled to or supported by a transmission cradle 4421. The transmission cradle 4421 can, in turn, be coupled to a portion of the engine mount structure 4160 of the frame.

A forward gear shift rod 4427 is configured to engage the transmission 4422 (see e.g., FIG. 43) to change gears disposed within the transmission 4422 (e.g., the transmission 4422 is a manual shift transmission). A shift rod sensor 4520 can coupled to the forward gear shift rod 4427. The shift rod sensor 4520 can be configured to determine which forward gear is engaged and/or whether the transmission 4422 is in neutral, and to send an electronic signal to, for example, an electronic control device, as described in further detail herein. The reverse gear assembly 4440 is also coupled to the transmission 4420 and is configured to rotate the output drive shaft 4423 of the transmission 4422 in a second direction (e.g., associated with a rearward motion of the vehicle 4000), as described in further detail herein.

The reverse gear assembly 4440 can be used in connection with and/or controlled by a mode selector and/or any other suitable electronics, as described in further detail herein. As shown in FIGS. 43-48, the reverse gear assembly 4440 includes an electric motor 4442 operably coupled to the transmission 4422 via a reverse drive chain 4446. The electric motor 4442 (also referred to herein as "motor") can be any suitable motor, such as, for example, an automotive starter motor. The motor 4442 can be controlled by any suitable electrical system, as further described herein.

The electric motor 4442 includes an output pinion 4443 that is disposed, at least partially, within a shroud 4447. The shroud 4447 further houses a reduction gear 4444 that is in contact with the output pinion 4443. Similarly stated, the output pinion 4443 is configured to mesh with the reduction gear 4444. The reduction gear 4444 is coupled to a motor gear 4445 along a common axis. The motor gear 4445 is configured to drive the reverse drive chain 4446, as described in further detail herein. In some embodiments, the reduction gear 4444 and the motor gear 4445 can be monolithically formed. For example, in some embodiments, the reduction gear 4444 and the motor gear 4445 can be formed from a single work piece (e.g., a billet or the like). In other embodiments, the reduction gear 4444 and the motor gear 4445 can be formed independently and coupled together. In such embodiments, forming the motor gear 4445 independently from the reduction gear 4444 can allow for varying gear ratios by replacing the motor gear 4445 with a gear of larger or smaller diameter having more or fewer teeth, respectively. Thus, the torque and/or angular velocity of the motor gear 4445 can be varied.

Figure 43:
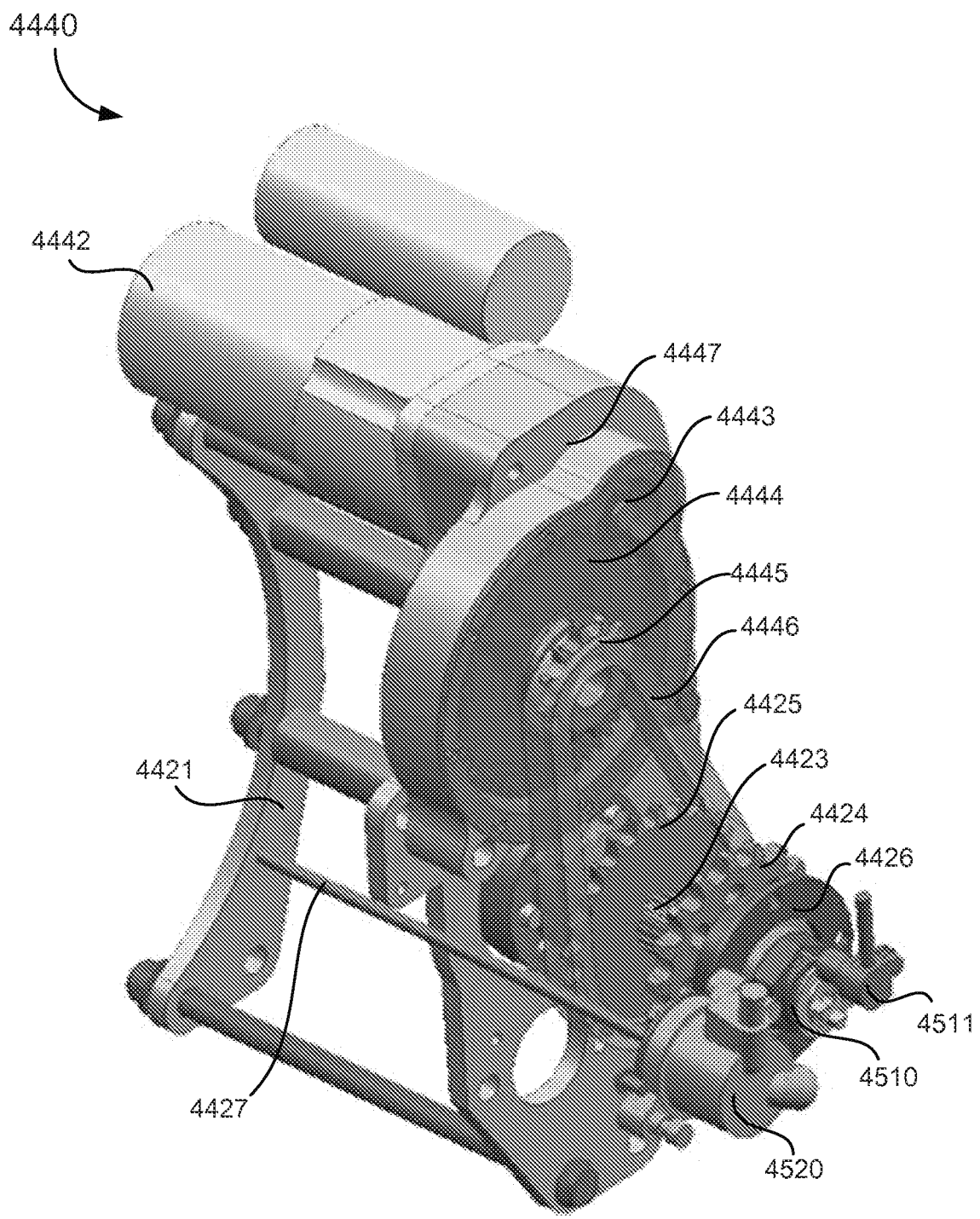
FIGS. 43 and 44 are a front perspective view and a rear perspective view, respectively, of a reverse gear assembly included in the drive train system shown in FIGS. 41 and 42.
Figure 44:
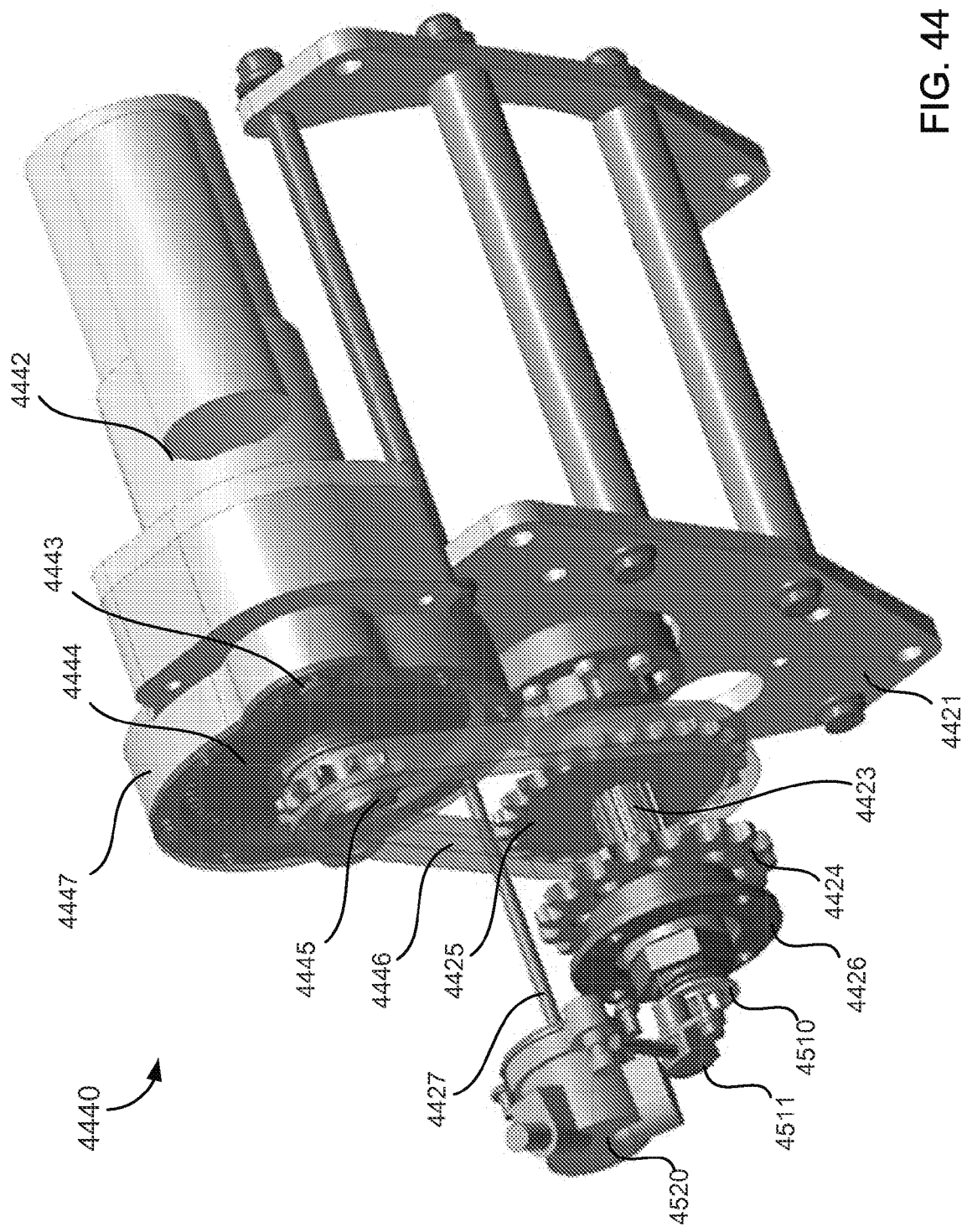
Figure 45:
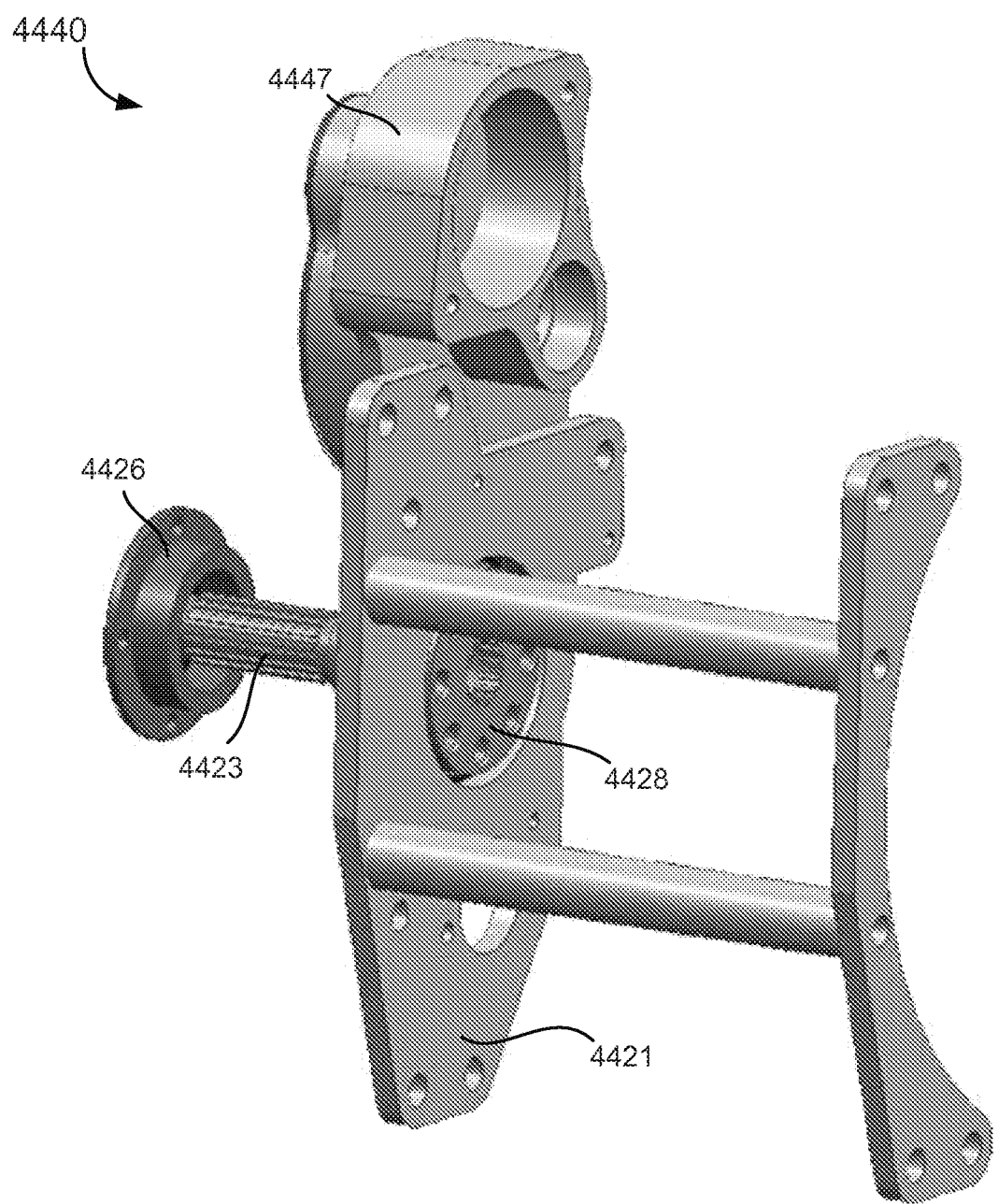
FIGS. 45 and 46 are perspective views of a portion of the reverse gear assembly shown in FIGS. 43 and 44.
Figure 46:
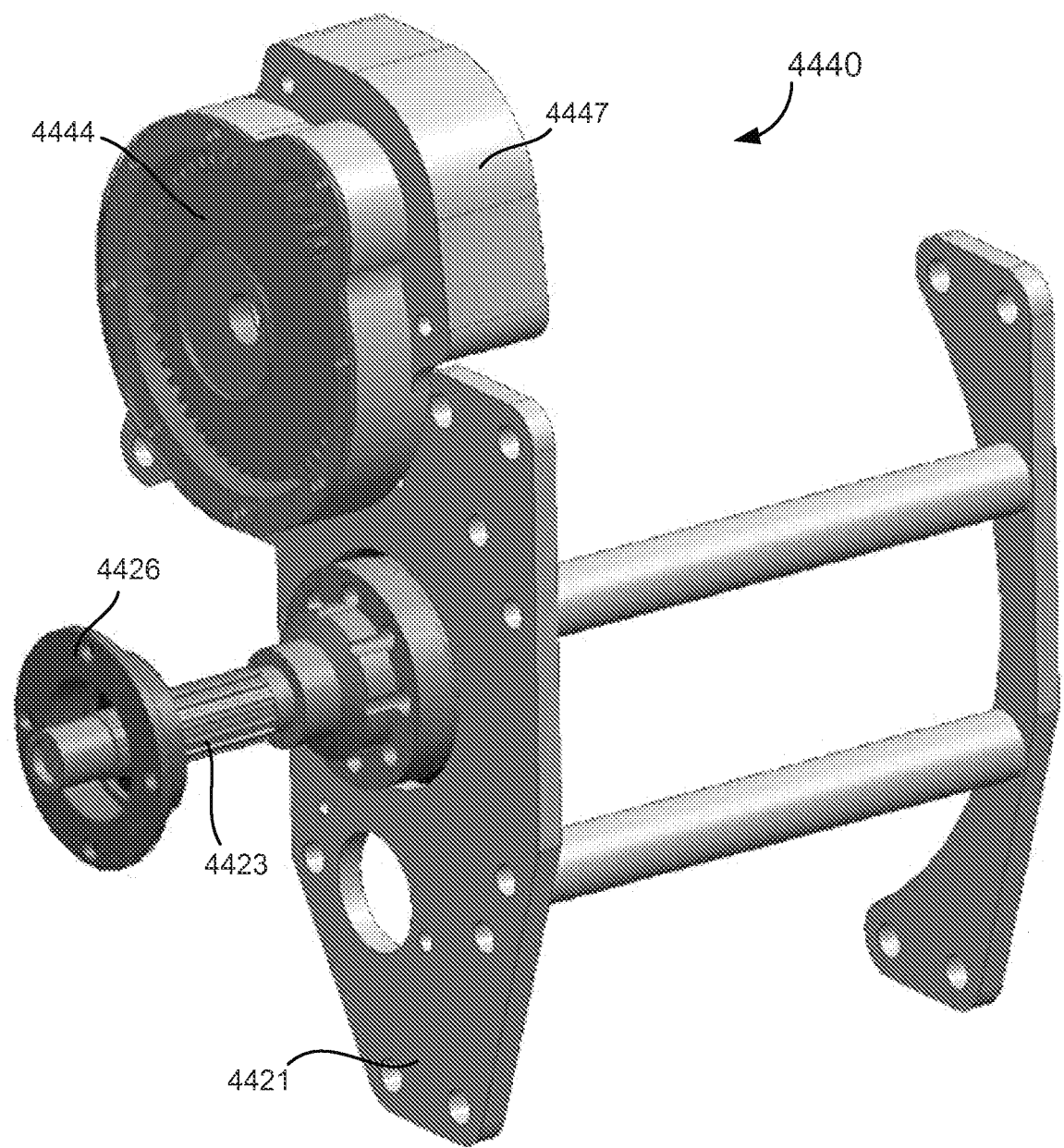
Figure 47:
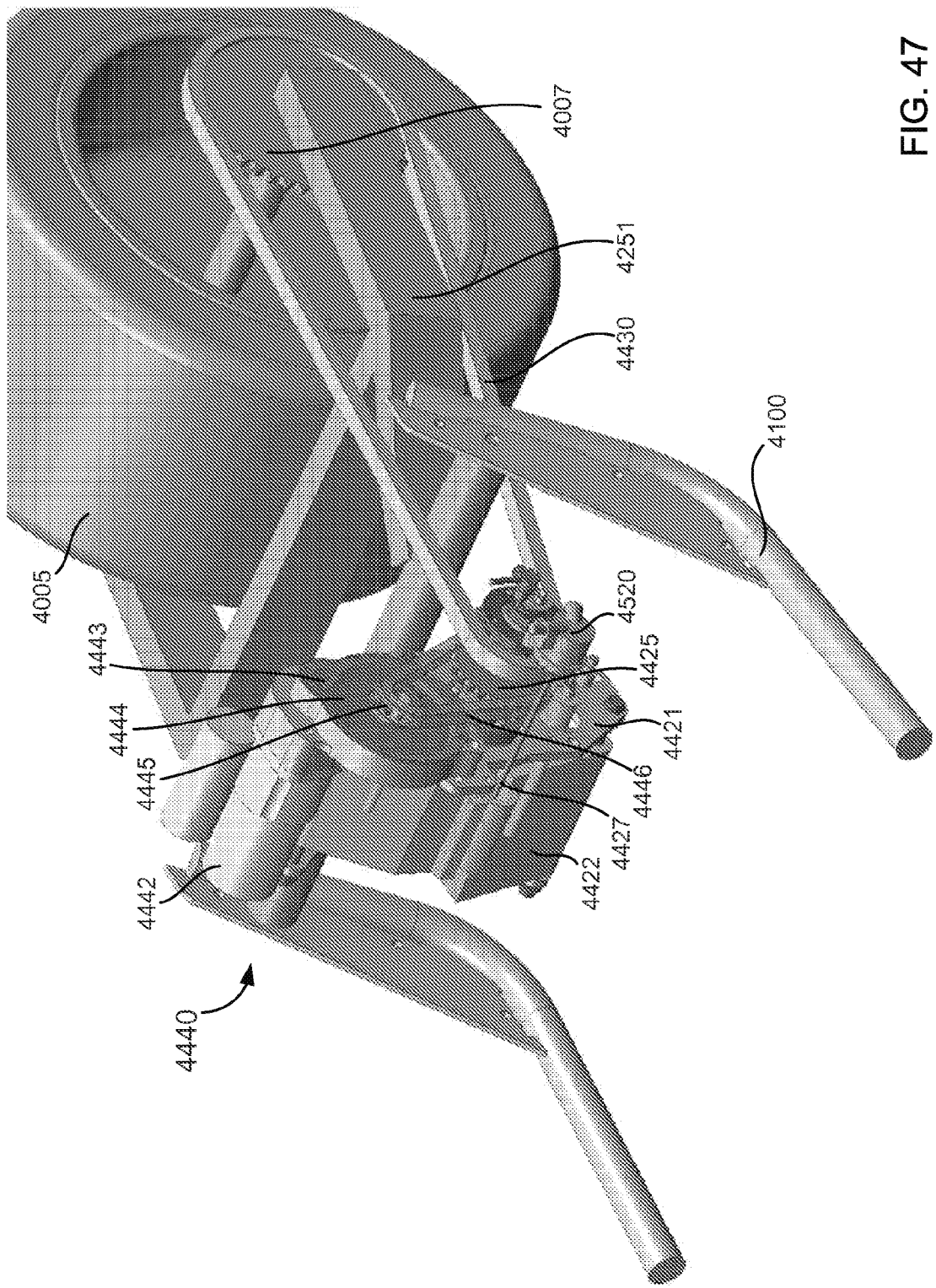
FIGS. 47 and 48 are perspective views of the reverse gear assembly shown in FIGS. 43 and 44 coupled to a rear wheel of the vehicle shown in FIGS. 7-12.
Figure 48:
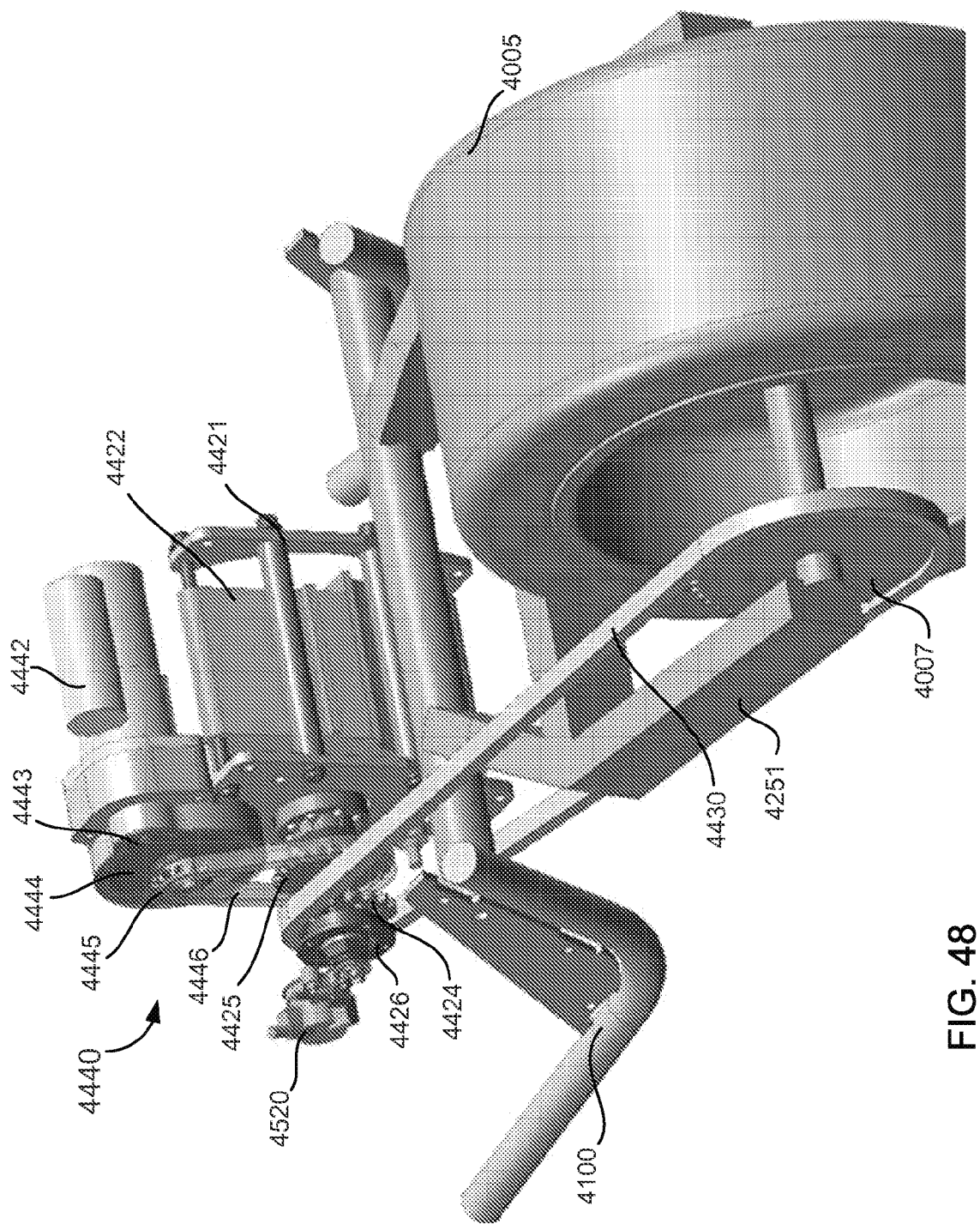

As shown in FIGS. 43 and 44, the reverse drive chain 4446 is coupled to a reverse drive gear 4425 disposed about the output drive shaft 4423 of the transmission 4422 (not shown) to operably couple the electric motor 4442 to the transmission 4422. In other embodiments, the reverse gear assembly 4440 can include any number of intermediate gears of any type in any geometry. For example, a meshing gear assembly can be substituted for the reverse chain 4446, or the reduction gear 4444 can be replaced with an annular gear which meshes with the reverse pinion 4443 and a gear positioned on the output drive shaft 4423. As described above, the diameter and/or the number of teeth of the reverse drive gear 4425 can be varied such that a desirable gear ratio is defined between the motor gear 4445 and the reverse drive gear 4425.

The reverse drive gear 4425 is coupled to the output drive shaft 4423 by means of an overrunning clutch (not shown) that only engages the reverse drive shaft sprocket 4425 to the output drive shaft 4423 when the reverse drive gear 4425 is under power. Conversely, when the reverse drive gear 4425 is unpowered, the reverse drive gear 4425 can freely spin on or around the output drive shaft 4423. In other embodiments, the electric motor 4442 can be operably decoupled from the output drive shaft 4423 by means of an overrunning clutch, clutch plate assembly, or other means positioned at any point in the reverse gear assembly 4440.

The output drive shaft 4423 is supported by a flange bearing 4426, which, in turn, can be coupled to a supporting member (e.g., the frame 4100 or other support structure). In other embodiments, the output drive shaft 4423 need not be supported (e.g., a cantilever configuration). The output drive shaft 4423 is further coupled to a drive sprocket 4424 and a drive shaft encoder 4510. The drive sprocket 4424 is configured to be coupled to the drive chain 4430 (FIGS. 47 and 48) to operably couple the transmission 4422 to the rear wheel 4005. For example, the rear wheel 4005 includes a wheel sprocket 4007 coupled to an axle of the rear wheel 4005 such that the drive chain 4430 can rotate the rear wheel. The drive shaft encoder 4510 is configured to produce a signal indicating rotation speed and direction of the output drive shaft 4423. The drive shaft encoder 4510 can be, for example, a magnetic encoder, an optical encoder, and/or of any other type or combination thereof. The electrical signal produced by the drive shaft encoder 4510 can be detected by an encoder sensor 4511 operably coupled thereto. The encoder sensor 4511 is configured to send an electronic signal to the mode selector (not shown).

In use, the drive shaft encoder 4510 and the shift rod sensor 4520 can collectively send information to, for example, the mode selector to prevent the reverse gear assembly 4440 from being engaged when the output drive shaft 4423 is rotating in the first direction (associated with forward motion of the vehicle 4000). Similarly, the drive shaft encoder 4510 and the shift rod sensor 4520 can collective send information to the mode selector to prevent the transmission 4422 from being engaged when the output drive shaft 4423 is rotating in the second direction (associated with rearward motion of the vehicle 4000).

Figure 49:
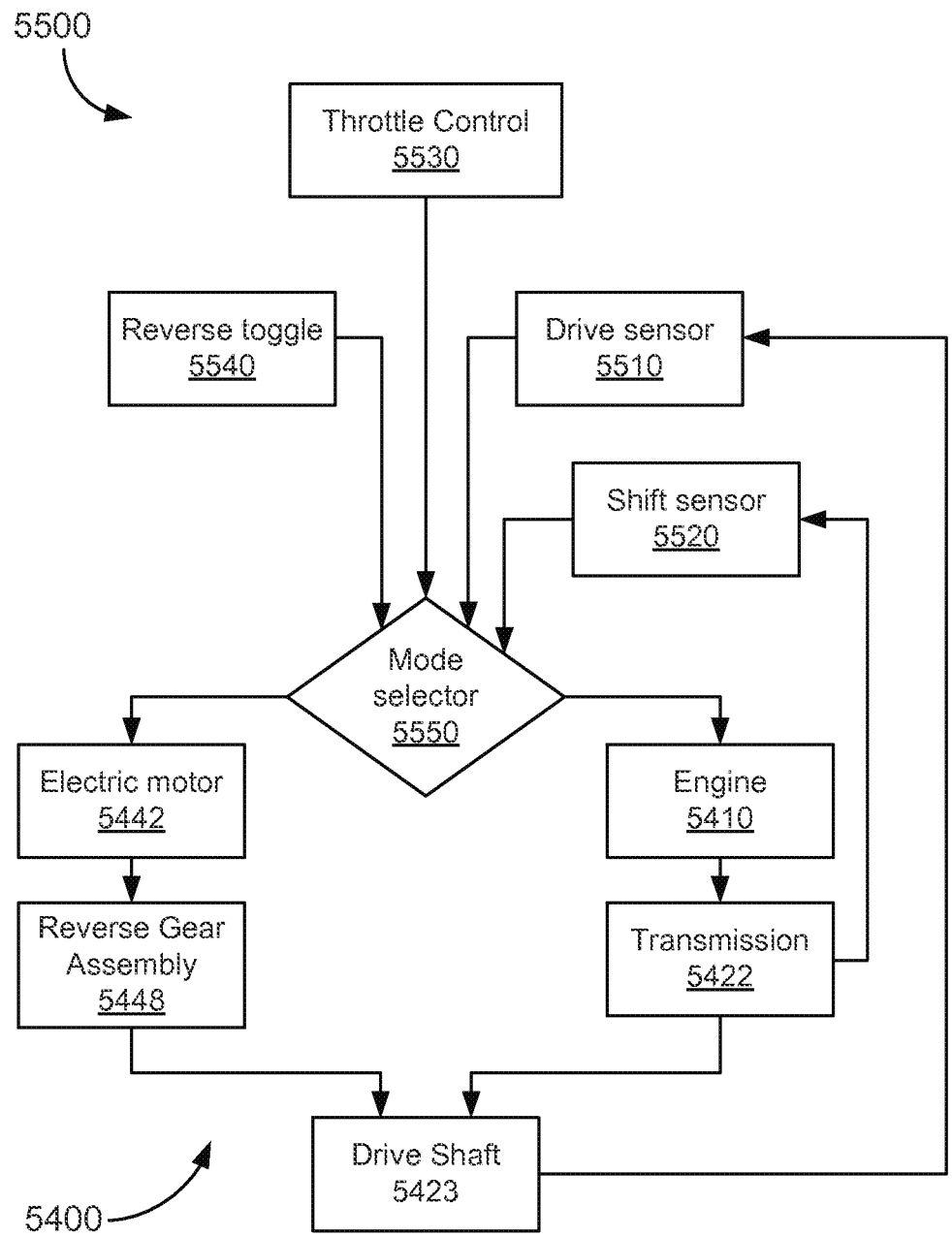
FIG. 49 is a flowchart illustrating the operation of a reverse gear assembly included in the three-wheeled vehicle of FIGS. 7-12.
Figure 50:
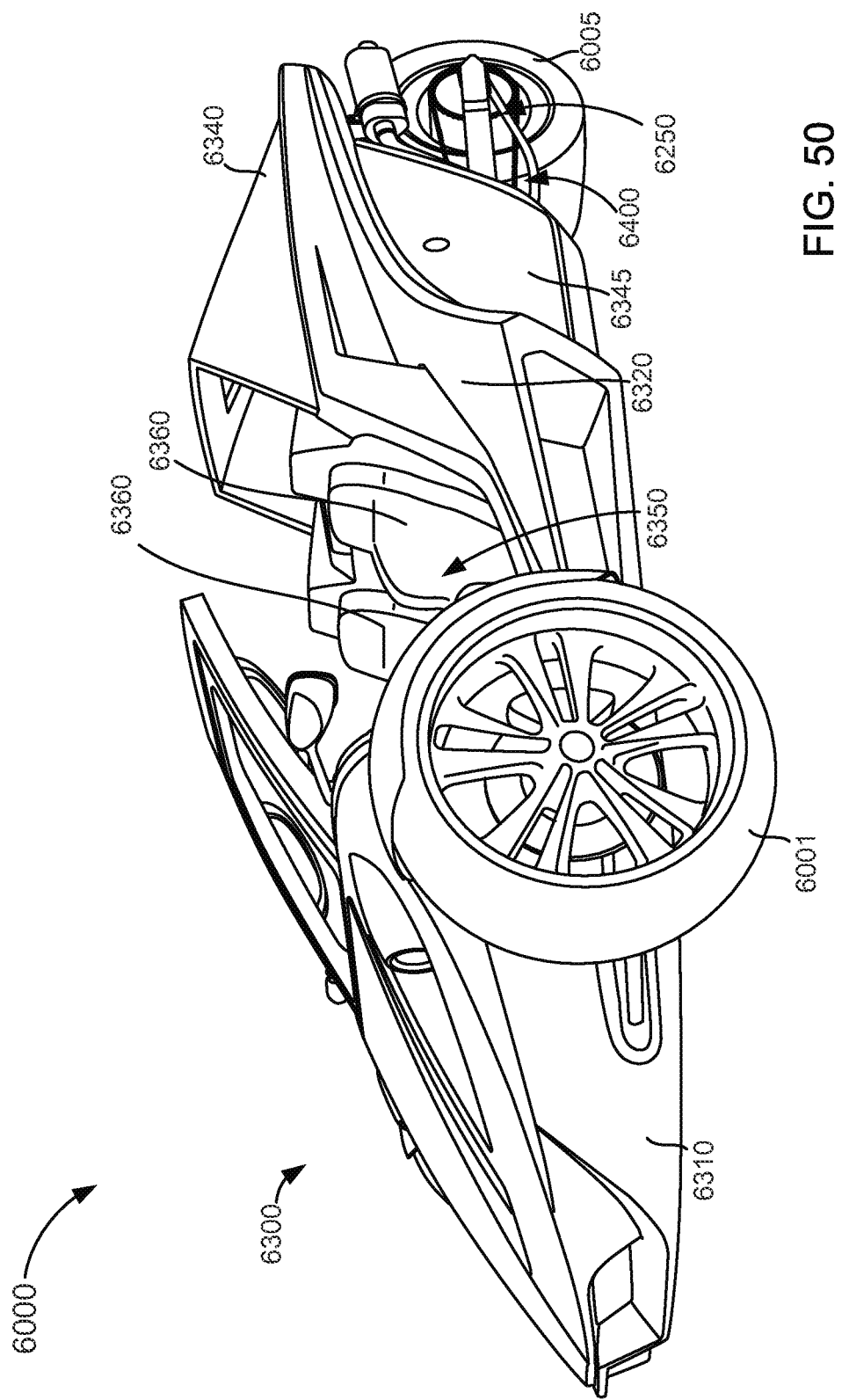
FIGS. 50-55 are a front perspective view, a rear perspective view, a side view, a front view, a rear view, and a top view, respectively, of a three-wheeled vehicle according to an embodiment.

As described above, the vehicle 4000 can include any suitable electronic system configured to control the operation of the reverse gear assembly 4440. For example, FIG. 49 is a schematic block diagram of an electrical system 5500 configured to control at least a portion of a drive train 5400, according to an embodiment. The drive train 5400 includes an engine 5410 and a transmission configured to turn a drive shaft 5423 in a first direction, and an electric motor 5442 and a reverse gear assembly 5448 configured to turn the drive shaft 5423 in a second direction, opposite the first direction. In some embodiments, the transmission 5422 can be a sequential motorcycle transmission (e.g., a Suzuki Hayabusa transmission). As described above with reference to FIGS. 41-48, the transmission 5422 is operatively coupled to, and is configured to receive power from, the engine 5410.

The electrical system 5500 includes a throttle control 5530 (e.g., a throttle pedal of the foot pedal assembly 4480), a reverse toggle 5540, a drive sensor 5510, a shift sensor 5420, and a mode selector 5550. The mode selector 5550 can be any suitable vehicle control unit ("VCU"). For example, in some embodiments, the mode selector 5550 contains logic configured to determine the appropriate engagement of the drive train 5400, as described below. As shown, the mode selector 5550 receives signals from the drive sensor 5510, the shift sensor 5520, the reverse toggle 5540, and the throttle control 201. In some embodiments, the mode selector 5550 or vehicle control unit ("VCU") can also receive input from other sensors (not shown, but which can include, for example, an engine speed sensor, a vehicle speed sensor, an intake manifold temperature sensor, etc.). In this manner, the VCU 5550 can determine the desired engine, transmission, and/or vehicle operating conditions and convey signals to various actuators to control the engine, transmission and/or vehicle accordingly.

The VCU can be, for example, a commercially-available processing device configured to perform one or more specific tasks related to controlling the vehicle. For example, the VCU can include a microprocessor and a memory device. The microprocessor can be, for example, a general purpose processor, a central processing unit (CPU), a front end processor, an application-specific integrated circuit (ASIC) or a combination of ASICs, designed to perform one or more specific functions and/or to execute a set of instructions stored in the memory. In other embodiments, the microprocessor can be an analog or digital circuit, or a combination of multiple circuits. The memory device can include, for example, a read only memory (ROM), a random access memory (RAM), an electronically programmable read only memory (EPROM), erasable electronically programmable read only memory (EEPROM), and/or flash memory. In some embodiments, the memory includes a set of instructions to cause the processor to execute modules, processes and/or functions used to control various portions of the vehicle.

In use, to engage a reverse mode of the drive train 5400, a user can change the state of the reverse toggle 5540 from, for example, a first position associated with a forward motion of the vehicle to a second position associated with a reverse motion of the vehicle (or vice versa). In some embodiments, the reverse toggle 5540 can be separate from a forward gear selector (e.g., included in the shift linkage 4470 shown with reference to FIGS. 24 and 25). In other embodiments, the reverse toggle 5540 can be integrated into the forward gear selector. In response to being manipulated, the reverse toggle 5540 can send an electronic signal to the mode selector 5550. The mode selector 5550 can also receive signals from the drive sensor 5510, the shift sensor 5520, and/or the throttle sensor 5530 to determine the state of the drive train 5400. In this manner, the mode selector 5550 can be configured to accept the reverse toggle 5540 signal or to reject the reverse toggle 5540 signal.

For example, if the drive sensor 5510 indicates the drive shaft 5423 is rotating in a forward direction, if the shift sensor 5520 indicates a forward gear is engaged, and/or if the throttle control 5530 is not closed (e.g., in its minimum position), the mode selector 5550 can be configured to ignore the signal sent from the reverse toggle 5540. In some embodiments, the mode selector 5550 can sound an alarm if the mode selector 5550 determines that it is not desirable to change modes. For example, in some embodiments, the mode selector 5550 can send a signal to the electric motor 5442 and/or the engine 5410 to shut down, and/or can provide the user with some other feedback to indicate the mode cannot be changed. In some embodiments, the mode selector 5550 can monitor other inputs to determine whether a mode change is appropriate. Such inputs can include, for example, vehicle speed, and/or engine 5410 status.

Conversely, if the drive sensor 5510 indicates the drive shaft is not rotating, if the shift sensor 5520 indicates the transmission 5422 is in neutral, and/or if the throttle control 5530 is closed, the mode selector 5550 can accept the signal sent from the reverse toggle 5540. If the reverse toggle 5540 sends a signal associated with a forward motion of the vehicle, the mode selector 5550 can route (e.g., send a signal) a throttle input to the engine 5410, which supplies power through the transmission 5422 and to the drive shaft 5423 to drive the vehicle in the forward direction. If the reverse toggle 5540 sends a signal associated with a reverse motion of the vehicle, the mode selector 210 can route the throttle input to the electric motor 5442. In some embodiments, the mode selector 5550 (e.g., the memory) can include instructions to cause the processor to convert throttle input into a current/voltage input for the electric motor 5442. In some embodiments, the mode selector 5550 can vary the electric input to the electric motor 5442 based on the throttle position. For example, if the throttle is in a closed position (i.e., at its minimum position) the mode selector 5550 can deliver a minimum electric power to the electric motor 5442, causing the electric motor to rotate at a minimum speed. As the throttle is opened, the mode selector 5442 can increase the electric power supplied to the electric motor 5442, thereby increasing the rotational speed of the electric motor 5442. Thus, the electric motor 5442 can rotate the reverse gear assembly 5448, which, in turn, rotates the drive shaft 5423, thereby driving the vehicle in a reverse direction. In some embodiments, the electric motor 5442 can be connected directly to the drive shaft 5423 (e.g., bypassing the reverse gear assembly 5448).

As shown, the engine 5410 and transmission 5422, which provide forward power, and the electric motor 5442 and reverse gear assembly 5448, which provide reverse power, are connected to the same drive shaft 5423. Because the drive shaft 5423 cannot be driven simultaneously in both the forward and reverse directions, it is necessary that only one power train (engine 5410 and transmission 5422 or electric motor 5442 and reverse gear assembly 5448) be operably coupled to the drive shaft 5423 at a time. In some embodiments, the reverse gear assembly 5448 can be connected to the drive shaft 5423 by means of an overrunning clutch. The overrunning clutch can freely rotate on or about the drive shaft 5423 unless the reverse gear assembly 5448 is supplying power. In such embodiments, the mode selector 5550 may limit and/or prevent power from being supplied to the electric motor 5442 when the drive sensor 5510 indicates that the drive shaft 5423 is rotating in the forward direction, thus ensuring that the reverse drive train is operably decoupled from the drive shaft 5423 when the vehicle is traveling in the forward direction.

In some embodiments, the mode selector 5550 may route throttle control to the engine 5410 at all times. In the reverse state, the mode selector 5550 can be configured to operably decouple the engine 5410 from the drive shaft 5423, before entering the reverse state. For example, in some embodiments, the transmission 5422 need be in a neutral state. In other embodiments, the mode selector 5550 can be configured to decouple the engine 5410 from the transmission 5422 (and/or the transmission 5422 from the drive shaft 5423). For example, in some embodiments, the mode selector 5550 can send a signal associated with changing the state of an electromechanical clutch or bearing, energizing a solenoid (e.g., similar to a Bendix® drive system or the like), and/or a fluid coupling (similar to, for example, a torque converter). In such embodiments, when the electrical system 550 is in the reverse mode, the engine speed will increase when the throttle control 5530 is actuated, thereby providing the user with the audible sensation that the engine 5410 is providing the power to drive the vehicle in reverse, even though the electric motor 5442 is providing the power.

Referring now to FIGS. 50-55, a vehicle 6000 in a reverse-trike configuration is shown, according to an embodiment. The vehicle 6000 can be substantially similar to the vehicle 4000 described with reference to FIGS. 7-48. More specifically, the vehicle 6000 is the same as the vehicle 4000 with a different body configuration. Therefore, similar portions of the vehicle 6000 are not described herein. The vehicle 6000 includes, a frame (not shown), a suspension system 6200, a body 6300, and a drive train 6400. The suspension system 6200 includes a front portion 6210 and a rear portion 6250. The body 6300 includes a front portion 6310, two side portions 6320, and a rear portion 6340, and defines a cabin portion 6350. The drive train 6400 includes at least an engine and a transmission (not shown) operably coupled to a rear wheel 6005 via a drive chain 6430. While not shown, the vehicle 6000 can also include an electronic system, a reverse gear system, and/or any other suitable system described herein.

Figure 51:
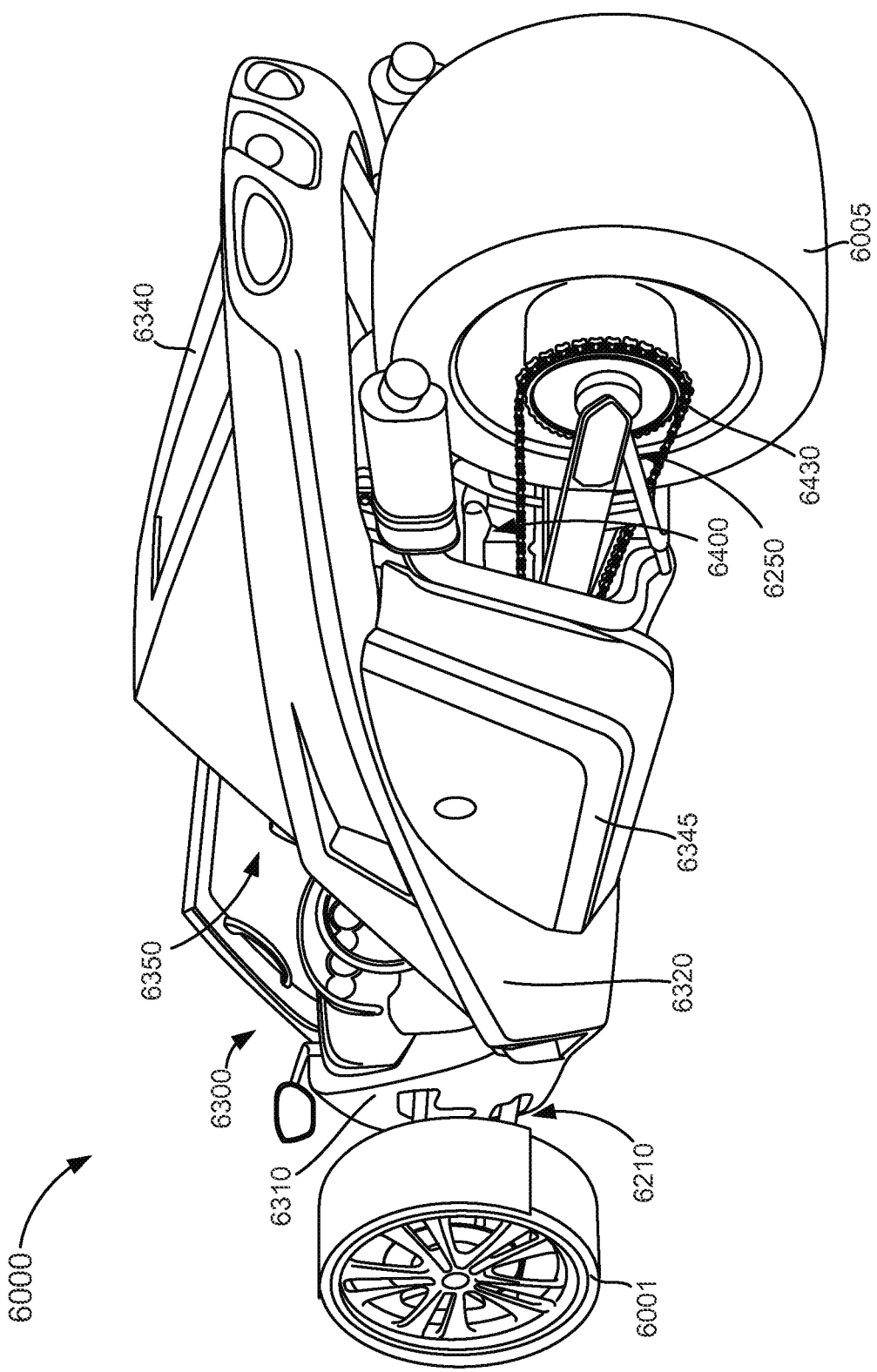
Figure 52:
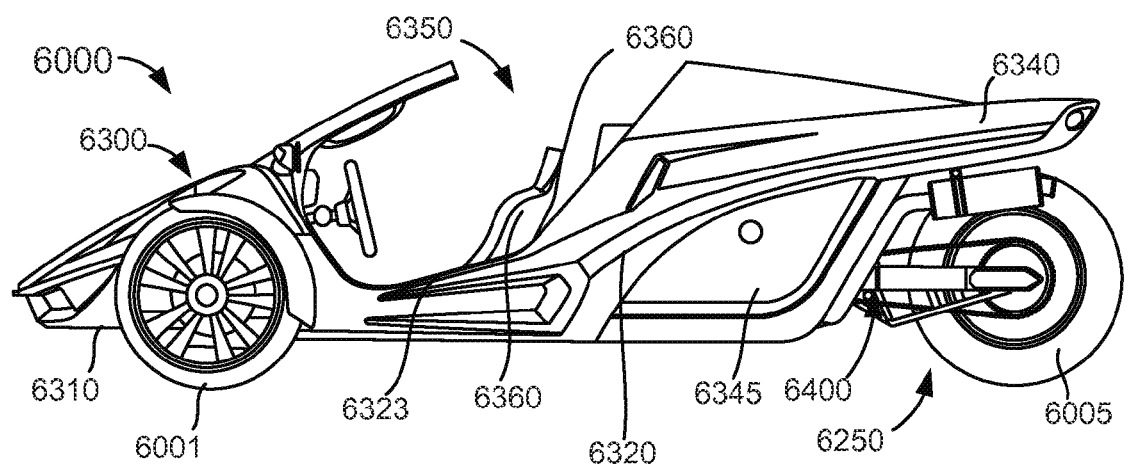
Figure 53:
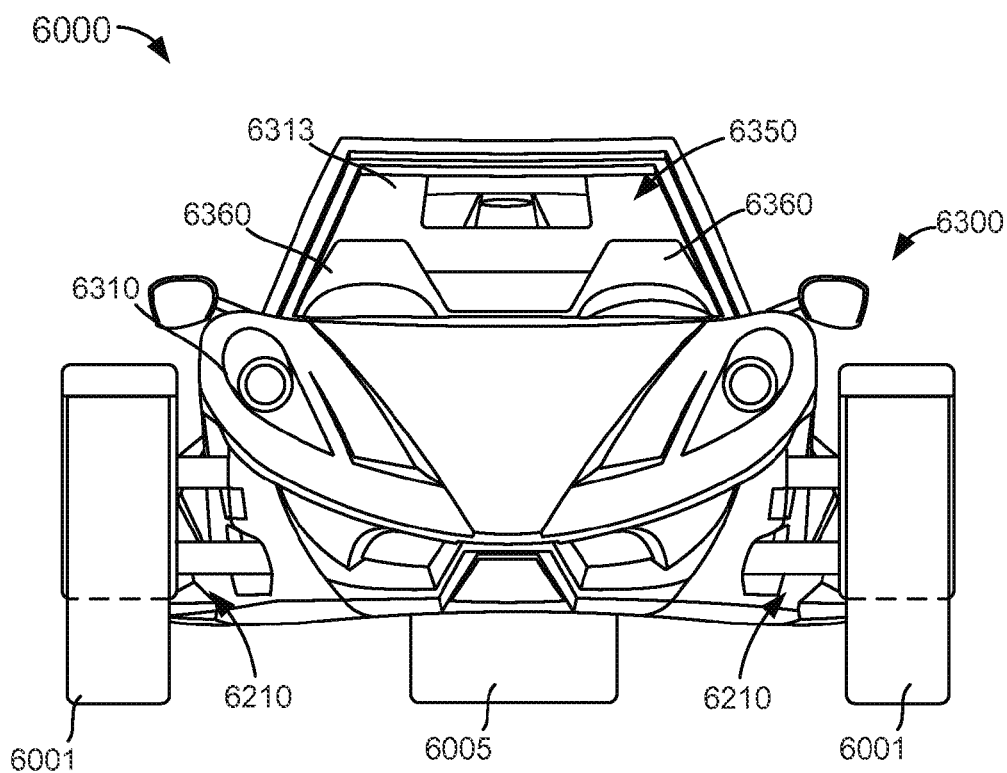
Figure 54:
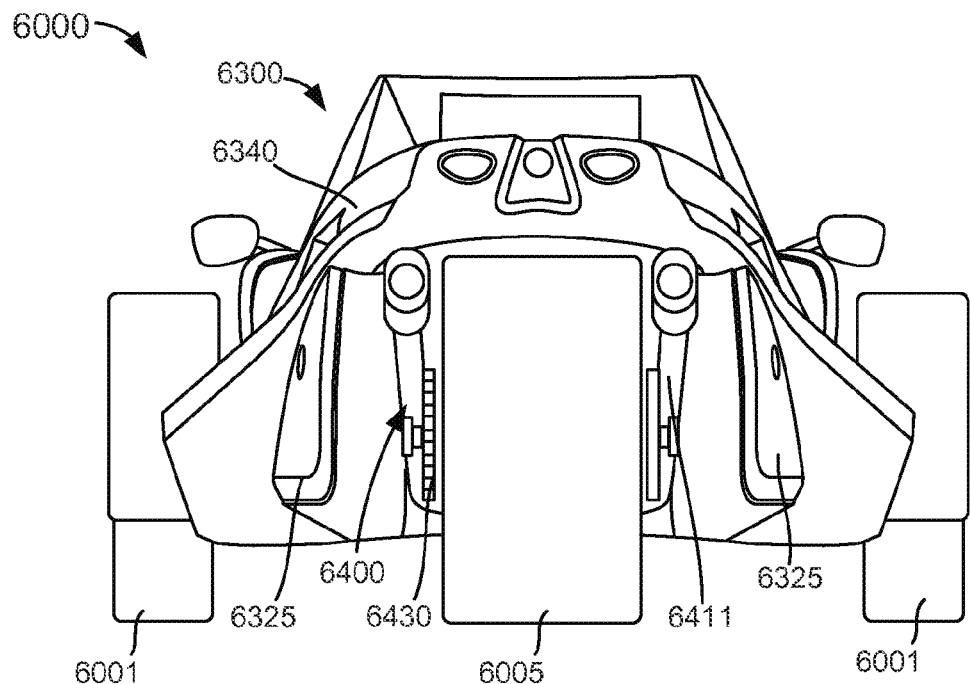
Figure 55:
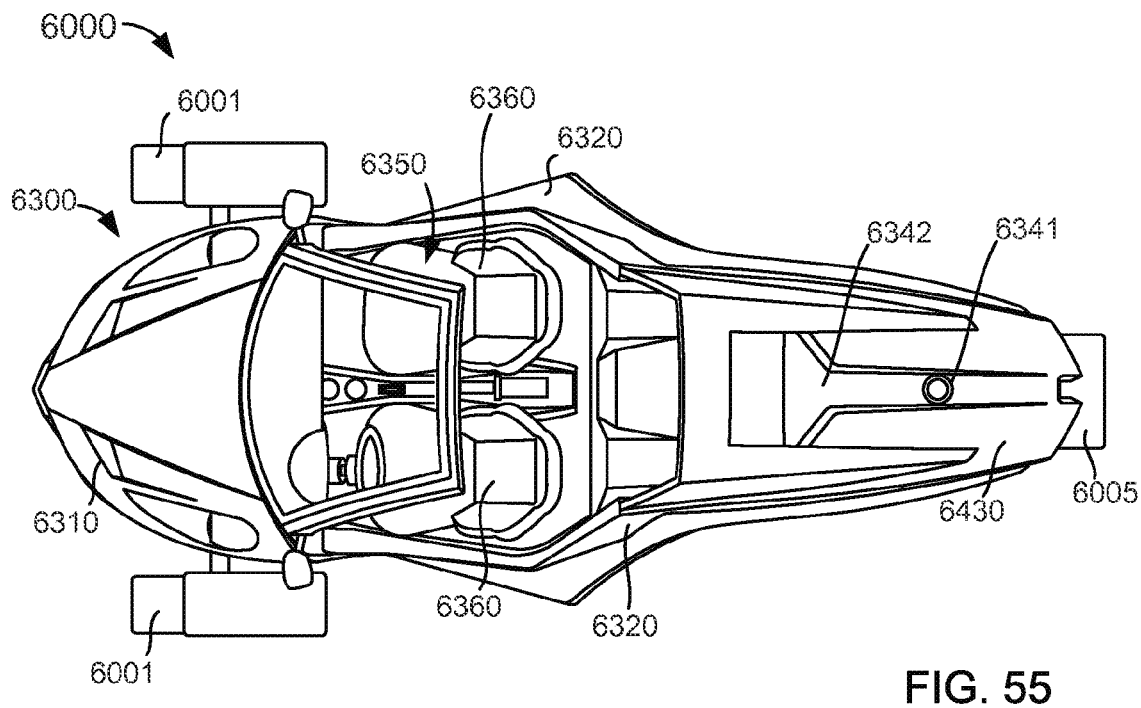

As shown in FIGS. 50-55, the vehicle 6000 is configured such that the drive train 6400 is disposed substantially rearward of the cabin portion 6350 of the body 6300. More specifically, the engine and the transmission (not shown) are disposed rearward of the cabin portion 6350 of the body 6300. As shown in FIGS. 51 and 53, a portion of the front suspension 6210 is configured to be disposed within and/or covered by the body 6300 and a second portion of the front suspension 6210 is disposed substantially outside of the body 6300. In this manner, the front suspension 6210 can be coupled to, for example, the front wheels 6001 and can be at least operably coupled to driving controls disposed within the cabin portion 6350 such that an operator sitting therein (e.g., on the recumbent seat 6360) can engage the driving controls to operate the vehicle 6000.

The body 6300 can be any suitable shape, size, or configuration and can be formed from any suitable material or combination of materials, as described above. The front portion 6310 of the body 6300 is disposed at a forward position relative to the cabin portion 6350 and includes a windshield 6313 that is configured to form a forward boundary of the cabin portion 6350 (described in detail above). The front portion 6310 of the body 6300 also defines a set of suspension openings (i.e., a first opening defined by a driver's side of the front portion 6310 and a second opening defined by a passenger's side of the front portion 6310) configured to receive a portion of the front suspension 6210, as described above.

The side portions 6320 of the body 6300 extend from the front portion 6310 to the back portion 6340 of the body 6300. In this manner, the side portions 6320 are configured to form the side (e.g., a driver's side and a passenger's side) boundaries of the cabin portion 6350. Moreover, the side portions 6320 each define an entrance 6323 that allows access to the cabin portion 6350. In some embodiments, the openings 6323 can each receive a door (not shown). In such embodiments, the door can be coupled to the side portion 6320 via a mounting assembly that includes an adjustable hinge, one or more stiffening members and/or a gas strut.

The rear portion 6340 of the body 6300 is disposed at a rearward position relative to the cabin portion 6350. As shown in FIG. 58, the rear portion 6340 of the body 6300 includes a rear deck 6342 that defines a fuel fill port 6341. In some embodiments, the rear deck 6342 is a removable deck lid configured to cover a portion of the drive train 6400 when coupled to the rear portion 6340 of the body 6300. Thus, the rear deck 6340 can be removed to gain access to the portion of the drive train 6400. The fuel fill port 6341 is configured to be aligned with a fuel tank 6460 (not shown in FIGS. 50-58) such that the fuel tank can receive a fuel fill apparatus (e.g., a fuel nozzle of a fuel pump or the like). While not shown, the fuel fill can be similar in form, function, and placement, relative to the frame, as the vehicle 4000. The rear portion 6340 can also optionally include at least one luggage compartment 6345, as described above.

As described above, the cabin portion 6350 of the body 6300 is bounded by the front portion 6310, the side portions 6320, and the rear portion 6340. The cabin portion 6350 defines an interior portion of the body 6300 and, as such, can house the interior components of the vehicle 6000. While not shown in FIGS. 50-58, the cabin portion 6350 can include at least a seat support surface and a seat back surface configured to support a pair of recumbent seats 6360. The seat support surface (not shown) can be similar to the floorboard 4351 described above. Thus, the seat support surface of the vehicle 6000 can be a substantially flat surface that allows the recumbent seats 6360 to be adjustable (e.g., along a longitudinal centerline of the vehicle 6000). As described above with reference to FIGS. 7-48, the placement of the fuel tank rearward of the cabin portion 6350 increases the amount of available space from the cabin portion 6350 that would otherwise be unavailable. Thus, the recumbent seats 6360 can be fully adjustable seats.

The cabin portion 6350 of the vehicle 6000 differs from the cabin portion 4350 of the vehicle 4000 by the exclusion of a roof portion that would otherwise extend between the front portion 6310 and the rear portion 6340 of the body 6300. In this manner, the cabin portion 6350 can be in a substantially open configuration. Moreover, the variation of the body 6300 does not substantially relocate the fuel tank (not shown). Thus, the fuel tank of the vehicle 6000 is behind the cabin portion 6350 of the body 6300 and positioned such that at least a portion of the fuel tank is above the rear suspension and/or the drive train 6400.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

For example, although the embodiments are shown and described herein as being included within a three-wheeled vehicle, any of the embodiments described herein, such as, for example, the reverse gear assembly 4440 can be included in any suitable vehicle. For example, in some embodiments, a reverse gear assembly similar to the reverse gear assembly 4440 can be included in a two-wheeled vehicle or a four-wheeled vehicle, where applicable.

Although various embodiments have been described as having particular features and/or combinations of components, other embodiments are possible having a combination of any features and/or components from any of embodiments as discussed above. For example, wheels can be substituted for sprockets, gears can be substituted for pulleys, and belts can be substituted for chains. Furthermore, any of the embodiments, described herein can include an electrical system similar to the electric system 5500.

The embodiments described herein can be assembled at a manufacturing plant and delivered to an end user as a complete vehicle and/or the embodiments described herein can be delivered and assembled elsewhere.

While specific systems and subsystems are described, any of the embodiments herein can include and suitable system and/or subsystem that may be needed for the operation of the vehicle. For example, the embodiment described herein can include any suitable braking system and/or components thereof. Thus, any of the embodiments described herein can include, for example, a brake pedal, master cylinder, brake lines, calipers, pads, drums, shoes, reservoirs, etc. needed for the operation of the braking system. Similarly, any of the embodiments described herein can include controls and any suitable electronics coupled thereto for the operation of the systems and/or subsystems. For example, the embodiments described herein can include controls and/or electronics operative in the functioning of headlights, taillights, turn signals, windshield wipers, radios, etc.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

What is claimed:

1. An apparatus, comprising:
a frame of a vehicle defining a longitudinal centerline, the frame having an engine mounting portion configured to mount an engine thereto;
a swing arm coupled to a rear portion of the frame, the swing arm including a wheel mounting portion configured to be coupled to a rear wheel assembly, the wheel mounting portion defining a radial axis that is substantially coaxial with the longitudinal centerline of the frame, the rear wheel assembly including a drive portion; and
a transmission assembly coupled to the frame and configured to receive an input from the engine, the transmission assembly including an output shaft coupled to an output member, the output member configured to be operatively coupled to the drive portion of the rear wheel assembly via a continuous linkage,
the transmission assembly including a transmission and a reverse gear assembly coupled external to at least a portion of the transmission, the transmission assembly configured to be transitioned between a first configuration, in which the transmission rotates the output shaft in a first direction, and a second configuration, in which the reverse gear assembly rotates the output shaft in a second direction opposite the first direction.

2. The apparatus of claim 1, wherein the frame of the vehicle is the frame for a three-wheeled vehicle.

3. The apparatus of claim 1, wherein the frame of the vehicle has a front portion and the rear portion, the front portion configured to support a recumbent seat such that a position of the recumbent seat is adjustable relative to the frame.

4. The apparatus of claim 1, wherein the frame of the vehicle has a front portion including a seat back member, the engine mounting portion being disposed between the seat back member and the swing arm, the transmission assembly being coupled to the engine mounting portion.

5. The apparatus of claim 1, wherein the continuous linkage is one of a single chain or a single belt.

6. The apparatus of claim 1, wherein:
the swing arm is coupled to the rear portion of the frame via a rotatable coupling defining a pivot point;
the drive portion of the rear wheel assembly is a drive sprocket; and
the output member is an output sprocket, the output sprocket being forward of the pivot point, the drive sprocket and the output sprocket defining a drive plane that is offset from the longitudinal centerline of the frame by a distance.

7. The apparatus of claim 1, further comprising:
a sensor configured to determine a rotational velocity of a portion of the transmission assembly, the transmission assembly configured to prevent the transition between the first configuration and the second configuration when the sensor determines that a rotational velocity of the portion of the transmission assembly is greater than zero.

8. An apparatus, comprising:
a frame of a vehicle defining a longitudinal centerline, the frame having an engine mounting portion configured to mount an engine thereto;
a swing arm coupled to a rear portion of the frame via a rotatable coupling defining a pivot point, the swing arm including a wheel mounting portion configured to be coupled to a rear wheel assembly such that a radial axis defined by the wheel mounting portion is substantially coaxial with the longitudinal centerline of the frame in at least one plane, a drive portion of the rear wheel assembly being offset from the longitudinal centerline when the rear wheel assembly is coupled to the wheel mounting portion; and
a transmission assembly coupled to the frame and configured to receive an input from the engine, the transmission assembly including an output shaft and an output member, the output member disposed about a portion of the output shaft and disposed forward of the pivot point, the output member configured to be operatively coupled to the drive portion of the rear wheel assembly such that the output member and the drive portion define a drive plane that is offset from the longitudinal centerline,
the transmission assembly including a transmission and a reverse gear assembly, the reverse gear assembly at least partially disposed within a shroud, the shroud being coupled external to the transmission, the transmission assembly configured to be transitioned between a first configuration, in which the transmission rotates the output shaft, the output member, and the rear wheel assembly in a first direction, and a second configuration, in which the reverse gear assembly rotates the output shaft, the output member, and the rear wheel assembly in a second direction, substantially opposite the first direction.

9. The apparatus of claim 8, wherein the frame of the vehicle is the frame for a three-wheeled vehicle.

10. The apparatus of claim 8, wherein the frame of the vehicle has a front portion configured to support a recumbent seat, the front portion including a seat back member, the engine mounting portion being disposed between the seat back member and the swing arm.

11. The apparatus of claim 8, wherein the output member is configured to be operatively coupled to the drive portion via a continuous linkage, the continuous linkage being one of a single drive chain or a single drive belt.

12. An apparatus, comprising:
a frame of a vehicle defining a longitudinal centerline, the frame having an engine mounting portion configured to mount an engine thereto;
a swing arm coupled to a rear portion of the frame, the swing arm including a wheel mounting portion defining a radial axis that is substantially coaxial with the longitudinal centerline of the frame, the wheel mounting portion configured to be coupled to a rear wheel assembly including a drive portion; and
a transmission assembly coupled to the frame and configured to receive an input from the engine, the transmission assembly including an output shaft, a transmission and a reverse gear assembly, the transmission configured to rotate the output shaft in a first direction, the reverse gear assembly being at least partially disposed in a shroud, physically distinct from the transmission, and configured to rotate the output shaft in a second direction opposite the first direction, the output shaft having an output member operatively coupled to the drive portion of the rear wheel assembly such that rotation of the output shaft in the first direction or the second direction rotates the rear wheel assembly in the first direction or the second direction, respectively.

13. The apparatus of claim 12, wherein the frame of the vehicle is the frame for a three-wheeled vehicle.

14. The apparatus of claim 12, wherein the frame of the vehicle has a front portion configured to support a recumbent seat such that a position of the recumbent seat is adjustable along the longitudinal centerline defined by the frame, the engine mounting portion being disposed between the swing arm and a seat back member included in the front portion such that the seat back member at least partially isolates the recumbent seat from the engine mounting portion.

15. The apparatus of claim 12, wherein the output member is operatively coupled to the drive portion via a continuous linkage, the continuous linkage being one of a single drive chain or a single drive belt.

16. The apparatus of claim 12, wherein:
the swing arm is coupled to the rear portion of the frame via a rotatable coupling defining a pivot point;
the drive portion of the rear wheel assembly is a drive sprocket; and
the output member is an output sprocket, the output sprocket being forward of the pivot point, the output sprocket being substantially aligned with the drive sprocket to define a drive plane that is offset from the longitudinal centerline of the frame by a distance.

* * * * *